United States Patent [19]

Uchikawa et al.

[11] Patent Number: 5,742,520

[45] Date of Patent: Apr. 21, 1998

[54] COLOR PICTURE PROCESSING METHOD AND COLOR PICTURE PROCESSING APPARATUS

[75] Inventors: Keiji Uchikawa, Kamakura; Shoji Suzuki, Kawasaki; Masanaga Tokuyo, Kawasaki; Masahiro Mori, Kawasaki, all of Japan

[73] Assignee: Fujitsu Limited, Kawasaki, Japan

[21] Appl. No.: 508,994

[22] Filed: Jul. 28, 1995

[30] Foreign Application Priority Data

Oct. 25, 1994 [JP] Japan ................ 6-260716

[51] Int. Cl.$^6$ .................. G06F 19/00; G01J 3/46
[52] U.S. Cl. .................. 364/526; 358/518; 382/167; 395/131
[58] Field of Search ................ 356/405; 358/500, 358/515, 518, 520, 537; 364/526; 382/167; 395/131

[56] References Cited

U.S. PATENT DOCUMENTS

| | | | |
|---|---|---|---|
| 4,488,245 | 12/1984 | Dalke et al. | 364/526 |
| 4,873,570 | 10/1989 | Suzuki et al. | 358/515 |
| 5,130,789 | 7/1992 | Dobbs et al. | 358/500 |
| 5,132,786 | 7/1992 | Ishiwata | 358/500 |
| 5,194,945 | 3/1993 | Kadowaki et al. | 358/520 |
| 5,289,295 | 2/1994 | Yumiba et al. | 358/518 |
| 5,311,334 | 5/1994 | Sugiura | 358/537 |
| 5,335,097 | 8/1994 | Murakami | 358/520 |
| 5,506,946 | 4/1996 | Bar et al. | 395/131 |
| 5,539,540 | 7/1996 | Spaulding et al. | 358/518 |
| 5,557,430 | 9/1996 | Isemura et al. | 358/501 |
| 5,596,427 | 1/1997 | Honma et al. | 358/515 |
| 5,608,851 | 3/1997 | Kobayashi | 395/131 |
| 5,612,792 | 3/1997 | Ichikawa et al. | 358/500 |
| 5,619,434 | 4/1997 | Keating | 364/578 |
| 5,627,950 | 5/1997 | Stokes | 395/131 |
| 5,646,751 | 7/1997 | Motamed et al. | 358/518 |
| 5,646,752 | 7/1997 | Kohler et al. | 358/520 |

FOREIGN PATENT DOCUMENTS 0 680 030   11/1995   European Pat. Off.
2668637     4/1992    France.

OTHER PUBLICATIONS

AndréZaccarin, et al., Transform Coding of Color Images With Limited Palette Size, *Multidimensional Signal Processing*, The Institute of Electrical and Electronics Engineers, Signal Processing Society, International Conference on Acoustics, Speech and Signal Processing, Toronto, Ontario, Canada, May 14–17, 1991, vol. 4, pp. 2625–2628.

(List continued on next page.)

*Primary Examiner*—Edward R. Cosimano
*Attorney, Agent, or Firm*—Armstrong, Westerman, Hattori, McLeland & Naughton

[57] ABSTRACT

A color picture processing method and a color picture processing apparatus by which the amount of picture data can be reduced without degrading the picture quality in accordance with the sensations of human beings and further reduction in amount of data can be realized by data compression without degrading the picture quality and besides extraction of a body, a color change and reduction in number of colors can be performed simply. The color picture processing apparatus comprises a color picture data inputting section, a category discrimination section for discriminating, from color picture data, color information based on categorical perception of human beings, a picture data conversion section for converting the color picture data, a region extraction section for specifying and extracting a partial region of a picture, a color changing section for changing some or all of colors of the picture, a data compression section for compressing the color picture data after the conversion, and a picture displayable data conversion section for converting the color picture data after the conversion into picture displayable data to be inputted to a picture displaying section using a table which indicates a corresponding relationship between the color information and the picture displayable data.

42 Claims, 33 Drawing Sheets

OTHER PUBLICATIONS

Patent Abstracts of Japan, vol. 95, No. 010 for 07-274026, Oct. 20, 1995.

"Color Categorical Perception and Memory", Keiji Uchikawa, Tokyo Inst. of Technology; The seventh Color Technology Conference 1990, pp. 7-14.

"Categorical Color-Name Regions of a Color Space in Aperture and Surface Color Modes", Keiji Uchikawa, Tokyo Inst. of Technology; J. Illum. Engng. Inst. of Japan, vol. 77, pp. 74-82.

FIG. 6(a)
FIG. 6(b)
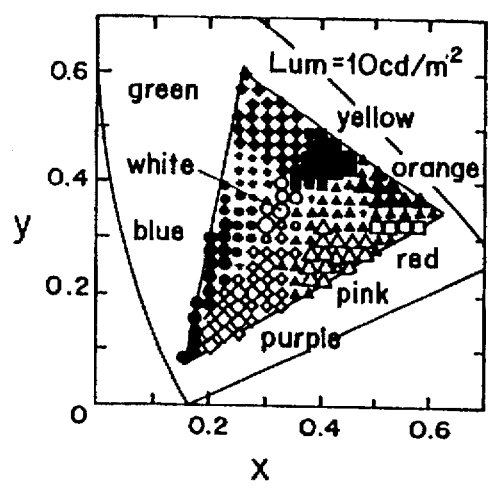
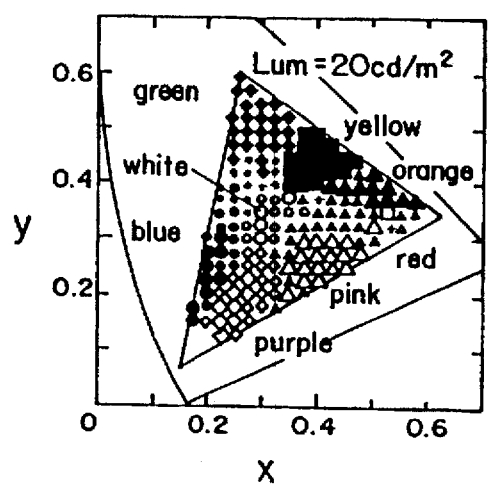

COLOR

| 4 bit |
|---|

| COLOR | DIRECTION | DISTANCE |
|---|---|---|
| 4 bit | 4 bit | 4 bit |

F I G. 14(b)

| COLOR | DIRECTION | DISTANCE | RGB DATA |
|---|---|---|---|
| RED | 1 | 1 | 90, 8, 12 |
| | | 2 | 100,10, 15 |
| | | 3 | - |
| | 2 | 1 | - |
| | | 2 | - |

| | | | |
|---|---|---|---|
| | | 1 | - |
| | | 2 | - |

| COLOR | DIRECTION | DISTANCE | RGB DATA |
|---|---|---|---|
| BLUE | 1 | 1 | - |

36B

F I G. 14(a)

| COLOR | RGB DATA |
|---|---|
| RED | 80, 8, 12 |
| BLUE | 10, 29, 89 |
| GREEN | 17, 72, 21 |
| - | - |
| - | - |

36A

DISTANCE1=DISTANCE BETWEEN CROSSING POINT & DATA OUTSIDE CATEGORY

DISTANCE2=DISTANCE BETWEEN BODY COLOR DATA & DATA OUTSIDE CATEGORY

VALUE OF DATA OUTSIDE CATEGORY WHICH EXHIBITS LOWEST VALUE OF DISTANCE 1 / DISTANCE 2 IS DETECTED
↓
CHANGE POSITIONS OF ALL PICTURE DATA AT RATIO OF DISTANCE 1 / DISTANCE 2

DISTANCE1 = DISTANCE BETWEEN CROSSING POINT & DATA OUTSIDE CATEGORY

DISTANCE2 = DISTANCE BETWEEN BODY COLOR DATA & DATA OUTSIDE CATEGORY

VALUE OF DATA OUTSIDE CATEGORY WHICH EXHIBITS LOWEST VALUE OF DISTANCE 1 / DISTANCE 2 IS DETECTED

↓

CHANGE POSITIONS OF ALL PICTURE DATA AT RATIO OF DISTANCE 1 / DISTANCE 2

THREE-DIMENSIONAL DISTRIBUTION OF BODY DATA

DISPLAY ONLY OF TWO-DIMENSIONAL PLANE PORTION OF BODY DATA

COLOR CHANGING METHOD ACCORDING TO THE INVENTION

COLOR CHANGING METHOD ACCORDING TO REFLECTION MODEL

F I G. 33
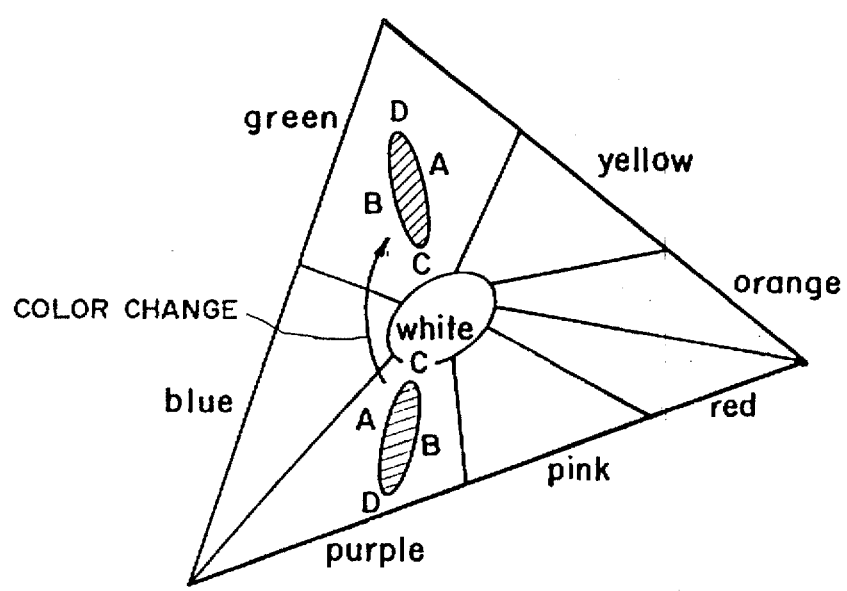

COLOR PICTURE PROCESSING METHOD AND COLOR PICTURE PROCESSING APPARATUS

BACKGROUND OF THE INVENTION

1. Field of the Invention

This invention relates to a color picture processing method and apparatus for use in performing picture processing such as displaying processing for a color monitor apparatus for retrieval of a color picture by an operator or processing of varying the color of an arbitrary body in a picture in a manner so as to vary, for example, the color, the gloss, the metallic feeling or the quality feeling of a picture of an arbitrary body in a color picture to modify the manner in which the color or the surface of the body looks or the atmosphere of the entire picture while maintaining the naturalness in shadow or color of the picture.

2. Description of the Related Art

Generally, a design system which makes use of a computer and a color monitor or a desk-top publishing system which produces computer graphics or produces an illustrated document which includes both a text and a picture requires operation of a color picture by an operator.

For example, in designing of a commodity (a package or a car) or a poster or in production of an illustrated document using a computer, an operator performs various operations such as an operation of producing a picture on a monitor, an operation of inputting an original picture using a reading apparatus or a like apparatus, an operation of allocating various colors to different portions of the picture, an operation of adjusting or modifying the thus allocated colors and an operation of modifying the material feeling of the surface of a body.

Meanwhile, in production of an electronic catalogue, for example, the color of a body in a single original picture is changed to produce a plurality of pictures as in an electronic catalogue of an automobile. This can reduce the time otherwise required for photographing of a large number of bodies.

In such color picture processing on a computer, it is desired that the picture be higher in degree of accuracy and can be operated simply and freely; data have a form simple to operate; a resulting picture after modification in color or shape can look natural; and the interface (human interface) between the computer and an operator allow easier use.

By the way, an RGB method is used most normally to perform such processing of a color picture as described above. This is because the RGB data form is employed as an output signal form from an image scanner or an input signal form to a display unit by a large number of appliances.

Meanwhile, processing (conversion) of picture data involves processing of specifying a desired region in a picture, processing of changing the color of an arbitrary body in the picture, JPEG (Joint Photographic Experts Group, an international standard of a color picture data compression method) compression for reducing the amount of data and so forth.

The body extraction processing particularly includes processing of designating a profile one-by-one picture element by manual operation by an operator using a mouse while keeping RGB signals in the RGB signal form, processing of converting RGB signals into data of the hue, the saturation and the brightness to extract a particular color, and so forth.

Meanwhile, the color changing processing includes processing of representing picture data in a body reflection model which employs RGB signals to change a color, processing of representing picture data in the hue, the brightness and the saturation and changing in the hue, the brightness or the saturation, and so forth.

Further, for the data compression, a signal form such as the YCrCb or the Lab in which data are represented in the brightness and a color in order to assure a high compression efficiency is employed frequently.

Further, as a method of changing a color of a body in a picture while maintaining the naturalness of the picture, a method of changing a color of a body in a picture only with a hue value of picture data of the body or a method which makes use of a simple body reflection model is available. Meanwhile, a change of the color feeling or the material quality feeling is realized by inputting a body having a different gloss or a different material quality separately in advance and patching a picture of the body to an object picture (partially replacing picture data).

Also a method has been proposed wherein picture data are represented based on a strict reflection model and various parameters of a color of a body and so forth are automatically derived from the model and changed to change the color the body. More particularly, picture data are represented as a reflection model using parameters of a color of a body, illumination light and so forth, and the parameters are changed to change the color of the body.

However, the RGB form as a data representation form which is employed in such color picture processing methods as described above requires extraction of a body by manual operation, and much time is required for the extraction processing. Further, although such a method which makes use of a reflection model of light of a body as described above is available as a color changing method, also the color changing processing by this method requires detection of parameters of a reflection model such as a body color for each one picture element, and a large amount of calculation is involved in and much time is required for the detection processing.

Further, when a picture of RGB is signals is displayed on a display unit, it cannot be displayed in full colors in which 8 bits are used for each color from a limitation of a memory for display data (frame memory), but can be displayed only in 256 colors in which 8 bits are used for each color. Consequently, processing of reducing data of approximately 16,000,000 colors wherein each color is constituted from 24 bits to data of 256 colors of 8 bits is required.

As a method for such color reduction processing as described just above, a method wherein an RGB color space is divided into several regions in each of which data have a same color or another method wherein appearance frequencies of data in an entire picture are detected are 256 colors are allocated in order to colors having comparatively high appearance frequencies in available. However, those methods have a problem to be solved in that a large number of calculation are required and much time is required for the calculation processing (several seconds are required even with a work station) or the manner of dividing a color space must be changed for each picture in order to assure a desirable picture quality.

Meanwhile, the method wherein picture data are converted into data of the hue, the saturation and the brightness to extract a body or change a color has a problem to be solved in that a desired body or region cannot be extracted or a natural result of a change in color of a shadow or gloss cannot be obtained.

By the way, the data form of the YCrCB or the Lab used in data compression processing is obtained by mathematical conversion of the RGB form. In such forms, picture data are represented in a color component and a brightness component and allow efficient reduction in amount of data by JPEG compression mentioned above without causing much degradation in picture quality.

However, the data amount is not different from that of the RGB form. In particular, in any of the data forms, since the amount of data can be reduced without compression, for example, where original RGB data are constituted from 8 bits for each color, the data are sometimes represented with totaling 16 bits including 8 bits for a brightness component and 4 bits ×2 for a color component. Such representation makes use of the face that the visual sense of human beings has a characteristic that it is less sensitive to a variation in color than to a variation in brightness.

However, where compression processing is performed in which such data form such as the YCrCB or the Lab is employed, since the bit numbers of color components are reduced uniformly, significant degradation in quality of a picture sometimes occurs depending upon the color.

Meanwhile, with the method of changing color by a change in hue value according to the prior art described above, a color can be changed while maintaining the naturalness of a shadow or gloss of the surface of a body to some degree. However, if the saturation or the brightness is changed in order to perform delicate adjustment of a color, then the shadow becomes whitish or the gloss disappears.

On the other hand, with the change of a color which makes use of a simple reflection model, the naturalness can be maintained to some degree. However, only a color can be changed, but the manner in which gloss or a color looks (for example, an effect to provide the manner, in which a color looks, with the directivity so that it may look brilliantly) cannot be changed.

Further, with the method wherein another body is inputted separately in advance in order to change the feeling of gloss or the manner in which a color looks, the inputting operation is cumbersome. Further, it is only possible to change a property of the thus inputted body, and a free change is not permitted.

As a possible solution to the subjects described above, the following method which is based on a strict model and a change in parameter of the model has been proposed.

In particular, a color change is performed making use of the expression (1) of a reflection model given below:

Picture Data = Body Color + Illumination Light + Secondary Reflection Light    (1)

$$\begin{bmatrix} Ro \\ Go \\ Bo \end{bmatrix} = K1 \begin{bmatrix} Rd \\ Gd \\ Bd \end{bmatrix} + K2 \begin{bmatrix} Rs \\ Gs \\ Bs \end{bmatrix} + K3 \begin{bmatrix} Ra \\ Ga \\ Ba \end{bmatrix}$$

As seen from the expression (1) above, a color (picture data of a body) a human being sees is represented as a sum of a body color vector and an applicable constant (diffused reflection component), an illumination light vector and an applicable constant (mirror reflection component), and secondary reflection light (environmental light) which depends upon surrounding bodies and an applicable constant (environmental light component).

Here, in the expression (1) above, the body color, the color of illumination light and the color of secondary reflection light are estimated from an original picture, and the constants K1, K2 and K3 are determined based on the thus estimated colors and picture data of the original picture. The color of the body and the color of the illumination light are derived by applying, to a distribution of picture data on an rg chromaticity plane, a straight line interconnecting the body color and the color of the illumination light. Further, a vector in a direction perpendicular to a plane defined by vectors indicating the body color and the illumination light in a color space is detected as secondary reflection light.

Since three RGB representations are obtained for the three unknown quantities in such a manner as described above, the simultaneous equations with three unknowns are solved to find out K1, K2 and K3.

After the three unknown quantities K1, K2 and K3 are determined, a color change may be performed by changing a body color (Rd, Gd, Bd) to a desired color for a color change (Rd', Gd', Bd') to obtain new picture data (Ro', Go', Bo') in accordance with an expression (2) given below. Also when it is intended to change the illumination light or the secondary reflection light, new picture data are obtained in a similar manner.

New Picture Data = Body Color + Illumination Light + Secondary Reflection Light    (2)

$$\begin{bmatrix} Ro' \\ Go' \\ Bo' \end{bmatrix} = K1 \begin{bmatrix} Rd' \\ Gd' \\ Bd' \end{bmatrix} + K2 \begin{bmatrix} Rs \\ Gs \\ Bs \end{bmatrix} + K3 \begin{bmatrix} Ra \\ Ga \\ Ba \end{bmatrix}$$

With the method described above, the color of a body or the color of an illumination light source which is a parameter of the model can be derived automatically by means of a computer without the necessity of a manual designation operation by an operator.

However, picture data inputted from a camera or an image scanner often includes data which do not conform to the model due to noise in the original. If a color change is performed using those data uniformly in conformity with the model, then the noise (error from the model) is sometimes expanded so that it looks striking.

For example, particularly if a dark color is changed to a light color, that is, if data of a dark color which has a comparatively low S/N ratio and includes comparatively high noise is changed to data of a light color, then the expansion ratio of noise is increased and degradation in picture quality becomes striking. Consequently, the method described above has a problem to be solved in that a variation in color which is not striking in an original picture becomes striking in a picture after a color change.

Further, according to the color change based on a reflection model of the expression (1) above, a natural result of a color change may not be obtainable when an unexpected reflection of a surrounding object influences the data of an object of a color change.

In particular, the color change based on a reflection model is performed by such movement of data in a color space as illustrated in FIG. 33. FIG. 33 illustrates movement of a data distribution when the color of body data which are distributed in a region of purple is to be changed to green. A manner of movement of the distribution can be recognized from characteristics of the data distribution before and after the movement by comparing symbols (A,B,C,D) applied in the proximity of each of the representations of the data distribution.

Here, it is assumed that data include an influence of unexpected reflection of the blue color of an original body.

While it is considered that the reflection occurs in the proximity of the symbol "A" of the original data distribution, the movement of the data by the color change moves the reflected portion "A" of the blue to a position near a region of yellow on the opposite side of the blue. Conversely, the portion "B" moves to a position near a region of blue.

Consequently, the color change based on a reflection model has a problem to be solved in that it makes the color of a reflected portion unnatural.

SUMMARY OF THE INVENTION

It is an object of the present invention to provide a color picture processing method and a color picture processing apparatus by which the amount of picture data can be reduced without degrading the picture quality in accordance with the sensations of human beings. Furthermore, a reduction in amount of data can be realized by data compression such as the JPEG without degrading the picture quality.

It is another object of the present invention to provide a color picture processing method and a color picture processing apparatus by which extraction of a body, a color change and reduction in number of colors can be performed simply.

It is a further object of the present invention to provide a color picture processing method and a color picture processing apparatus by which noise of data of a body picture of an object of a color change is reduced or noise expanded by a color change is reduced to obtain a picture of an improved picture quality.

It is a still further object of the present invention to provide a color picture processing method and a color picture processing apparatus by which a natural result conforming to the sensations of human beings can be obtained even by a change of a color of a body which is influenced by unexpected reflection or a like effect.

In order to attain the objects described above, according to one aspect of the present invention, there is provided a color picture processing method, which comprises the steps of discriminating which one of a plurality of categories of color information based on a plurality of classified colors inputted color picture data belong, converting the color picture data so as to have the thus discriminated color information, and performing succeeding picture processing using the color picture data after the conversion.

With the color picture processing method, since a color of color picture data is discriminated based on the categorical perception of human beings, the amount of picture data can be reduced without degrading the picture quality in accordance with the sensations of human beings. Further, extraction of a body, a change of color, reduction of the number of colors and so forth can be performed simply. The color picture processing method is advantageous also in that the amount of data can be further reduced without degrading the picture quality by making use of a data compression technique such as the JPEG.

According to another aspect of the present invention, there is provided a color picture processing method, which comprises the steps of representing a color of picture data as a color code representing one of a plurality of classified colors and a deviation between the color of the picture data and a representative color of a color category to which a color represented by data including the color code information belongs, and performing succeeding picture processing using the thus represented color.

With the color picture processing method, since a color of color picture data is discriminated based on the categorical perception of human beings, the amount of picture data can be reduced without degrading the picture quality in accordance with the sensations of human beings. Further, extraction of a body, a change of a color, reduction of the number of colors and so forth can be performed simply. The color picture processing method is advantageous also in that the amount of data can be further reduced without degrading the picture quality by making use of a data compression technique such as the JPEG.

According to a further aspect of the present invention, there is provided a color picture processing apparatus, comprising color picture data inputting means for inputting color picture data, category discrimination means for discriminating which one of a plurality of categories of color information the color picture data inputted from the color picture data inputting means belong, the categories being classified according to categorical human perception, picture data conversion means for converting the color picture data so as to have the color information discriminated by the category discrimination means, and picture processing means for performing picture processing using the color picture data converted into the color information based on the categorical perception by the picture data conversion means.

With the color picture processing apparatus, since a color of color picture data is discriminated based on the categorical perception of human beings, the amount of picture data can be reduced without degrading the picture quality in accordance with the sensations of human beings. Further, extraction of a body, a change of a color, reduction in the number of colors and so forth can be performed simply. The color picture processing method is advantageous also in that the amount of data can be further reduced without degrading the picture quality by making use of a data compression technique such as the JPEG.

According to a still further aspect of the present invention, there is provided a color picture processing method, which comprises the steps of discriminating to which one of a plurality of categories of color information inputted color picture data belong, the categories being classified according to categorical human perception, converting the color picture data so as to have the thus discriminated color information, and performing region extraction processing of specifying and extracting, from the color picture information after conversion into the color picture information based on the categorical perception, a partial region of a picture constructed from the color picture data after the conversion.

Accordingly, with the color picture processing method, since region extraction processing of a body can be performed only by determination regarding a code of a color of picture data (whether or not the color is the same as a designated color), processing conforming to the sensations of human beings can be performed at a speed greater than that of another method which is based on manual operation or makes use of the hue.

According to a yet further aspect of the present invention, there is provided a color picture processing apparatus, comprising color picture data inputting means for inputting color picture data, category discrimination means for discriminating which one of a plurality of categories of color information the color picture data inputted from the color picture data inputting means belong, the categories being classified according to categorical human perception, picture data conversion means for converting the color picture data so as to have the color information discriminated by the category discrimination means, and region extraction means for specifying and extracting, from the color picture data after conversion into the color information based on the categorical perception, a partial region of a picture constructed from the color picture data after the conversion, the region extraction means including color designation means for instructing a color to be specified in the picture, comparison means for comparing the color designated by the color designation means and colors of picture elements of the color picture data with each other, and means for determining, when a result of the comparison by the comparison means proves that the designated color and the colors of the picture elements of the color picture data are the same color, the picture elements to be picture elements which constitute the region to be specified.

Accordingly, with the color picture processing apparatus, since region extraction processing of a body can be performed only by determination regarding a code of a color of picture data (whether or not the color is the same as a designated color), processing conforming to the sensations of human beings can be performed at a speed greater than that by another method which is based on manual operation or makes use of the hue.

According to a yet further aspect of the present invention, there is provided a color picture processing method, which comprises the steps of discriminating which one of a plurality of categories of color information inputted color picture data belongs, the categories being classified according to categorical human perception, converting the color picture data so as to have the thus discriminated color information, and performing color changing processing of changing, based on the color picture data after conversion into the color information based on the categorical perception, some or all of colors of a picture constructed from the color picture data after the conversion.

Accordingly, with the color picture processing method, since color changing processing can be realized based only on determination regarding a code of a color of picture data (whether or not the color is the same as the designated color) without the necessity of extraction of the color of a body, the color picture processing method is advantageous in that calculation processing for changing a vector in a color space is unnecessary and the processing time for changing a color is reduced as much, and high speed processing conforming to the sensations of human beings can be performed.

According to a yet further aspect of the present invention, there is provided a color picture processing apparatus, comprising color picture data inputting means for inputting color picture data, category discrimination means for discriminating which one of a plurality of categories of color information the color picture data inputted from the color picture data inputting means belongs, the categories being classified according to categorical human perception, picture data conversion means for converting the color picture data so as to have the color information discriminated by the category discrimination means, and color changing means for changing, based on the color picture data after the conversion into the color information based on the categorical perception by the picture data conversion means, some or all of colors of a picture constructed from the color picture data after the conversion, the color changing means including means for changing a color parameter which has information of at least one of a code of a color classified based on the categorical perception and deviation between the color picture data and a representative color of a category to which the color picture data belong.

Accordingly, with the color picture processing apparatus, since color changing processing can be realized only based on determination regarding a code of a color of picture data (whether or not the color is the same as the designated color) without the necessity of extraction of the color of a body, the color picture processing method is advantageous in that calculation processing for changing a vector in a color space is unnecessary and the processing time for changing a color is reduced as much, and high speed processing conforming to the sensations of human beings can be performed.

According to a yet further aspect of the present invention, there is provided a color picture processing method, which comprises the steps of discriminating which one of a plurality of categories of color information inputted color picture data belong, the categories being classified according to categorical human perception, converting the color picture data so as to have the thus discriminated color information, and performing data compression processing of the color picture data after the conversion into the color information based on the categorical perception.

Accordingly, with the color picture processing method, since data compression processing of color picture data after conversion into color information based on the categorical perception is performed, the amount of data can be further reduced. Such compressed data provides an advantage in that the capacity of a hard disk or a like storage medium required to store data can be reduced, and in transmission which makes use of a channel, the communication time can be reduced.

According to yet a further aspect of the present invention, there is provided a color picture processing apparatus, comprising color picture data inputting means for inputting color picture data, category discrimination means for discriminating which one of a plurality of categories of color information picture data inputted from the color picture data inputting means belong, the categories being classified according to categorical human perception, picture data conversion means for converting the color picture data so as to have the color information discriminated by the category discrimination means, and data compression means for performing data compression processing of the color picture data after the conversion into the color information based on the categorical perception by the picture data conversion means.

Accordingly, with the color picture processing apparatus, since data compression processing of color picture data after conversion into color information based on the categorical perception is performed, the amount of data can be further reduced. Such compressed data provides an advantage in that the capacity of a hard disk or a like storage medium required to store data can be reduced, and in transmission which makes use of a channel, the communication time can be reduced.

According to yet a further aspect of the present invention, there is provided a color picture processing method, which comprises the steps of discriminating which one of plurality of categories of color information inputted color picture data belong, the categories being classified according to categorical human perception, converting the color picture data so as to have the thus discriminated color information, and converting the color picture data after the conversion into the color information based on the categorical perception into picture displayable data, which can be inputted to picture displaying means using means for indicating a corresponding relationship between the color information based on the categorical perception and such picture displayable data.

Accordingly, with the color picture processing method according to the present invention, since it is first discriminated which one of a plurality of categories of color information inputted color picture data, the categories being classified according to categorical human perception, and then the color picture data are converted so as to have the thus discriminated color information, whereafter the color picture data after the conversion into the color information based on the categorical perception are converted into picture displayable data as primary color information, which can be inputted to the picture displaying means using the means for indicating a corresponding relationship between the color information based on the categorical perception and such picture displayable data, a picture which conforms to the sensations of human beings to colors can be represented with small data for approximately 12 colors (4 bits), and as a result, there is an advantage in that, compared with a display of, for example, 256 colors, the amount of data can be reduced by half, and the memory for display data can be reduced very much.

According to yet a further aspect of the present invention, there is provided a color picture processing apparatus, comprising color picture data inputting means for inputting color picture data, category discrimination means for discriminating which one of a plurality of categories of color information the color picture data inputted from the color picture data inputting means belong, the categories being classified according to categorical human perception, picture data conversion means for converting the color picture data so as to have the color information discriminated by the category discrimination means, and picture displayable data conversion means for converting the color picture data after the conversion into the color information based on the categorical perception by the picture data conversion means into picture displayable data, which can be inputted to picture displaying means, using means for indicating a corresponding relationship between the color information based on the categorical perception and such picture displayable data.

Accordingly, with the color picture processing apparatus, RGB data approximately equivalent to an original picture can be obtained, and a picture of high quality can be displayed. Further, where such conversion is performed making use of a lookup table for which an IC memory or the like is used, high speed processing for a reduction in the number of colors can be performed.

According to yet a further aspect of the present invention, there is provided a color picture processing apparatus, comprising color picture data inputting means for inputting color picture data, category discrimination means for discriminating which one of a plurality of categories of color information the color picture data inputted from the color picture data inputting means belong, the categories being classified according to categorical human perception, picture data conversion means for converting the color picture data so as to have the color information discriminated by the category discrimination means, region extraction means for specifying and extracting, from the color picture data after conversion into the color information based on the categorical perception, a partial region of a picture constructed from the color picture data after the conversion, color changing means for changing, based on the color picture data after the conversion into the color information based on the categorical perception by the picture data conversion means, some or all of colors of picture construction from the color picture data after the conversion, data compression means for performing data compression processing for the color picture data after the conversion into the color information based on the categorical perception by the picture data conversion means, and picture displayable data conversion means for converting the color picture data after the conversion into the color information based on the categorical perception by the picture data conversion means into picture displayable data, which can inputted to picture displaying means, using means for indicating a corresponding relationship between the color information based on the categorical perception and such picture displayable data.

With the color picture processing apparatus, since a color of color picture data is discriminated based on the categorical perception of human beings, the amount of picture data can be reduced without degrading the picture quality in accordance with the sensations of human beings. Further, extraction of a body, a change of a color, reduction of the number of colors and so forth can be simply performed. The color picture processing apparatus is advantageous also in that the amount of data can be further reduced without degrading the picture quality by making use of a data compression technique such as the JPEG.

According to yet further aspect of the present invention, there is provided a color picture processing method wherein a particular color in a picture constructed from color picture data is designated to extract an arbitrary body region and a color of the arbitrary body region in the picture is derived and changed to a desired color designated separately, comprising the steps of detecting which one of a plurality of categories of color information the designated color or the derived body color or else the desired color belongs, the categories being classified according to categorical human perception, detecting which one of the plurality of categories of color information the color picture data of the body region before or after the color change belong, the categories being classified according to categorical human perception discriminating whether categories of the instructed color, the body color or the desired color and the color picture data are the same as or are different from each other, and performing processing of requesting, based on a result of the discrimination, an operator for a change of the color picture data or for display of the result.

Accordingly, with the color picture processing method, since color picture data before or after a color change can be changed based on a result of discrimination in category, there is an advantage in that the picture quality can be improved by reducing noise in data of a body picture of an object of the color change or by reducing noise expanded by the color change.

According to yet a further aspect of the present invention, there is provided a color picture processing apparatus, comprising a memory for storing inputted color picture data, body region extraction means for extracting an arbitrary body region of a picture constructed from the inputted color picture data designating a color, body color detection means for detecting a body color of the body, desired color designation means for designating a desired color for a color change of the body, color changing means for changing the color of the body into the desired color for a color change, first category discrimination means for discriminating which one of a plurality of categories of color information the designated color or the derived body color or to whatever else the desired color belongs, the categories being classified according to categorical human perception, second category discrimination means for discriminating which one of the plurality of categories of color information the color picture data of the body region before or after the color change belongs, the categories being classified according to categorical human perception, category difference discrimination means for discriminating whether the category of the designated color, the body color or the desired color and the category of the color picture data discriminated by the first category discrimination means and the second category discrimination means, respectively, are the same as or are different from each other, and picture data changing means for changing the color picture data before or after the color change based on a result of the discrimination by the category difference discrimination means.

Accordingly, with the color picture processing apparatus, since color picture data before or after a color change can be changed based on a result of discrimination in category, there is an advantage in that the picture quality can be improved by reducing noise in the data of a body picture of an object of the color change or by reducing noise expanded by the color change.

According to yet a further aspect of the present invention, there is provided a color picture processing method wherein a color of an arbitrary body region in a color picture is changed by changing a position of data indicating the body region in a color space, which comprises the steps of discriminating whether data indicating the body region before and after a color change belong, when the data are converted into a plurality of colors classified based on categorical perception of human beings, to the same category or to different categories, and changing the positions of the data in the color space based on a result of the discrimination to change the color of the body.

With the color picture processing method, since the positions of data in a color space can be changed based on a result of discrimination by the category difference discrimination means, even when the color of the body which is influenced by unexpected reflection or the like is to be changed, the effect of the reflection can be maintained. Consequently, there is an advantage in that a natural result conforming to the sensations of human beings can be obtained.

According to yet a further aspect of the present invention, there is provided a color picture processing apparatus wherein a color of an arbitrary body region in a color picture is changed by changing a position of data indicating the body region in a color space, comprising a memory for storing body region data, body color detection means for detecting a body color of the body data, desired color designation means for designating an desired color for a color change of the body data, category discrimination means for discriminating which one of a plurality of categories of color information the body color data indicating the body region before and after a color change and the desired color data belong, the categories being classified according to categorical human perception, and data conversion means for converting the data so as to have the color information discriminated by the category discrimination means.

With the color picture processing apparatus, since the positions of data in a color space can be changed based on a result of discrimination by the category difference discrimination means, even when the color of the body which is influenced by unexpected reflection or the like is to be changed, the effect of the reflection can be maintained. Consequently, there is an advantage in that a natural result conforming to the sensations of human beings can be obtained.

Further objects, features and advantages of the present invention will become apparent from the following detailed description when read in conjunction with the accompanying drawings in which like parts or elements are denoted by like references characters.

BRIEF DESCRIPTION OF THE DRAWINGS

FIGS. 5(a) and 5(b), 6(a) and 6(b), and 7(a) and 7(b) are diagrammatic views showing different examples of classification on an xy chromaticity diagram;

FIGS. 14(a) and 14(b) are diagrammatic views illustrating a procedure of converting data in the color picture processing apparatus shown in FIG. 4 into RGB data or like data to be used for displaying on a display unit or a like apparatus by means of displaying data conversion section;

FIG. 33 is a diagrammatic view illustrating a color change based on a reflection model.

DESCRIPTION OF THE PREFERRED EMBODIMENTS

First, several aspects of the present invention will be described with reference to the drawings.

Figure 1:
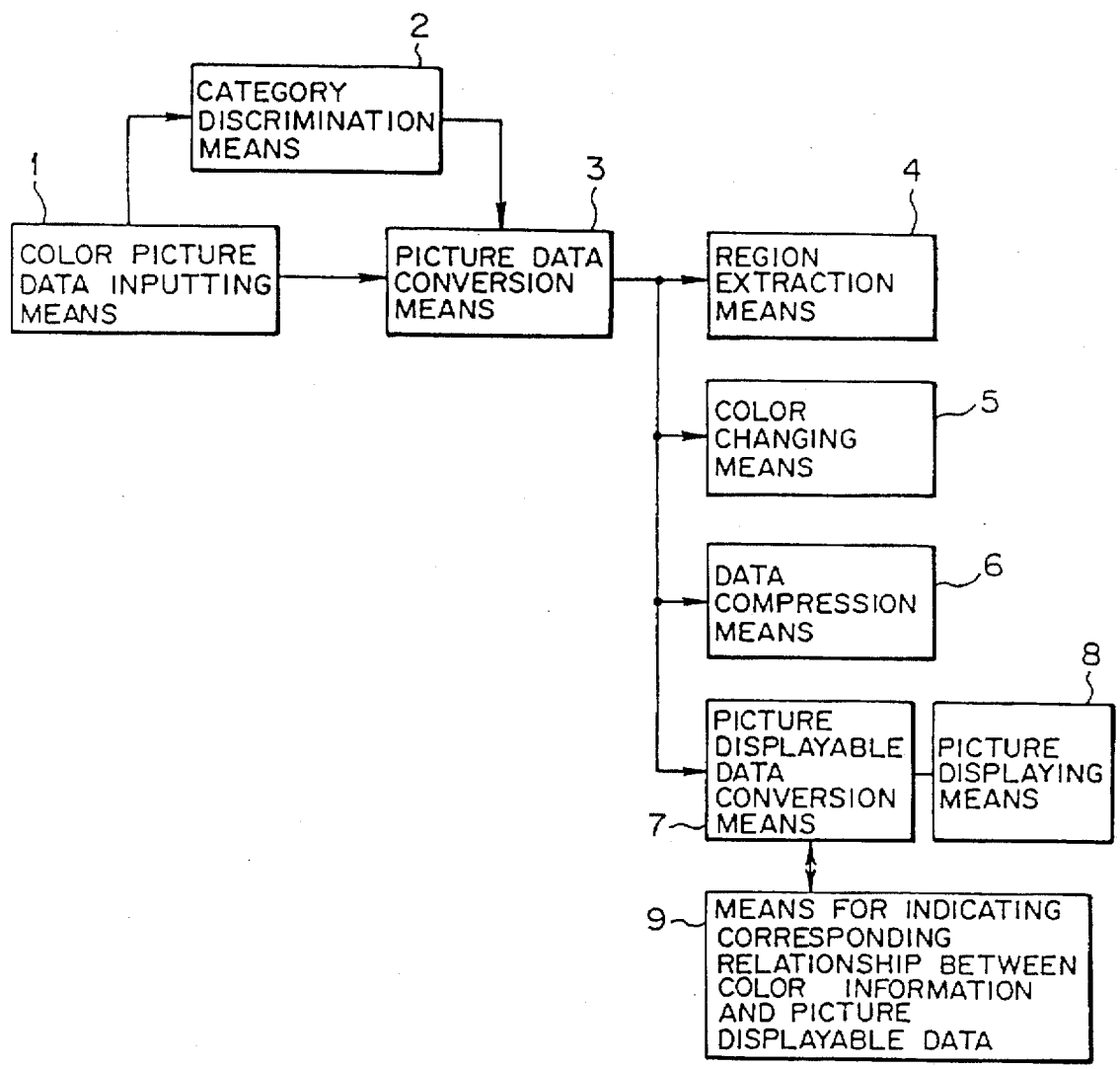
FIGS. 1 to 3 are block diagrams illustrating different aspects of the present invention.

Referring first to FIG. 1, there is shown a color picture processing apparatus according to a first aspect of the present invention. In the color picture processing apparatus shown, it is first discriminated which one of a plurality of categories of color information inputted color picture data belong, the categories being classified according to categorical human perception, and then the color picture data are converted so as to have the thus discriminated color information, and thereafter, succeeding picture processing is performed using the color picture data after the conversion into the color information based on the categorical perception.

Or, a color of picture data is represented as a color code representing one of a plurality of colors classified based on categorical perception of human beings as a plurality of classified colors and a deviation between the color of the picture data and a representative color of a color category to which a color represented by data including the color code information belongs, and thereafter, succeeding picture processing is performed using the thus represented color.

Here, the deviation may be data representative of a direction of the color of the picture data from the representative color of the color category or data representative of a distance of the color of the picture data from the representative color of the color category.

The color picture processing apparatus shown in FIG. 1 includes color picture data inputting means 1 for inputting color picture data.

The color picture processing apparatus further includes category discrimination means 2 for discriminating which one of a plurality of categories of color information color picture data inputted from the color picture data inputting means 1 belong, the categories being classified according to categorical human perception.

The color picture processing apparatus further includes picture data conversion means 3 for converting color picture data so as to have color information discriminated by the category discrimination means 2.

The color picture processing apparatus further includes region extraction means 4 for specifying and extracting, from color picture data after conversion into color information based on the categorical perception by the picture data conversion means 3, a partial region of a picture constructed from the color picture data after the conversion.

The color picture processing apparatus further includes changing means 5 for changing, based on color picture data after conversion into color information based on the categorical perception by the picture data conversion means 3, some of all of colors of a picture constructed from the color picture data after the conversion.

The color picture processing apparatus further includes data compression means 6 for performing data compression processing of color picture data after conversion into color information based on the categorical perception by the picture data conversion means 3.

The color picture processing apparatus further includes picture displayable data conversion means 7 for converting color picture data after conversion into color information based on the categorical perception by the picture data conversion means 3 into picture displayable data, which can be inputted to picture displaying means 8, using means 9 for indicating a corresponding relationship between the color information based on the categorical perception and such picture displayable data.

The picture data conversion means 3 may include means for converting color picture data using a code of a color classified based on the categorical perception of human beings, means for converting color picture data using combination information of a code of a color classified based on the categorical perception and a deviation between the color picture data and a representative color of a category to which the color picture data belong, or means for converting color picture data using combination information of a code of a color classified based on the categorical perception and a parameter representing at least one of the brightness and the clarity.

Meanwhile, the category discrimination means 2 may discriminate, when color picture data of an object picture element belongs to a boundary region of a category of a color, to color information of which one of the categories the color picture data belong, based on a relationship to category colors of picture elements around the object picture element of the color picture data, or may detect, when color picture data of an object picture element belongs to a boundary region of a category of the color, categories in color of the picture elements around the object picture element of the color picture data, count the numbers of picture elements of same categories and discriminate that one of the categories whose number of picture elements is the greatest among the counted numbers as the category of the color picture data.

In the color picture processing apparatus according to the first aspect of the present invention described above with reference to FIG. 1, when a color picture is inputted, it is first discriminated to which one of a plurality of categories of color information the inputted color picture data belong, the categories being classified according to categorical human perception, and then the color picture data are converted so as to have the thus discriminated color information, and thereafter, succeeding picture processing is performed using the color picture data after the conversion into the color information based on the categorical perception.

Or, color picture data may be represented as a color code representing one of a plurality of colors classified based on categorical perception of human beings and a deviation between the color of the picture data and a representative color of a color category to which a color represented by data including the color code information belongs, and thereafter, succeeding picture processing may be performed using the thus represented color.

Here, the deviation may be data representative of a direction of the color of the picture data from the representative color of the color category or data representative of a distance of the color of the picture data from the representative color of the color category.

More particularly, when color picture data are inputted from the color picture data inputting means 1 of the color picture processing apparatus, the category discrimination means 2 discriminates which one of a plurality of categories of color information the color picture data inputted from the color picture data inputting means 1 belong, the categories being classified according to categorical human perception.

Then, the picture data conversion means 3 converts the color picture data so as to have color information discriminated by the category discrimination means 2, and the region extraction means 4 specifies and extract, from the color picture data after the conversion into the color information based on the categorical perception by the picture data conversion means 3, a partial region of a picture constructed from the color picture data after the conversion.

Further, the color changing means 5 changes, based on the color picture data after the conversion into the color information based on the categorical perception by the picture data conversion means 3, some or all of colors of a picture constructed from the color picture data after the conversion.

Further, the data compression means 6 performs data compression processing of the color picture data after the conversion into the color information based on the categorical perception by the picture data conversion means 3.

Then, the picture displayable data conversion means 7 converts the color picture data after the conversion into the color information based on the categorical perception by the picture data conversion means 3 into picture displayable data, which can be inputted to the picture displaying means 8, using the means 9 for indicating a corresponding relationship between the color information based on the categorical perception and such picture displayable data.

Further, the picture data conversion means 3 can convert the color picture data using a code of a color classified based on the categorical perception of human beings, convert the color picture data using combination information of a code of a color classified based on the categorical perception and a deviation between the color picture data and a representative color of a category to which the color picture data belong, or convert the color picture data using combination information of a code of a color classified based on the categorical perception and a parameter representing at least one of the brightness and the clarity to convert the color of the picture data based on the perception of human beings.

Meanwhile, the category discriminating means 2 can discriminate, when color picture data of an object picture element belongs to a boundary region of a category of a color, to which one of the categories the color picture data belong, based on a relationship to category colors of picture elements around the object picture element of the color picture data, or can detect, when color picture data of an object picture element belongs to a boundary region of a category of the color, categories in color of the picture elements around the object picture element of the color picture data, count the numbers of picture elements of same categories and discriminate that one of the categories whose number of picture elements is the greatest among the counted numbers as the category of the color picture data.

With the color picture processing apparatus according to the aspect of the present invention described above, since a color of color picture data is discriminated based on the categorical perception of human beings, the amount of picture data can be reduced without degrading the picture quality in accordance with the sensations of human beings. Further, extraction of a body, a change of a color, reduction of the number of colors and so forth can be simply performed. The color picture processing apparatus is advantageous also in that the amount of data can be further reduced without degrading the picture quality by making use of a data compression technique such as the JPEG.

Further, since a color as picture data can be represented in four bits in the minimum by the picture data conversion means 3, colors conforming to the sensations of human beings can be represented with an amount of data reduced to 1/6 compared with that of the RGB representation in which picture data are represented in 24 bits in which an individual group of 8 bits represents a different color. Consequently, handling of a picture with a higher efficiency can be realized. Furthermore, since data can be converted by referring to a lookup table or the like in which the relationships among picture data and colors based on the categorical perception, representative colors of the individual categories, and deviations (direction, distance and so forth) from the representative colors are stored, the conversion processing can be performed at a higher speed than that by conversion which is based on software or the like, and consequently, a remarkable increase in processing speed can be anticipated.

Further, in the color picture processing apparatus, when color picture data of an original picture element belongs to a boundary of a category of a color, the category discrimination means 2 investigates categories of picture elements around the original picture element and determines a color which appears most frequently at the picture elements around the original picture elements as the color of the object of investigation. Consequently, a color in a boundary region which cannot be classified readily when picture data are represented using colors based on the categorical perception can be determined with certainty. As a result, picture data of a high picture quality in accordance with which no such situation that a different color such as a color of noise appears in one body occurs can be obtained.

Further, in the color picture processing apparatus, since region extraction processing of a body can be performed only by determination regarding a code of a color of picture data (whether or not the color is the same as a designated color), processing conforming to the sensations of human beings can be performed at a speed greater than that of another method which is based on manual operation or makes use of the hue.

Furthermore, in the color picture processing apparatus, since color changing processing can be realized based only on determination regarding a code of a color of picture data (whether or not the color is the same as the designated color) without the necessity of extraction of the color of a body, the color picture processing apparatus is advantageous also in that calculation processing for changing a vector in a color space is unnecessary and the processing time for changing a color is reduced as much, and high speed processing conforming to the sensations of human beings can be performed.

Further, in the color picture processing apparatus, since data compression processing of color picture data after conversion into color information based on the categorical perception is performed, the amount of data can be reduced further. Such compressed data provides an advantage in that the capacity of a hard disk or a like storage medium required to store data can be reduced, and in transmission which makes use of a channel, the communication time can be reduced.

Meanwhile, according to a color picture processing method according to the present invention, since it is first discriminated which one of a plurality of categories of color information inputted color picture data belong, the categories being classified according to categorical human perception, and then the color picture data are converted so as to have the thus discriminated color information, whereafter the color picture data after the conversion into the color information based on the categorical perception are converted into picture displayable data, which can be inputted to the picture displaying means 8 using the means 9 for indicating a corresponding relationship between the color information based on the categorical perception and such picture displayable data, a picture which conforms to the sensations of human beings to colors can be represented with small amount of data for approximately 12 colors (4 bits), and as a result, there is an advantage in that, compared with a display of, for example, 256 colors, the amount of data can be reduced by half, and the memory for display data can be greatly reduced.

Further, according to the color picture processing apparatus of the aspect of the present invention described above, since it comprises the color picture data inputting means 1 for inputting color picture data, the category discrimination means 2 for discriminating which one of a plurality of categories of color information the color picture data inputted from the color picture data inputting means 1 to belong, the categories being classified according to categorical human perception, the picture data conversion means 3 for converting the color picture data so as to have the color information discriminated by the category discrimination means 2, and the picture displayable data conversion means 7 for converting the color picture data after the conversion into the color information based on the categorical perception by the picture data conversion means 3 into picture displayable data, which can be inputted to the picture displaying means 8, using the means 9 for indicating a corresponding relationship between the color information based on the categorical perception and such picture displayable data, RGB data approximately equivalent to an original picture can be obtained, and a high quality picture can be displayed. Further, where such conversion is performed making use of a lookup table for which an IC memory or the like is used, high speed processing for reducing the number of colors can be performed.

Figure 2:
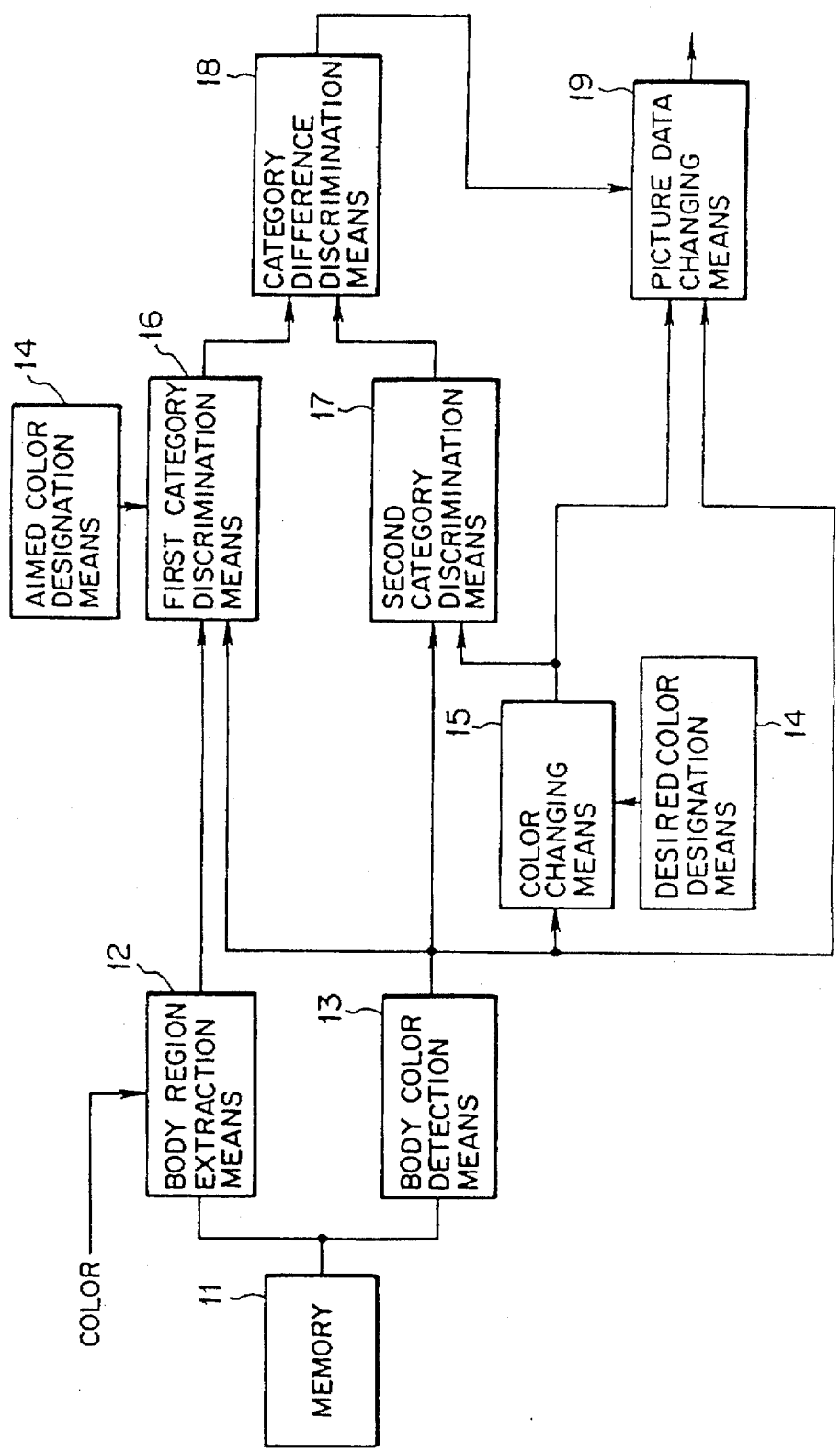

Referring now to FIG. 2, there is shown in block diagram a color picture processing apparatus according to a second aspect of the present invention. The color picture processing apparatus includes a memory 11 for storing inputted color picture data, body region extraction means 12 for extracting an arbitrary body region of a picture constructed from inputted color picture data designating a color, body color detection means 13 for detecting a color of a body, desired color designation means 14 for designating a desired color for a color change of a body, and color changing means 15 for changing the color of a body into a desired color for color change.

The color picture processing apparatus further includes first category discrimination means 16 for discriminating which one of a plurality of categories of color information based on categorical perception of human beings designated color or a derived body color or a desired color belongs, the categories being classified according to categorical human perception.

The color picture processing apparatus further includes second category discrimination means 17 for discriminating to which one of the plurality of categories of color information color picture data of a body region before or after a color change belongs, the categories being classified according to categorical human perception.

The color picture processing apparatus further includes category difference discrimination means 18 for discriminating whether the category of a designated color, a body color or a desired color and the category of color picture data discriminated by the first category discrimination means 16 and the second category discriminating means 17, respectively, are the same as or are different from one another.

The color picture processing apparatus further includes picture data changing means 19 for changing color picture data before or after a color change based on a result of discrimination by the category difference discrimination means 18.

When discrimination by the category difference discrimination means 18 of whether the categories of a body color and color picture data before a color change are the same as or are different from one another proves that the color picture data are partially different in category from the body color, the picture data changing means 19 may convert those color picture data which are different in category from the body color into color picture data of the same category as that of the body color. Then, when the color picture data which are different in category from the body color are converted into the color picture data of the same category as that of the body color, the picture data changing means 19 may change the color picture data so as to be positioned on a boundary of the category of the body color.

Or, when discrimination by the category difference discrimination means 18 of whether the categories of a body color and color picture data before a color change are the same as or are different from one another proves that the color picture data are partially different in category from the body color, the picture data changing means 19 may change all of the color picture data into color picture data of the same category as that of the body color. Then, when all of the color picture data are changed into color picture data of the same category as that of the body color, the picture data changing means 19 may first detect a straight line interconnecting the body color and each of the color picture data in a color space and then detect a crossing point between the straight line and a boundary of the category of the body color and also detect a distance between the crossing point and the color picture data, whereafter the picture data changing means 19 changes the positions of the color picture data in the color space in accordance with the positions of the body color and the individual color picture data so that the particular one of the color picture data whose distance is greatest among the distances may be included in the same category as that of the body color.

Otherwise, when discrimination by the category difference discrimination means 18 of whether the categories of a desired color and color picture data after a color change are the same as or are different from one another proves that the color picture data are partially different in category from the desired color, the picture data changing means 19 may change the color picture data which are different in category from the desired color into color picture data of the same category as that of the desired color. Then, when the color picture data which are different in category from the desired color are converted into the color picture data of the same category as that of the desired color, the picture data changing means 19 may change the color picture data so as to be positioned on a boundary of the category of the body color.

Otherwise, when discrimination by the category difference discrimination means 18 of whether the categories of a desired color and color picture data after a color change are the same as or are different from one another proves that the color picture data are partially different in category from the desired color, the picture data changing means 19 may change all of those color picture data which are different in category from the desired color into color picture data of the same category as that of the desired color. Then, when all of the color picture data are changed into color picture data of the same category as that of the desired color, the picture data changing means 19 may first detect a straight line interconnecting the desired color and each of those color picture data in a color space and then detect a crossing point between the straight line an a boundary of the category of the body color and also detect a distance between the crossing point and the color picture data, whereafter the picture data changing means 19 changes the positions of the color picture data in the color space in accordance with the positions of the desired color and the individual color picture data so that one of the color picture data whose distance is greatest among the distances may be included in the same category as that of the desired color.

In color picture processing apparatus according to the second aspect of the present invention described above with reference to FIG. 2, inputted color picture data are stored into the memory 11, and the body region extraction means 12 extracts an arbitrary body region of a picture construction from the inputted color picture data designating a color.

Meanwhile, the body color detection means 13 detects a body color of the body, and the desired color designation means 14 designates a desired color for a color change of the body. Consequently, the color changing means 15 changes the color of the body into the designated desired color.

Further, the first category discrimination means 16 discriminates to which one of a plurality of categories of color information the designated color, the derived body color or the desired color belongs, the categories being classified according to categorical human perception. Meanwhile, the second category discrimination means 17 discriminates to which one of the plurality of categories of color information the color picture data of the body region before or after the color change belongs, the categories being classified according to categorical human perception.

Then, the category difference discrimination means 18 discriminates whether the category of the designated color, the body color or the desired color and the category of the color picture data discriminated by the first category discrimination means 16 and the second category discrimination means 17, respectively, are same as or different from each other. The picture data changing means 19 thus changes the color picture data before or after the color change based on a result of the discrimination by the category difference discrimination means 18.

Further, when the discrimination by the category difference discrimination means 18 of whether the categories of the body color and the color picture data before the color change are same as or different from each other proves that the color picture data are partially different in category from the body color, the picture data changing means 19 may convert those color picture data which are different in category from the body color into color picture data of the same category as that of the body color. Further, when the color picture data which are different in category from the body color are converted into the color picture data of the same category as that of the body color, the picture data changing means 19 may change those color picture data so as to be positioned on a boundary of the category of the body color.

Or, when the discrimination by the category difference discrimination means 18 of whether the categories of the body color and the color picture data before the color change are the same as or are different from one another proves that the color picture data are partially different in category from the body color, the picture data changing means 19 may change all of the color picture data into color picture data of the same category as that of the body color. Further, when all of the color picture data are changed into color picture data of the same category as that of the body color, the picture data changing means 19 may first detect a straight line interconnecting the body color and each of the color picture data in a color space and then detect a crossing point between the straight line and a boundary of the category of the body color and also detect a distance between the crossing point and the color picture data, whereafter the picture data changing means 19 changes the positions of the color picture data in the color space in accordance with the positions of the body color and the individual color picture data so that one of the color picture data whose distance is greatest among the distances may be included in the same category as that of the body color.

Otherwise, when the discrimination by the category difference discrimination means 18 of whether the categories of the desired color and the color picture data after the color change are the same as or are different from one another proves that the color picture data are partially different in category from the desired color, the picture data changing means 19 may change the color picture data which are different in category from the body color into color picture data of the same category as that of the desired color. Then, when the color picture data which are different in category from the desired color are converted into the color picture data of the same category as that of the desired color, the picture data changing means 19 may change the color picture data so as to be positioned on a boundary of the category of the body color.

Otherwise, when the discrimination by the category difference discrimination means 18 of whether the categories of the desired color and the color picture data after the color change are the same as or are different from one another proves that the color picture data are partially different in category from the desired color, the picture data changing means 19 may change all of those color picture data which are different in category from the desired color into color picture data of the same category as that of the desired color. Further, when all of the color picture data are changed into color picture data of the same category as that of the desired color, the picture data changing means 19 may first detect a straight line interconnecting the desired color and each of those color picture data in a color space and then detect a crossing point between the straight line and a boundary of the category of the body color and also detect a distance between the crossing point and the color picture data, whereafter the picture data changing means 19 changes the positions of the color picture data in the color space in accordance with the positions of the desired color and the individual color picture data so that the color picture data whose distance is greatest among the distances may be included in the same category as that of the desired color.

Accordingly, with the color picture processing apparatus according to the second aspect of the present invention, since color picture data before or after a color change can be changed based on a result of discrimination in category, there is an advantage in that the picture quality can be improved by reducing noise in the data of a body picture of an object of the color change or by reducing noise expanded by the color change.

Further, with the color picture processing apparatus, since color picture data before a color change can be changed by the picture data changing means 19, data of irregular colors arising from noise in the body can be reduced with a minimum amount of a change of the data, and as a result, such a noise as will degrade the picture quality after the color change does not appear and a color change of a high quality can be realized.

Furthermore, with the color picture processing apparatus, since color picture data before a color change can be changed by the picture data changing means 19, those data outside a category can be eliminated without any change in relative positional relationship of the entire picture data, and the resulting data do not include such data as may possibly have a bad influence on the picture quality as a result of the color change. Accordingly, the influence of the change of data upon the picture quality can be reduced remarkably.

Further, with the color picture processing apparatus, since color picture data after a color change can be changed by the picture data changing means 19, data of irregular colors arising from noise in the body after the color change can be removed with a minimum amount of a change of the data, and a result, the picture quality after the color change can be improved.

Furthermore, with the color picture processing apparatus, since color picture data after a color change can be changed by the picture data changing means 19, those data outside a category can be eliminated without any change in relative positional relationship of the entire picture data, and the resulting data do not include such data as may possibly have a bad influence on the picture quality as a result of the color change. Accordingly, the influence of the change of data upon the picture quality can be reduced remarkably.

Figure 3:
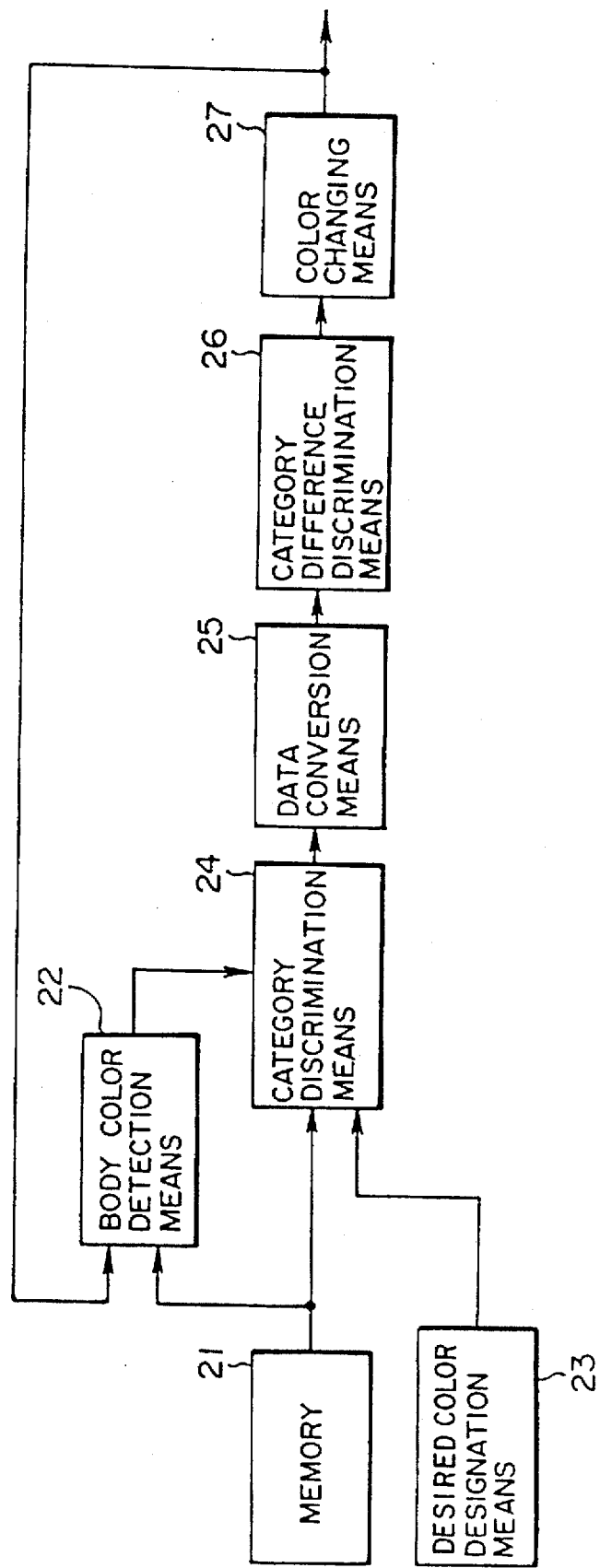

Referring now to FIG. 3, there is shown in block diagram a color picture processing apparatus according to a third preferred embodiment of the present invention. A color of an arbitrary body region in a color picture is changed by changing a position of data indicating the body region in a color space.

The color picture processing apparatus includes a memory 21 for storing body region data, body color detection means 22 for detecting a body color of body data, desired color designation means 23 for designating a desired color for a color change of body data, and category discrimination means 24 for discriminating to which one of a plurality of categories of color information body color data indicating the body region before and after a color change and desired color data belong, the categories being classified according to categorical human perception.

The color picture processing apparatus further includes data conversion means 25 for converting data so as to have color information discriminated by the category discrimination means 24.

The color picture processing apparatus further includes category difference discrimination means 26 for discriminating whether or not data obtained by conversion by the data conversion means 25 and indicating a body region before and after a color change belong to the same category.

The color picture processing apparatus further includes color changing means 27 for changing the position of data in a color space based on a result of discrimination by the category difference discrimination means 26 to change the color of a body.

The category difference discrimination means 26 may include derived color category detection means for detecting a category of a derived color derived from a body region, desired color category detection means for detecting a category of a desired color designated as a color to be desired for a color change, and category comparison means for comparing the categories of a derived color and a desired color detected by the derived color category detection means and the desired color category detection means with one another.

The color space may be constructed as a space which can be represented in brightness, saturation and hue, and the color changing means 27 may include means for changing a value of at least one of the brightness, the saturation and the hue.

In this instance, the color changing means 27 may include means for rotationally moving, when the categories of the body color and the desired color are the same, a distribution of the data in the color space around a center provided by a straight line representing achromatic colors while maintaining a positional relationship of the data with respect to a plane which includes the straight line representing the achromatic colors and a point of the derived color, and means for rotationally moving, when the categories of the body color and the desired color are different from one another, the distribution of the data in the color space around the straight line while reversing the distribution of the data with respect to the plane.

Further, in this instance, the color changing means 27 may include means for performing data decompression processing or data compression processing of data in a color space in the direction of the brightness to change the value in brightness, means for performing data decompression processing or data compression processing of data in a color space in the direction of the saturation to change the value in saturation, or means for performing data rotation processing of data in a color space around a straight line representing achromatic colors to change the value in hue.

In the color picture processing apparatus according to the third aspect of the present invention described hereinabove with reference to FIG. 3, the body color detection means 22 detects a body color of body data based on body region data stored in the memory 21. Then, the category discrimination means 24 discriminates which one of a plurality of categories of color information the body color data from the body color detecting means 22 indicating the body region before and after a color change and desired color data for a color change designated by the desired color designation means 23 belong, the categories being classified according to categorical human perception.

Then, the data conversion means 25 converts the data so as to have color information discriminated by the category discrimination means 24, and the category difference discrimination means 26 discriminates whether or not the data obtained by the data conversion means 25 and indicating the body region before and after the color change belong to the same category.

Consequently, the color changing means 27 changes the position of the data in the color space based on a result of the discrimination by the category difference discrimination means 26 to change the color of the body. In short, the color of an arbitrary body region in a color picture is changed by changing the position of data indicating the body region in a color space.

Further, in the category difference discrimination means 26, the derived color category detection means detects a category of a derived color derived from the body region, and the desired color category detection means detects a category of the desired color designated as a color to be desired for a color change. Further, the category comparison means compares the categories of the derived color and the desired color detected by the derived color category detection means and the desired color category detection means with one another to discriminate whether the data indicating the body region before and after the color change belong to the same category.

The color space may be constructed as a space which can be represented in brightness, saturation and hue, and the color changing means 27 may change the value of at least one of the brightness, the saturation and the hue.

In particular, the color changing means 27 may rotationally move, when the categories of the body color and the desired color are the same, the distribution of the data in the color space around a center provided by a straight line representing achromatic colors while maintaining the positional relationship of the data with respect to a plane which includes the straight line representing the achromatic colors and a point of the derived color, but rotationally move, when the categories of the body color and the desired color are different from one another, the distribution of the data around the straight line while reversing the distribution of the data with respect to the plane.

Further, in this instance, the color changing means 27 may perform data decompression processing or data compression processing of the data in the color space in the direction of the brightness to change the value in brightness, or perform data decompression processing or data compression processing of the data in that color space in the direction of the saturation to change the value in saturation, or else perform data rotation processing of the data in the color space around the straight line representing the achromatic colors to change the value in hue.

With the color picture processing apparatus according to the third aspect of the present invention, since the positions of data in a color space can be changed based on a result of discrimination by the category difference discrimination means 26, even when the color of the body which is influenced by unexpected reflection or the like is to be changed, the effect of the reflection can be maintained. Consequently, there is an advantage in that a natural result conforming to the sensations of human beings can be obtained.

B. Colors Based on Categorical Perception of Human Beings

Before several embodiments of the present invention are described, colors based on categorical perception of human beings applied in the present invention will first be described with reference to FIGS. 5(a) to 7(b).

In particular, colors based on categorical perception have been advocated in Uchikawa, "Categorical Perception and Storage of Colors", Draft for the Seventh Color Optics Conference, 1990, pp. 7–14, Uchikawa et al., "Categorical Color Name Regions of Color Space in Aperture Color and Surface Color Modes", Journal of the Illumination Society of Japan, Vol. 77, No. 6, 1993, and "Categorical Color Perception of Japanese Observers: Comparison with that of Americans", Vision Res., 27, 1987, pp.1825–1833.

According to the colors based on categorical perception of human beings mentioned above, a human being perceives all colors in at most approximately 10 to 12 different classified colors. For example, a weak red, a deep red and a somewhat yellowish red are all classified and perceived as red by a human being.

More particularly, FIGS. 5(a) to 7(b) illustrate different examples of classification of an xy chromaticity diagram at different brightness values (luminance 2 to 40 cd/m$^2$). The examples of classification illustrated in FIGS. 5(a) to 7(b) are based on sensations to all colors measured in examinations conducted for a plurality of human beings are test subjects.

Here in FIGS. 5(a), 5(b), 6(a), 6(b), 7(a) and 7(b) illustrate classifications on a chromaticity diagram when the luminance is 2 cd/m$^2$, 5 cd/m$^2$, 10 cd/m$^2$, 20 cd/m$^2$, 30 cd/m$^2$ and 40 cd/m$^2$, respectively.

Further, colors perceived by the test subjects, that is, red, pink, purple, blue, gray, white, green, yellow and orange, are represented by symbols of a blank square, a blank triangle, a blank diamond, a marked circle, a screened circle, a blank circle, a marked diamond, a screened square and a marked triangle, respectively.

Furthermore, each symbol of a larger size represents that there is no difference in perception among the test subjects, all of the test subjects have an identical sensation to the color (coincidence degree: 100%), and each symbol of a smaller size represents that the coincidence degree in perception of the color among the test subjects is 50%, that is, one half of the test subjects have an identical sensation to the color.

As seen from FIGS. 5(a) to 7(b), colors included in an area of a same symbol are all perceived as a single color by human beings. Further, it can be seen that sensations of human beings to colors exhibit little difference among individuals and exist stably. In this manner, it is experimentally proved that a human being feels all colors are such approximately 10 to 12 different colors, as mentioned above.

Further, while each color exhibits a greater degree of clarity toward the outside of the triangle in each of FIGS. 5(a) to 7(b), the clarity in color has little relationship to the perception in color of human beings as seen from FIGS. 5(a) to 7(b). In other words, human beings are inclined to perceive colors having different degrees of clarity (colors near to the center and colors near to an outer periphery of the triangle in each of FIGS. 5(a) to 7(b) as colors which belong to the same categories.

C. First Embodiment

In the following, a first embodiment of the present invention will be described with reference to the drawings.

c0. General Construction of Color Picture Processing Apparatus

Figure 4:
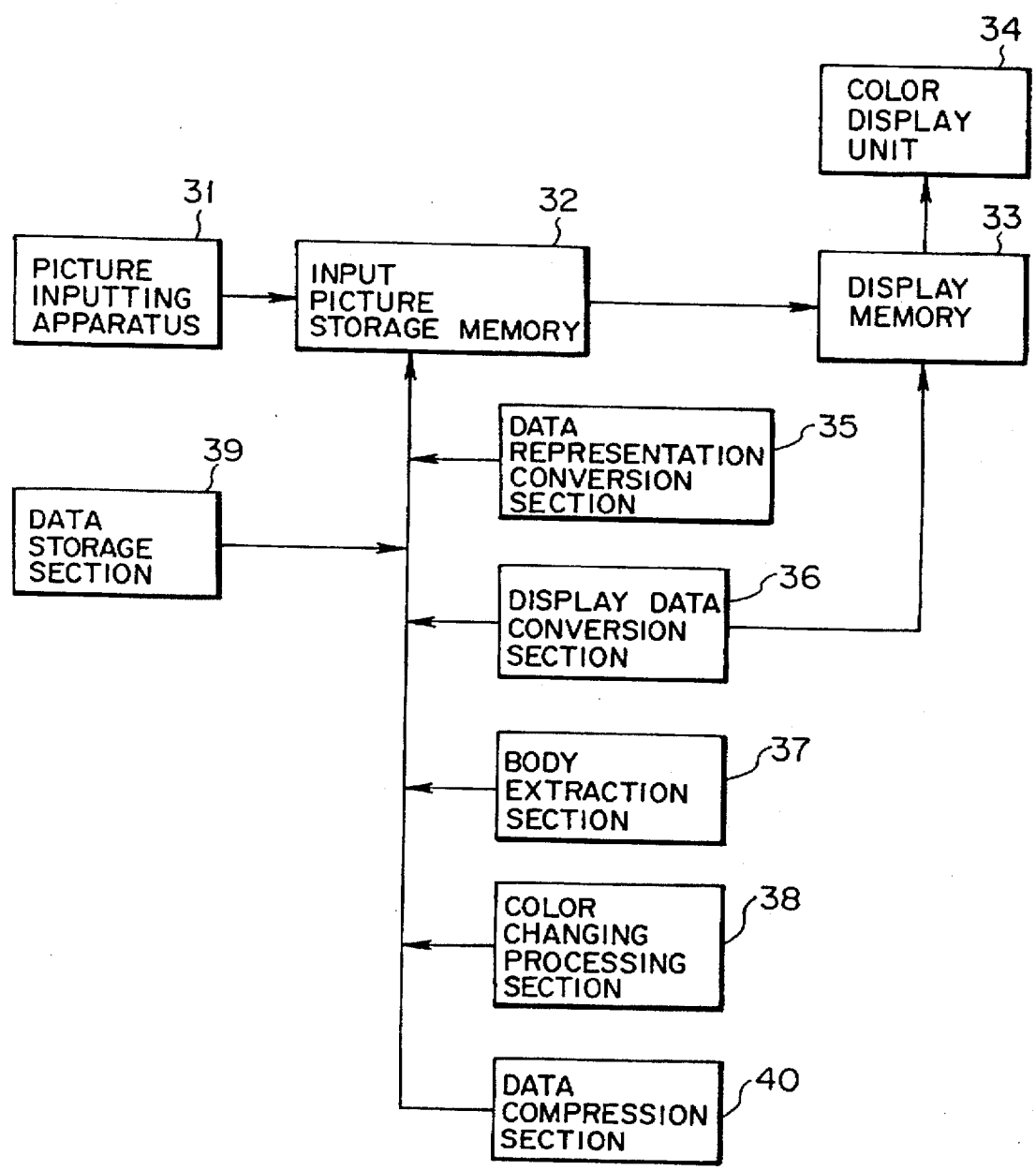
FIG. 4 is a block diagram of a color picture processing apparatus showing a first preferred embodiment of the present invention.
Figures 5A, 5B:
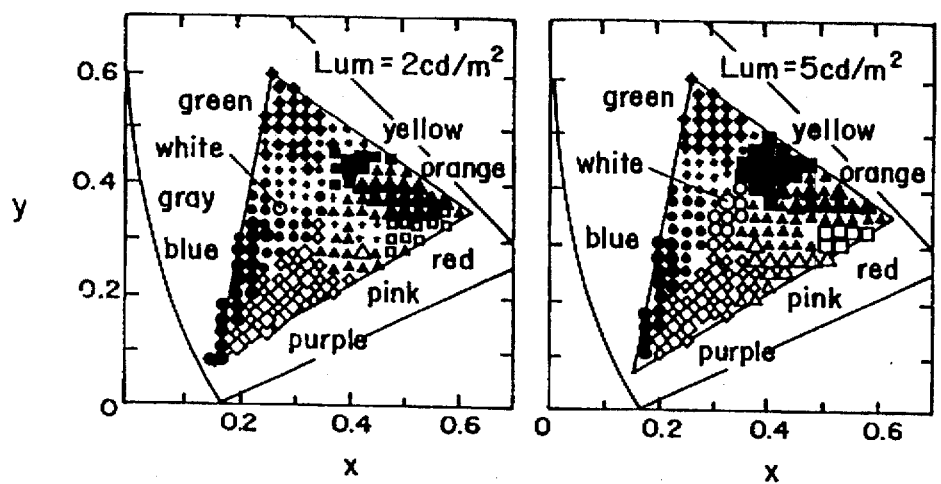
Figures 7A, 7B:
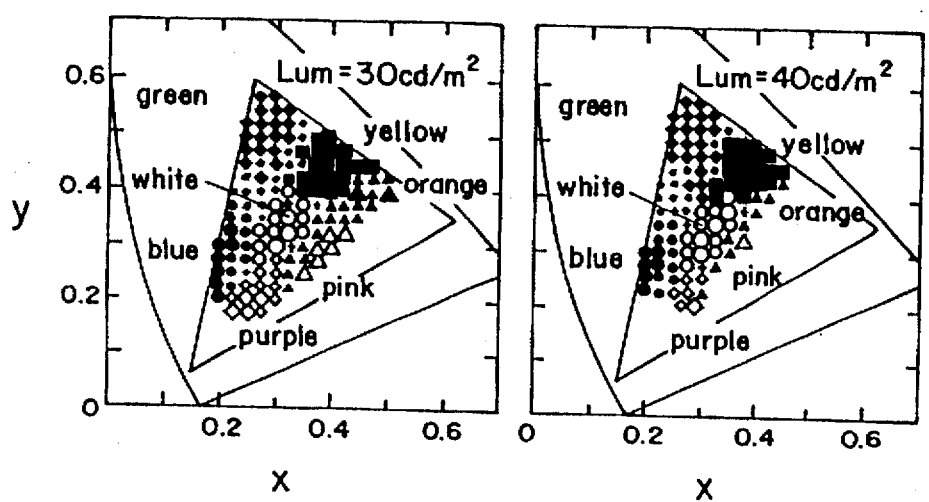

Referring now to FIG. 4, there is shown in block diagram a color picture processing apparatus according to the first preferred embodiment of the present invention. The color picture processing apparatus shown includes a picture inputting apparatus (color picture data inputting means) 31 constituted from, for example, an image scanner for digitizing a natural picture of a color picture to obtain RGB data to input color picture data.

The color picture processing apparatus further includes an input picture storage memory 32 for temporarily storing color picture data inputted from the picture inputting apparatus 31.

The color picture processing apparatus further includes a display memory 33 for receiving from the input picture storage memory 32 and storing color picture data to be displayed on a color display unit 34 such as a CRT (cathode ray tube).

The color picture processing apparatus further includes a data representation conversion section (category discrimination means, picture data conversion means) 35 for receiving color picture data from the input picture storage memory 32 and discriminating to which one of categories of color information the color picture data belong and further converting the color picture data so that they may have color information on the thus discriminated category, the categories being classified according to categorical human perception.

In particular, the data representation conversion section 35 discriminates each of the color picture data with regard to which one of color codes of a plurality of categories of color information the color picture data belongs, the categories being classified according to categorical human perception, and converts the color picture data into data represented by the color code of the category obtained by the discrimination and a deviation of the color of the color code from a representative color of the category or a like parameter.

The color picture processing apparatus further includes a body extraction section (region extraction means) 37 for specifying and extracting a partial region of a picture to be constructed from color picture data after conversion into color information based on the categorical perception by the data representation conversion section 35. In other words, the body extraction section 37 can extract an arbitrary region of a body in a picture.

The color picture processing apparatus further includes a color changing processing section (color variation means) 38 for varying some or all colors of a picture constructed from color picture data after conversion into color information based on the categorical perception. In other words, the color changing processing section 38 can perform processing of combining an arbitrary body region extracted by the body extraction section 37 with another background picture or can vary the color of such arbitrary body region to an arbitrary color.

The color picture processing apparatus further includes a data compression section (data compression means) 40 for compressing color picture data after conversion into color information based on the categorical perception to reduce the data amount.

The color picture processing apparatus further includes a display data conversion section (picture displayable data conversion means) 36 for receiving color picture data after conversion into color information based on the categorical perception and converting the color picture data into RGB data in accordance with information from a data storage section 39. Further, the RGB data obtained by the conversion are displayed on the color display unit 34 through the display memory 33.

The data storage section 39 mentioned above is constituted from a hard disk or the like and stores information representing a corresponding relationship between color information based on the categorical perception and picture displayable data (RGB data) which can be inputted to the color display unit 34 as well as color picture data after conversion into color information based on the categorical perception by the data representation conversion section 35, body region information extracted by the body extraction section 37, color change information from the color changing processing section 38 and data compression information from the data compression section 40.

c1. Discrimination of Color Information and Conversion of Color Picture Data

Discrimination of color information based on the categorical perception of human beings with regard to color picture data and conversion of color picture data having discriminated color information, which are performed by the data representation conversion section 35, will be described below.

A lookup table for detecting a color code of a category from XYZ values is produced, for example, in accordance with FIGS. 5(a) to 7(b). Then, picture data from the input picture storage memory 32 are converted from data of the RGB type into such XYZ and x, y data as seen in FIGS. 5(a) to 7(b) and discriminates a color of the categorical perception by referring to the values obtained by the conversion and the lookup table produced in advance as described above.

It is to be noted that the conversions from RGB data into XYZ data and x, y data are performed making use of expressions (3) and (4) given below which are prescribed by the CIE (International Illumination Committee).

$$\begin{bmatrix} X \\ Y \\ Z \end{bmatrix} = \begin{bmatrix} 2.7689 & 1.7517 & 1.1302 \\ 1.0000 & 4.5907 & 0.0601 \\ 0.0000 & 0.0565 & 5.5943 \end{bmatrix} \begin{bmatrix} R \\ G \\ B \end{bmatrix} \quad (3)$$

$$x=X/(X+Y+Z), \quad y=Y/(X+Y+Z) \quad (4)$$

Further, the distance and the direction from a representative color of the category to the color in the XYZ color space is calculated. Such representative color is set to data whose color is regarded as the same color by almost all people (for example, data whose color is regarded as "red" by most all people). For example, a representative color is set to data of a color in the proximity of the center of a region of a certain color shown in any of FIGS. 5(a) to 7(b).

Or, colors prescribed in JIS, values of the colors in the XYZ color representation system (JIS-8102 Color Names of Body Colors, JIS-Z8721 Color Representation Method Based on Three Attributes) and so forth can be used as names of red, blue and so forth. For example, according to a table of JIS, the value of red is, in terms of (Y, x, y), (12.0, 0.5385, 0.3129) (it is to be noted that this is data in the table of JIS which is nearest to the value 4R4/11 of 5R4/12). The following conversion expression is used to represent the data in the RGB data form:

$$\begin{bmatrix} R \\ G \\ B \end{bmatrix} = \begin{bmatrix} 0.41844 & -0.15866 & -0.08283 \\ -0.09117 & 0.25242 & 0.01570 \\ 0.00092 & -0.00255 & 0.17858 \end{bmatrix} \begin{bmatrix} X \\ Y \\ Z \end{bmatrix} \quad (5)$$

Figures 8A, 8B, 8C:
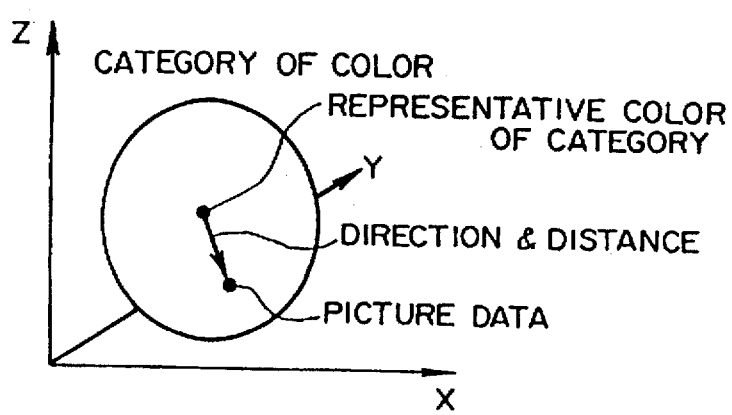
FIGS. 8(a) to 8(c) are diagrammatic views showing examples of a representation of picture data employed in color picture processing apparatus shown in FIG.4.

Using a color code, a direction and a distance of color picture data obtained in such a manner as described above, the color picture data can be converted by representing them, for example, in such a manner as seen in FIGS. 8(a) to 8(c).

In particular, FIGS. 8(a) to 8(c) illustrate examples of representation of picture data in accordance with region (categorical color name region) division based on the categorical perception of human beings illustrated in FIGS. 5(a) to 7(b).

More particular, FIG. 8(a) illustrate picture data represented by a code of only 4 bits (divided into 11 colors of red, green, yellow, brown, blue, purple, orange, pink, whim, black and gray) in a categorical color name region.

Meanwhile, FIG. 8(b) illustrates picture data presented by a color code as well as deviation information (parameter) of a direction and deviation information (parameter) of a distance from a representative color of the category from object picture data. In the picture data illustrated in FIG. 8(b), both of the deviation information of the direction and the deviation information of the distance are constituted from 4 bits such that a picture element is represented by totaling 12 bits together with the color code. For example, the deviation information of the direction can be represented by 4 bits by dividing all directions into 16 directions.

It is to be noted that, for the deviation information of the direction and the deviation information of the distance described hereinabove with reference to FIG. 8(b), for example, deviation information of a direction and deviation information of a distance from a representative color of a category to picture data represented in such a XYZ color representation system illustrated in FIG. 8(c) is used.

Accordingly, the data representation conversion section 35 can function not only as means for converting color picture data using codes of colors classified based on the categorical perception but also as means for converting color picture data using combination information of a code of a color and a deviation of a color picture from a representative color of a category to which the color picture belongs.

c2. Discrimination of Color Information of Picture Data in Boundary Region

Figure 9A:
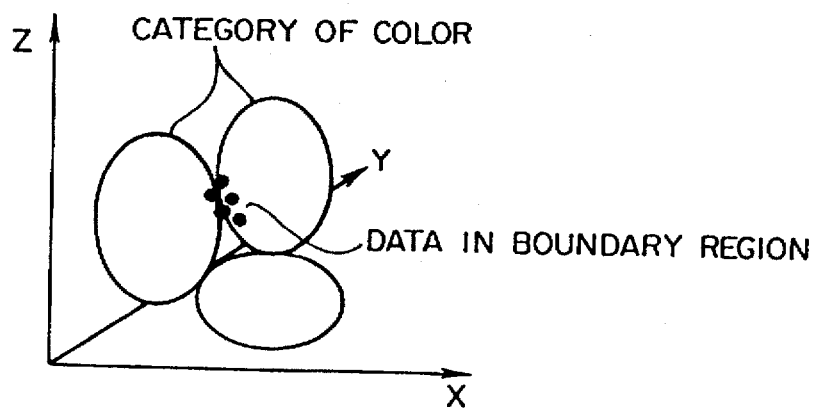
FIGS. 9(a) and 9(b) are diagrammatic views illustrating a procedure of deciding a category when picture data in the color picture processing apparatus shown in FIG. 4 comes in a boundary region of a category.

While picture data are converted into XYZ values by the data representation conversion section 35 as described hereinabove, where some picture data comes to a boundary region between categories in the XYZ color representation system as shown, for example, in FIG. 9(a), categories of picture elements around the object picture element of the original picture are detected, and a category to which the object picture element of the picture data belongs is determined based on a result of the detection.

Figure 9B:
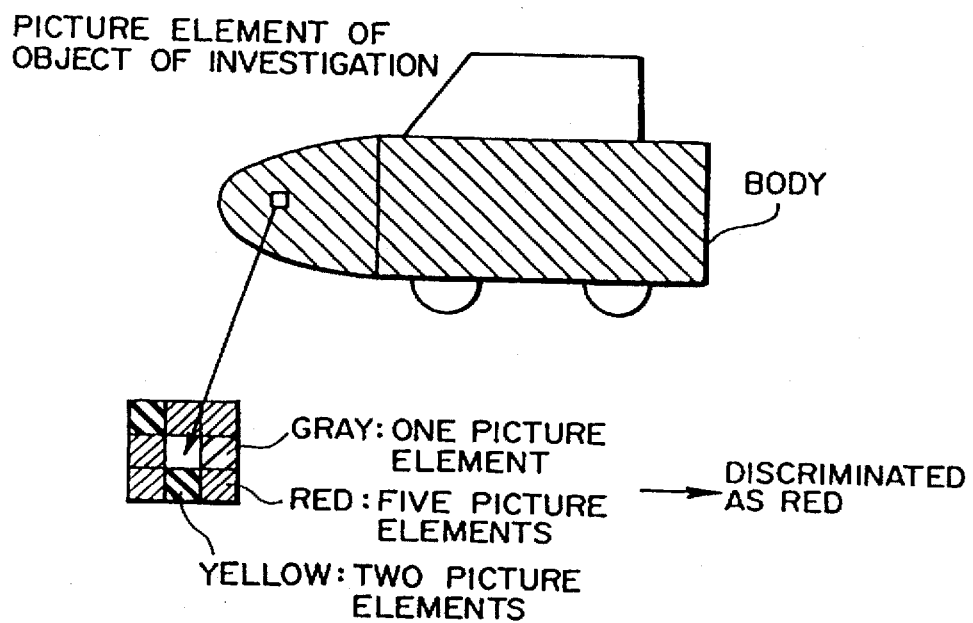

In particular, it is assumed that the color in a same body region in a picture, that is, the color of an object picture element for detection, may be considered to be approximately the same as the color of picture elements around the object picture element as seen in FIG. 9(b). Accordingly, as seen from, for example, FIG. 9(b), colors totaling nine picture elements including an object picture element and eight picture elements around the object picture element are detected, and one of the colors which appears most frequently is determined as the color of the object picture element for detection. For example, if the color of six picture elements is red, the color of two picture elements is yellow and the color of one picture element is gray, then the color of the object picture element is determined to be red.

In other words, when color picture data of an object picture element belongs to a boundary region between categories, the data representation conversion section 35 detects categories of colors of picture elements around the object picture element, counts the numbers of same categories and determines one of the categories, which exhibits the highest count value, as a category of the color picture data of the object picture element which belongs to the boundary region.

It is to be noted that the discrimination method for color information of picture data described above with reference to FIGS. 9(a) and 9(b) can also be applied to remove noise from picture data which may not be in a boundary region.

c3. Extraction Processing of Body Regions

Figure 10:
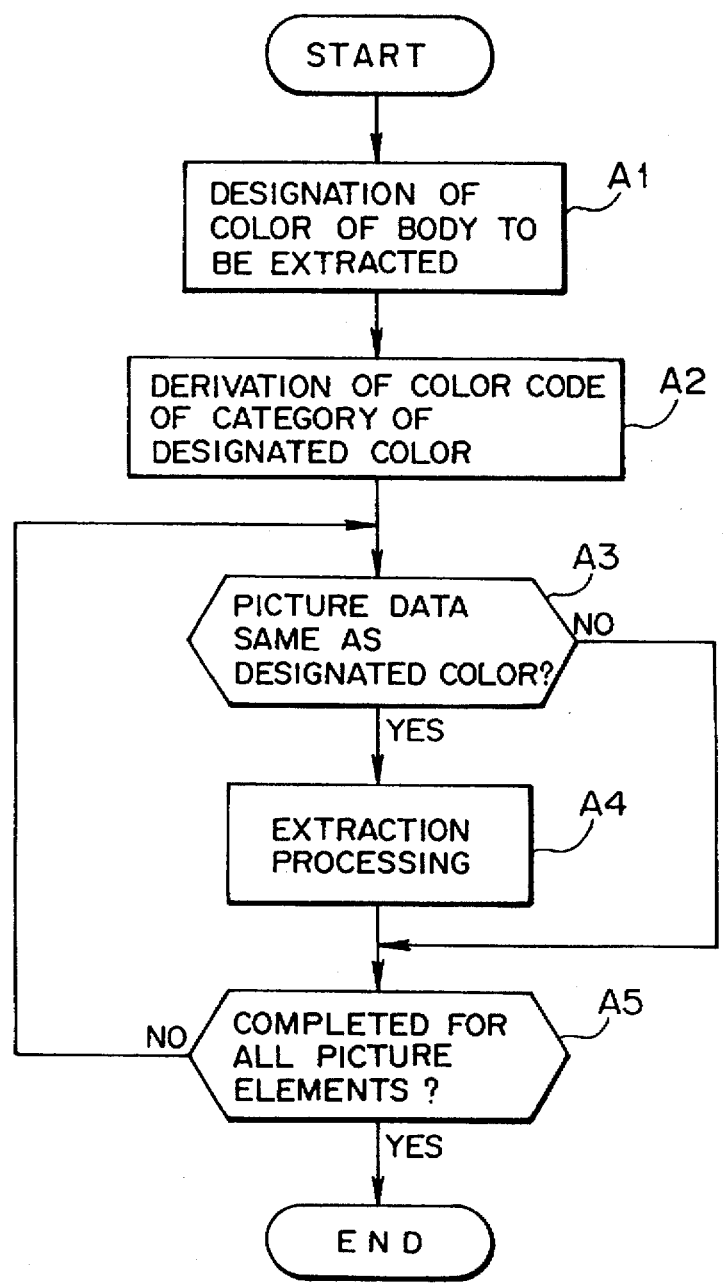
FIG. 10 is a flow chart illustrating a procedure of specifying the extracting a partial region of a picture constructed from color picture data in the color picture processing apparatus shown in FIG. 4.

Subsequently, processing performed by the body extraction section 37 to specify and extract a partial region of a picture constructed from color picture data after conversion will be described in detail with reference to a flow chart of FIG. 10.

First, a color of a body to be extracted from picture data (each in the form of a color code, and a direction and a distance of the color from a representative color of a category) after conversion inputted from the data representation conversion section 35 will be designed (step A1). For example, when it is intended to extract only a body of a red automobile from the background of a forest (green of leaves or brown of trees), red is designated. This designation may be performed by way of a keyboard by an operator or by pointing the body of the automobile displayed on a screen using a mouse or a similar apparatus. The body extraction section 37 detects a color code of the category of red in response to the designation of the color of the body to be extracted (step A2).

Subsequently, the picture data are successively extracted, for example, in such a manner that they are extracted from a line in a horizontal direction beginning with the left upper corner and, after an end of the line is reached, they are extracted from a next line in the horizontal direction beginning with the left end of the next line, and then it is discriminated whether or not each of the color codes of the thus extracted data is the same as the color code of red (step A3). If the color code of the data is the same as the color code of red, then the picture element is extracted (from the YES route at step A3 to step A4), but if the color code of the data is not the same as the color code of red, then the picture element is not extracted (NO route at step A3), and a next picture element is investigated (NO route at step A5). The sequence of operations described above is performed for the entire picture, that is, for all of the picture elements (steps A3 to A5) to extract only the red body of the automobile. Once the sequence is performed for the last picture element the sequence ends (YES route at step A5).

Accordingly, the body extraction section 37 described above functions as a color designation means for designating a color of a body region to be specified in a picture, and also function as a comparison means for comparing the colors of picture elements of color picture data with a color designated by the color designation means, and further functions as a means for determining that a picture element constitutes the region to be specified if a result of the comparison by the comparison means proves that the color of the picture element of the color picture data is the same as the designated color.

c4. Color Changing Processing

Subsequently, processing performed by the color changing processing section 38 to change some or all colors of a picture constructed from color picture data after conversion will be described with reference to FIGS. 11 and 12.

Figure 11:
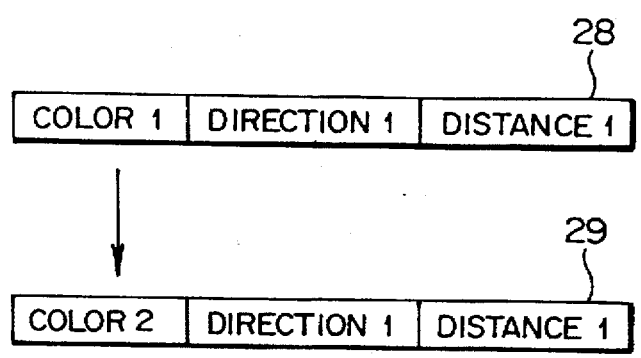
FIGS. 11 and 12 are diagrammatic view and a flow chart, respectively, illustrating a process of changing some or all colors of a picture constructed from color picture data in the color picture processing apparatus shown in FIG. 4.
Figure 12:
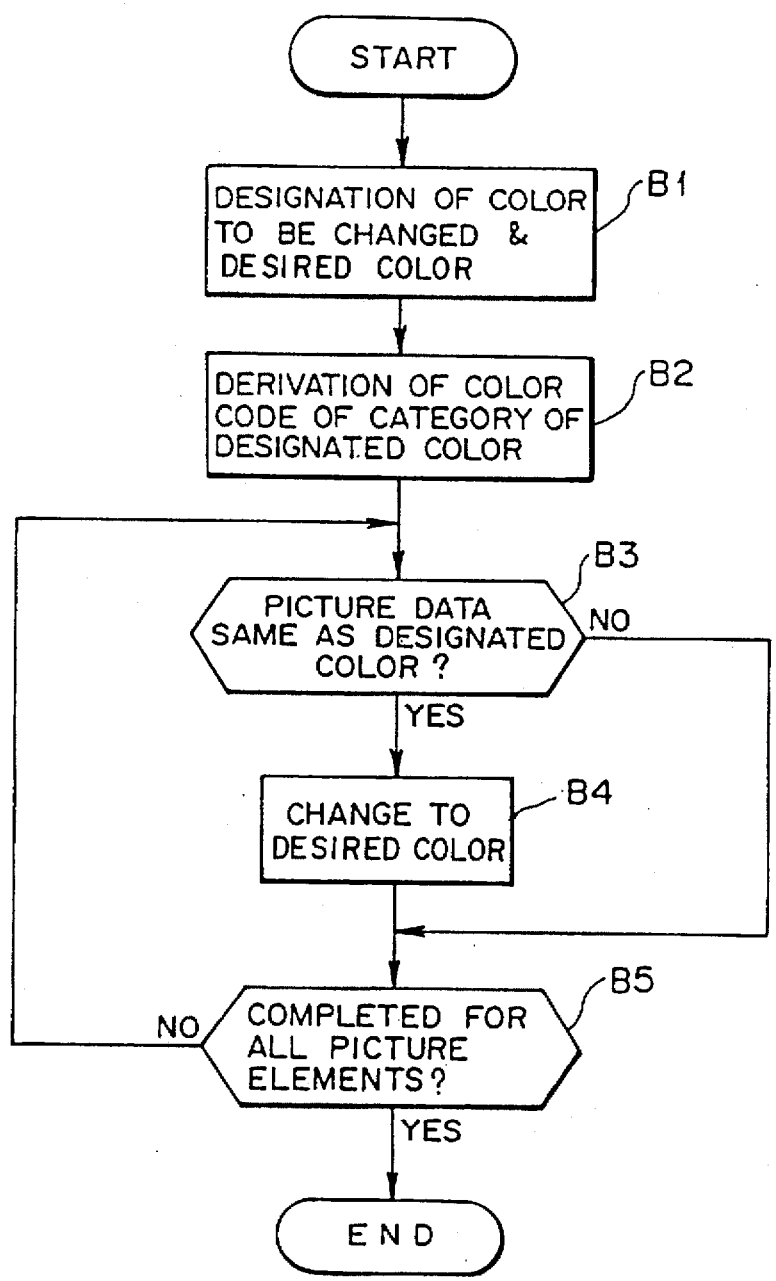

The color changing processing section 38 changes a color by changing, for example, where picture data 28 inputted from the color changing processing section 38 represents color 1, direction 1 and distance 1 as seen in FIG. 11, the picture data 28 to picture data 29 which represents color 2, direction 1 and distance 1. Consequently, calculation processing to vary a vector in a color space as is required for a reflection model is unnecessary.

In the following, processing of changing the color of a particular region by the color changing processing section 38 will be described in detail with reference to a flow chart of FIG. 12.

First, with regard to picture data each represented by a color code based on the categorical perception and a direction and a distance from the color of the color code to a representative color of the category, the color of a body to be changed and a desired color after change are designated (step B1). For example, when it is attempted to change the color of a body of a red automobile on the background of a forest (green of leaves or brown of trees) to blue, red and blue are designated. The designation may be performed by way of a keyboard by an operator or by pointing the body of the automobile displayed on a screen using a mouse or a like apparatus. In response to the designation, color codes of red and blue are determined (step B2).

Subsequently, the picture data are successively extracted, for example, in a manner such that they are extracted from a line in a horizontal direction beginning with the left upper corner and, after an end of the line is reached, they are extracted from a next line in the horizontal direction beginning with the left end of the next line, and then it is discriminated whether or not each of the color codes of the thus extracted data is the same as the color code of red (step B3). If the color code of the data is the same as the color code of red, then the color code of the picture element is changed to the other color (blue) designated separately in such a manner as described above with reference to FIG. 11 (from the YES route at step B3 to step B4).

However, when the color code is not the same as the color code of red, the color changing processing for the picture element is not performed for the data (NO route at step B3), and similar processing is performed for a next picture element (NO route at step B5).

The sequence of operations described above is performed for the last picture, that is, for all of the picture elements (step B3 to B5) so that only the color of the red body of the automobile can be changed. Once the sequence is performed for the last picture element, the sequence ends (YES route at step B5). Consequently, color changing processing can be realized only based on discrimination regarding a code of a color represented by picture data (discrimination whether or not the color is the same as the designated color) without the necessity for extraction of a body.

It is to be noted that, also where it is instructed, in the color changing processing described above, to change the direction and the distance from a representative color of the category other than the color code, similar changing processing can be performed.

Accordingly, the color changing processing section 38 functions as a means for changing a color parameter having information of at least one of a code of a color classified based on the categorical perception and a deviation (in direction and distance) of color picture data from a representative color of a category to which the color picture data belongs.

c5. Combination Processing of Conversion of Color Picture and Data compression

While the data representation conversion section 35 performs discrimination of color information based on the categorical perception of human beings with regard to color picture data and conversion of the color picture data having the thus discriminated color information as described above in sections c1 and c2, the data compression section 40 can further compress the color picture data after such conversion.

Figure 13:
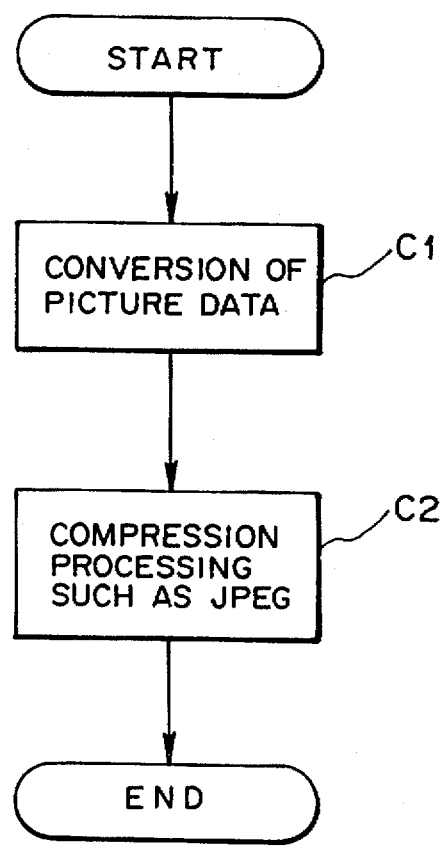
FIG. 13 is a flow chart illustrating a compression procedure of the color picture processing apparatus shown in FIG. 4.

In particular, conversion of color picture data by the data representation conversion section 35 and compression processing for decreasing the amount of data such as, for example, a JPEG by the data compression section 40 can be combined with each other as seen from a flow chart shown in FIG. 13.

Referring to FIG. 13, picture data are converted with color information based on the categorical perception using such a method as described hereinabove in section c1 or c2 by the data representation conversion section 35 (step C1), and then the amount of data which has been reduced by such conversion is further reduced by performing compression processing such as a JPEG by the data compression section 40 (step C2).

c6. Conversion Processing of Color Picture Data Represented by Data Representation Conversion Section into RGB Data In the following, processing of converting data represented in a color code based on the categorical perception and/or a direction and a distance from a representative color of a category by the data representation conversion section 35 into RGB data or the like to be displayed on a display unit or a like apparatus by the display data conversion section 36 will be described with reference to FIGS. 14(a) to 14(b).

In particular, the display data conversion section 36 includes a table 36A which describes a corresponding relationship between color codes based on the categorical perception and RGB data of representative colors of categories as seen in FIG. 14(a) and includes another table 36B which describes, for each category, a corresponding relationship between deviations (direction and distance) from a representative color of the category and RGB data as seen in FIG. 14(b).

Thus, the display data conversion section 36 can detect, when picture data are inputted from the data representation conversion section 35, RGB data to be displayed on a display unit making use of the tables 36A and 36B described above so that the picture data can be displayed as a picture on the color display unit 34.

It is to be noted that, in the tables 36A and 36B, the representative color of each category may be a color at the center of the category region shown in any of FIGS. 5(a) to 7(b) or a color prescribed in JIS.

Meanwhile, if only such a table 36A for colors as seen in FIG. 14(a) is selectively used from between the two tables 36A and 36B to display a picture, then a picture which conforms to the sensations of human beings to colors can be represented with a small amount of data for approximately twelve colors (4 bits). Further, if such a table 36B for deviations between colors and representative colors as shown in FIG. 14(b) is selectively used display a picture, RGB data approximately equivalent to an original picture can be obtained, and consequently, a display of a high picture quality can be obtained.

Accordingly, the tables 36A and 36B function as means for indicating a corresponding relationship between color information based on the categorical perception and picture displayable data which can be inputted to the color display unit 34. Consequently, the display data conversion section 36 can convert picture data after conversion into picture displayable data using the tables 36A and 36B.

In this manner, with the color picture processing apparatus according to the first embodiment of the present invention, since a classification of colors based on the categorical perception of human beings is utilized for representation of picture data, the color picture processing apparatus is advantageous in that the amount of picture data can be reduced without degrading the picture quality while conforming the sensations of human beings, and extraction of a body, a change of a color, reduction of the number of colors and so forth can be readily performed. The color picture processing apparatus is advantageous also in that the amount of data can be further reduced without degrading the picture quality by making use of a data compression technique such as a JPEG.

Further, since a color as picture data can be represented in four bits in the minimum by the data representation conversion section 35, colors conforming to the sensations of human beings can be represented with an amount of data reduced by ⅙ compared with that of the RGB representation in which picture data are represented in 24 bits in which individual 8 bits represent different colors. Consequently, handling of a picture with a higher efficiency can be realized.

Furthermore, since data can be converted by referring to a lookup table in which the relationships among picture data and colors based on the categorical perception, representative colors of the individual categories, and deviations (direction, distance and so forth) from the representative colors are stored, the conversion processing can be performed at a higher speed than that by conversion which is based on software or the like, and consequently, a remarkable increase in processing speed can be realized.

Meanwhile, when color picture data of an original picture element belongs to a boundary of a category of a color, the data representation conversion section 35 investigates categories of picture elements around the original picture element and determines a color which appears most frequently at the picture elements around the original picture elements as the color of the object of investigation. Consequently, a color in a boundary region which cannot be classified readily when picture data are represented using colors based on the categorical perception can be determined with certainty. As a result, there is an advantage in that picture data of a high picture quality in accordance with which no such situation that a different color such as a color of noise appears in one body occurs can be obtained.

Further, since region extraction processing of a body by the body extraction section 37 can be performed only by determination regarding a code of a color of picture data (whether or not the color is the same as a designated color), processing conforming to the sensations of human beings can be performed at a higher speed than that by another method which is based on manual operation or which makes use of the hue.

Furthermore, since color changing processing by the color changing processing section 38 can be realized based only on determination regarding a code of a color of picture data (whether or not the color is the same as the designated color) without the necessity of extraction of the color of a body, the color picture processing apparatus is advantageous also in that calculation processing for changing a vector in a color space is unnecessary and the processing time for changing a color is reduced as much, and high speed processing conforming to the sensations of human beings can be performed.

Further, since data compression processing of color picture data after conversion into color information based on the categorical perception is performed by the data compression section 40, the amount of data can be further reduced. Such compressed data provides an advantage in that the capacity of a hard disk or a like storage medium required to store data can be reduced, and in transmission which makes use of a channel, the communication time can be reduced.

Further, if the table 36A is selected to display a picture, a picture which conforms to the sensations of human beings to colors can be represented with a small amount of data for approximately 12 colors (4 bits), and as a result, there is an advantage in that, compared with a display of, for example, 256 colors, the amount of data can be reduced by one half, and the memory for display data can be greatly reduced.

Furthermore, if the table 36B for deviations between colors and representative colors is selectively used to display a picture, RGB data approximately equivalent to an original picture can be obtained, and a picture of a high picture quality can be displayed. Further, where such conversion is performed making use of a lookup table for which an IC memory is used, high speed processing for reduction in the number of colors can be performed.

It is to be noted that, while the data representation conversion section 35 in the embodiment described above represents picture data in a color code and/or deviation information of a direction and deviation information of a distance of object picture data from a representative color of the category, the representation of picture data is not limited to that described above, and picture data may alternatively be represented, for example, in a color code and a parameter which represents at least one of the brightness and the clarity. Also in this instance, using parameters of the brightness and the clearness in place of deviations of the direction and the distance illustrated in FIG. 8(b), picture data can be represented with 12 bits.

By the way, as described in detail in section A. Colors Based on Categorical Perception of Human Beings, the clearness does not have much relation to perception of human beings to colors. Accordingly, the data representation conversion section 35 may represent a color, which may be represented, for example, by a small symbol in FIGS. 5(a) to 7(b) but exhibits a little lower degree of coincidence among those tested, as a color which is different only in clarity.

With the representation just described, picture data which further conform to the perception of human beings and whose amount is further reduced can be represented. Further, since the data form does not include a component of the brightness, the compression efficiency of the JPEG or the like is high, and data can be remarkably reduced in amount while maintaining the picture quality.

Furthermore, while the colors of nine picture elements including an object picture elements and eight picture elements around the object picture element are investigated upon determination of a category from picture data in a boundary region by the data representation conversion section 35 in the embodiment described above, the picture elements for investigation are not limited to those nine picture elements, and where a picture involves a comparatively small number of colors, by performing an investigation for totaling four picture elements or so at the upper and lower positions and the left and right locations to the location of an object picture element, a similar degree of accuracy can be achieved while the processing time is decreased.

Further, by constructing a picture processing system by combining two or more of such processes including conversion of input picture data by the data representation conversion section 35, various picture processes (a body extracting process by the body extraction section 37, a color changing process by the color changing processing section 38 and a data compression process by the data compression section 40) and a displaying process for a reduction in number of colors as described above, the system can be realized in accordance with an application of it. Consequently, in the inside of the system realized in this manner, picture data can all be represented in deviations between codes of colors classified in category and representative colors of the categories, and accordingly, various processes can be preformed at a high speed and with high picture quality.

D. Second Embodiment

Subsequently, a second preferred embodiment of the present invention will be described with reference to the drawings.

d0. General Construction of Color Picture Processing Apparatus

Figure 15:
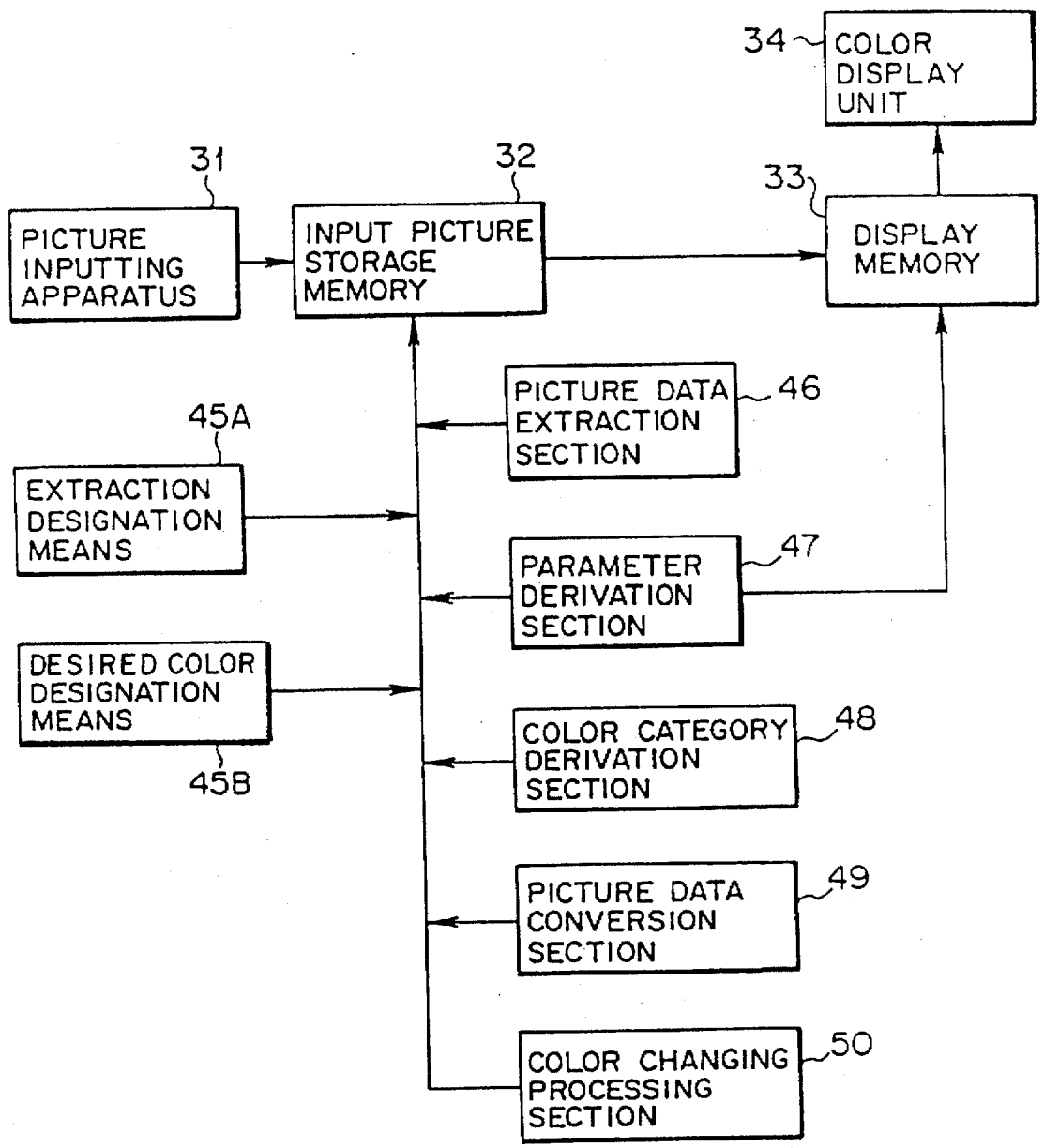
FIG. 15 is a block diagram of another color picture processing apparatus showing a second preferred embodiment of the present invention.

Referring now to FIG. 15, there is shown in block diagram a color picture processing apparatus according to the second preferred embodiment of the present invention. The color picture processing apparatus shown includes a picture inputting apparatus 31, an input picture storage memory 32, a display memory 33 and a color display unit 34 which have functions similar to those of the color picture processing apparatus of the first embodiment described above. Accordingly, overlapping description of them will be omitted herein to avoid redundancy.

The color picture processing apparatus further includes extraction designation means 45A manually operable by an operator to designate a body whose color is to be changed. The extraction designation means 45A may be constituted from, for example, a mouse or a keyboard. The color picture processing apparatus further includes a picture data extraction section 46 for extracting a region of a body designated by the extraction designation means 45A.

Accordingly, the extraction designation means 45A and the picture data extraction section 46 function as body region extraction means for designating and extracting a color of an arbitrary body region in a picture constructed from inputted color picture data.

The color picture processing apparatus further includes a parameter derivation section (body color detection means) 47 for derivation a calculation parameter such as a color of a body or data (picture data) of each picture element extracted by the picture data extraction section 46.

The color picture processing apparatus further includes desired color designation means 45B for setting a desired color for a color change for an extracted body color in response to an operation of an operator. The desired designation means 45B may be constituted from, for example, a mouse or a keyboard.

The color picture processing apparatus further includes a color changing processing section (color changing means) 50 for changing the color of a body extracted by the picture data extraction section 46 in accordance with a desired color for a color change designated by way of the desired color designation means 45B by an operator. A result of the color change of the color changing processing section 50 is displayed on the color display unit 34.

The color picture processing apparatus further includes a color category derivation section (first category discrimination means, second category discrimination means and category difference discrimination means) 48 for discriminating, based on a calculation parameter derived by the parameter derivation section 47, to a color of which category the color of an extracted body or data of each picture element belongs.

In particular, the color category derivation section 48 discriminates which one of a plurality of categories of color information a color designated for extraction, a derived body color or a designated desired color described above belongs, the categories being classified according to categorical human perception, and discriminates to which one of the plurality of categories of color information color picture data in the body region before or after a color change belongs, the categories being classified according to categorical human perception.

Further, the color category derivation section 48 performs discrimination of whether or not a designated color for extraction, a body color and a desired color discriminated based on the categorical perception belong to a same to color picture data discriminated based on the category perception.

The color picture processing apparatus further includes picture data conversion section (picture data changing means) 49 for removing such picture data as noise from among color picture data before or after a color change based on a result of category different discrimination information from the color category derivation section 48.

In other words, the picture data conversion section 49 removes noise picture data or the like from color picture data before or after color changing processing by the color changing processing section 50 based on a result of category difference discrimination from the color category derivation section 48, and picture data obtained as a result of such removal are displayed on the color displayed on the color display unit 34.

Figure 16:
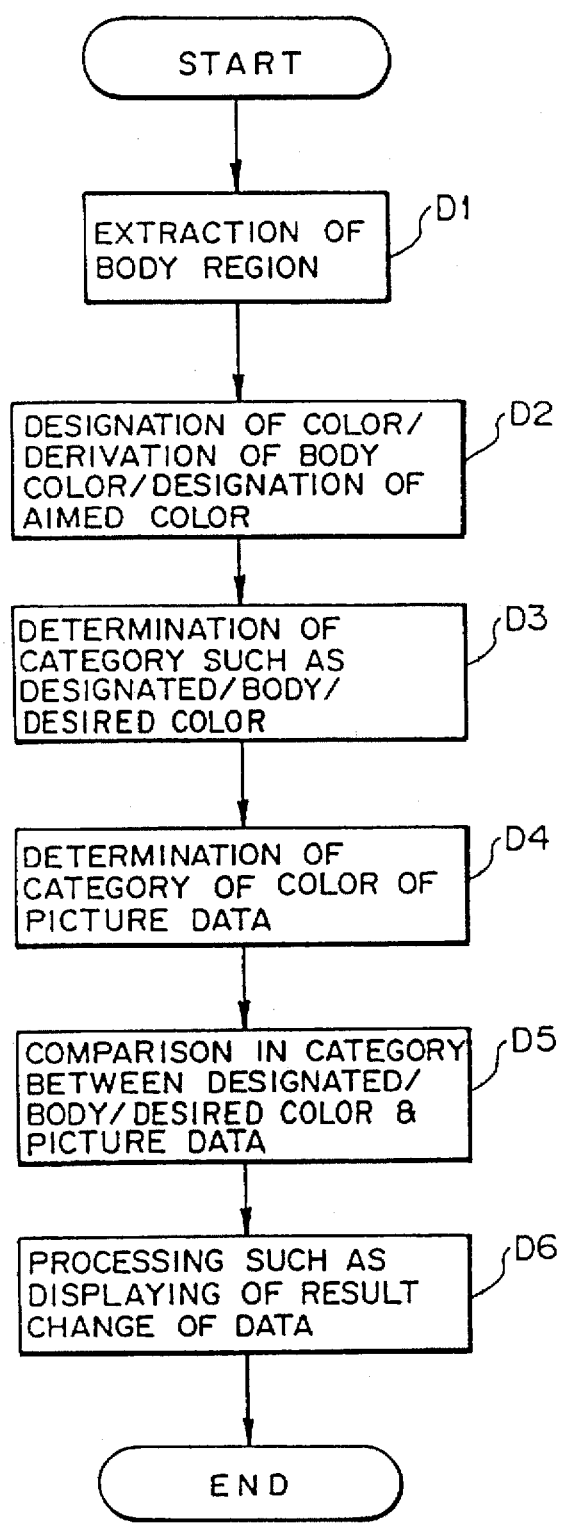
FIG. 16 is a flow chart illustrating processing operation of the color picture processing apparatus shown in FIG. 15.

Processing operation of the color picture processing apparatus according to the second embodiment of the present invention having the construction described above will be described below with reference to a flow chart of FIG. 16.

In particular, in response to an operation by an operator, the picture data extraction section 46 receives an instruction from the extraction designation means 45A and extracts a color change object body (region) from a picture (step D1). The instruction from the extraction designation means 45A may be performed, for example, by the operator inputting an instruction on a display screen making use of a mouse or the like (step D2) or by the operator inputting an instruction of a color, and a body region is extracted based on the thus instructed color using a method which will be hereinafter described.

Then, the parameter derivation section 47 detects the color of the extracted body as a parameter (step D2). Such detection is based on a method wherein the color is detected, for example, from a distribution of data on such a chromaticity diagram shown in one of FIGS. 5($a$) to 7($b$).

Then, the operator will designate a desired color for a color change by operation of the desired color designation means 45B by the operator (step D2). In this instance, color patches (colored squares) may be displayed on the color display unit 34 so as to be designated by way of a mouse or a like element of RGB values may be inputted directly by way of a keyboard.

Thereafter, the category of the color (designated color) designated by the operator, the parameter (body color) of the color of the extracted body designated by the color category derivation section 48 or the desired color designated by the desired color designation means 45B at step D1 or D2 is detected (step D3). In particular, coordinates of the designated color, the body color and the desired color in the XYZ color space are detected and are compared with the chromaticity diagrams shown in FIGS. 5($a$) to 7($b$) to discriminate a relevant category. In this instance, the category is discriminated, for example, using such a lookup table for conversion from xy chromaticity values and a brightness into RGB data values as shown in any of FIGS. 5($a$) to 7($b$).

Then, the color category derivation section 48 detects a category of a color for each picture element from picture data of the body region before or after color conversion by the color changing processing section 50, that is, from picture data in the body region extracted by the picture data extraction section 46 (step D4). Also in this instance, the category of a color is detected, for example, using such a lookup table for conversion from xy chromaticity values and a brightness into RGB data values as shown in any of FIGS. 5($a$) to 7($b$).

Thereafter, the color category derivation section 48 compares the category of the designated color, the body color or the desired color obtained at step D3 or D4 with the category of data of each picture element to discriminate whether the categories of the colors are same as or different from each other (step D5).

Then a result of the discrimination by the color category derivation section 48, a message requesting the operator for instruction for data conversion or the like and so forth are displayed (step D6).

Particularly, a region desired by the operator can be extracted simply, for example, by extracting a color in a body region which belongs to the same category as that of the designated color. The region thus extracted can be utilized for a color change or for composition of pictures. Or conversely, picture data which have a different category in color may be displayed while the operator is inquired to determine whether data at the portion should be changed in color or be left as it is (should be deleted from the object of a color change). This allows a color change with a high degree of accuracy (conforming to the will of the operator).

The data conversion processing performed based on an instruction by the operator at step D6 described above may have following forms depending upon whether it is performed before or after a color changing operation.

d1. First Picture Data Changing Process before Color Change

Figure 17:
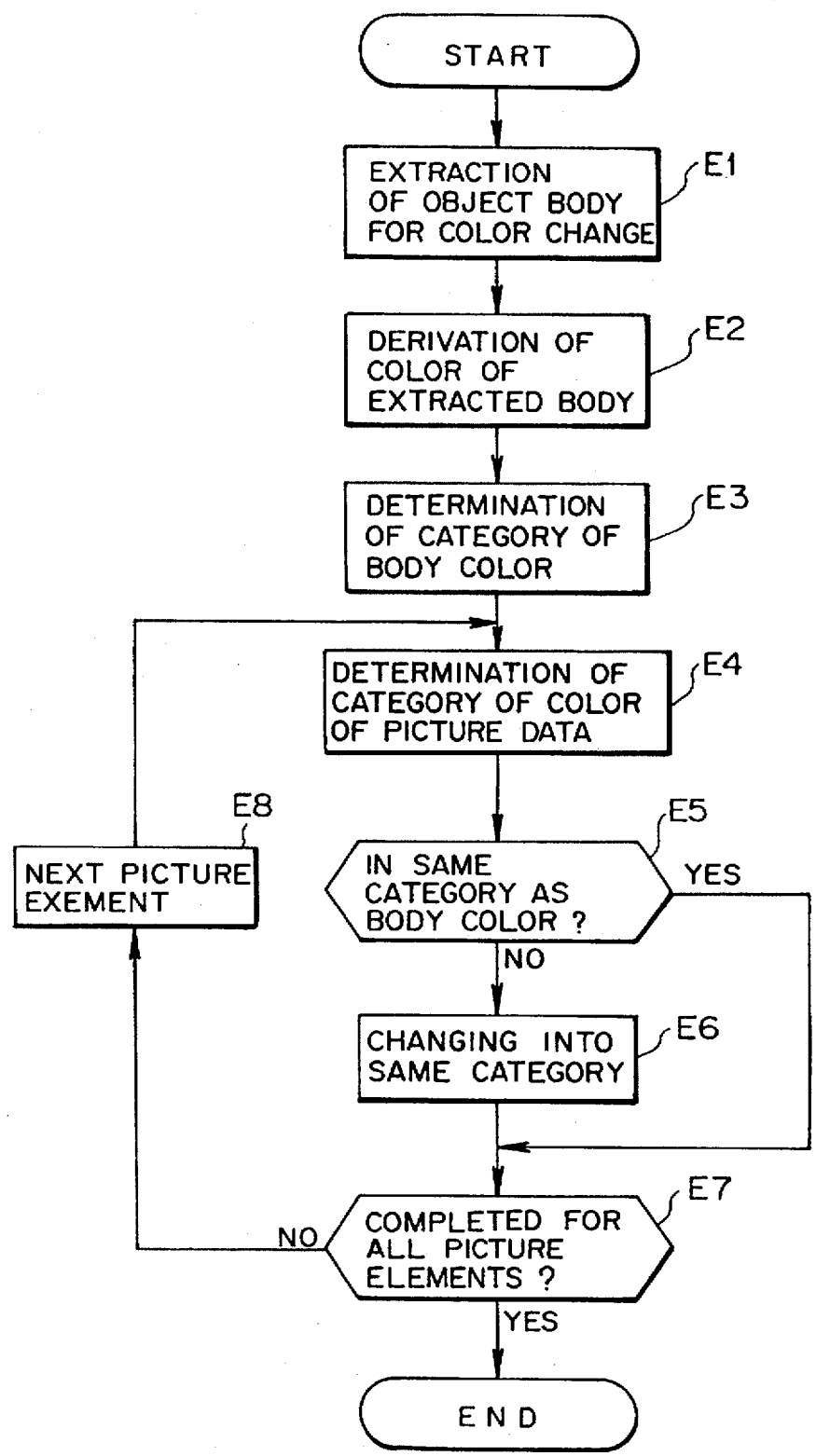
FIGS. 17 and 18(a) to 18(c) are flow chart and diagrammatic views, respectively, illustrating a first picture data conversion process before a color change in the color picture processing apparatus shown in FIG. 15.

FIG. 17 is a flow chart illustrating a first picture data conversion process before a color change which is based on a result of discrimination of whether or not a category of a body color and a category of color picture data of a body region before a color change are the same as or are different from one another.

Here, operations beginning with the extraction processing of a body for a color change and ending with the discrimination processing of difference in category between a body color and picture data at steps E1 and E5 correspond to the operations at steps D1 to D5 of the flow chart of FIG. 16 described hereinabove.

In particular, referring to FIG. 17, in response to an operation of an operator, the picture data extraction section 46 receives an instruction from the extraction designation means 45A and extracts a color change object body (region) from a picture (step E1). Then, the parameter derivation section 47 derives the color of the extracted body as a parameter (step E2).

Then, a category of the thus derived body color is detected (step E3). In particular, the category is detected by detecting coordinates of the body color in the XYZ color space and using such a lookup table for conversion from xy chrominance values and a brightness into RGB data values as shown in any one of FIGS. 5(a) to 7(b).

Thereafter, using a similar method to that used at step E3 described above, a category of a color is identified for each one of picture elements from the picture data of the color change object body (step E4). Then, the category of color thus detected from the picture data is compared with the category of the body color identified at step E3 (step E5).

Here, where the categories are different from each other, the picture data conversion section 49 changes the color of the picture data of the picture element to the color in the same category as that of the body color (NO route at step E5 to step E6 and onto step E7), but where the categories are the same (YES route at step E5), similar processing is subsequently performed for the next picture element (NO route at step E7 to step E8 and back to step E4). Once the sequence is performed for the last picture element, the sequence ends (YES route at step E7).

Figure 18A:
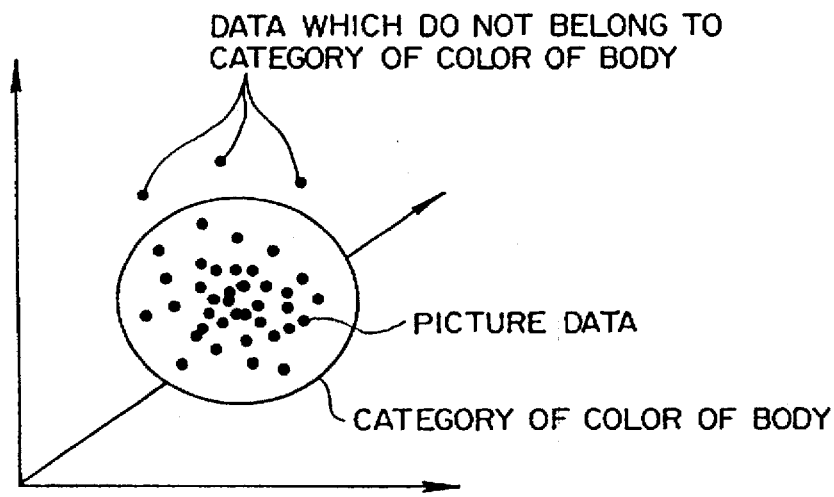

More particularly, the picture data of the color change object body are distributed, for example, in such a manner as seen in FIG. 18(a) in the color space. In the picture data illustrated in FIG. 18(a), almost all picture data belong to the category of the body color, but the color of any picture data which does not belong to the category of the body color is changed to the color of the same category as that of the body color.

Figure 18B:
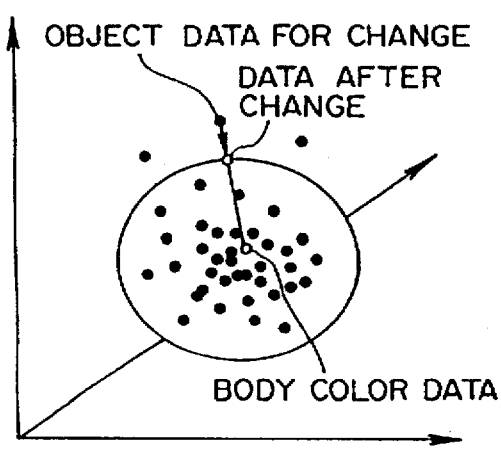
Figure 18C:
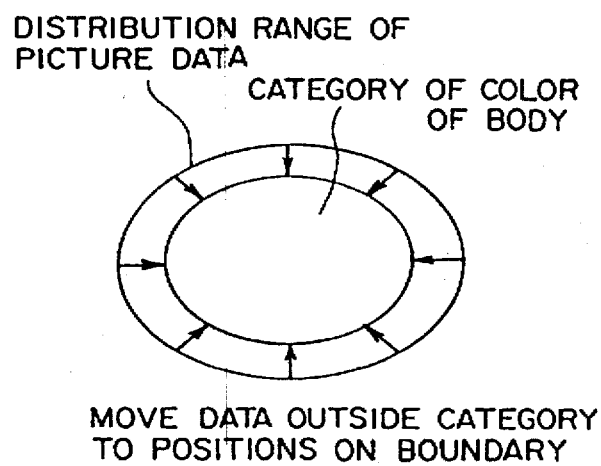

In particular, the picture data conversion section 49 changes picture data which do not belong to the category of the body color to data on the boundary of the category of the body color as seen from FIGS. 18(b) and 18(c). More particularly, the position of the body color in the color space (for example, the representative color) and the position of the picture element of the object of a color change are interconnected by way of a straight line, and the picture element of the object of the color change is changed to a crossing point between the straight line and the category boundary.

The operations at steps E4 to E6 described above are performed for all of the picture data of the color change object body (step E7). Thereafter, a color changing calculation based on a reflection model is performed for results of the processing described above. Consequently, color changing processing is performed in such a form that the changing amounts of data outside the range of the category of the body color are minimized as seen in FIG. 18(c) and data of irregular colors arising from noise in the body are removed.

d2. Second Picture Data Changing Process before Color Change

Figure 19:
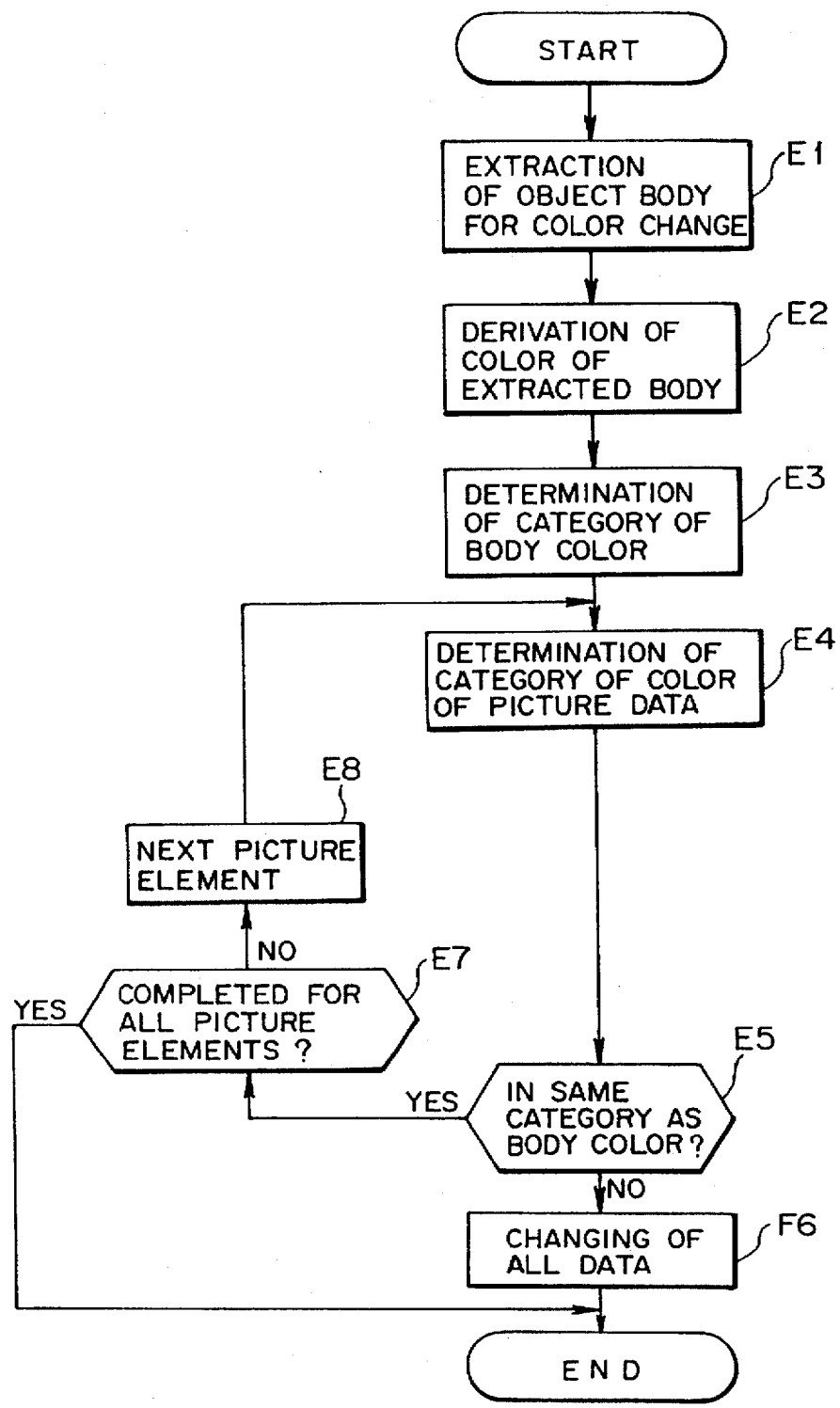
FIGS. 19 and 20(a) to 20(c) are flow chart and diagrammatic views, respectively, illustrating a second picture data conversion process before a color change in the color picture processing apparatus shown in FIG. 15.

FIG. 19 is a flow chart illustrating a second picture data changing process before a color change which is based on a result of discrimination of difference between a category of a body color and a category of color picture data of a body region before a color change.

In the second picture data changing process illustrated in FIG. 19, when the categories of colors of picture data of an object of a color change are all same as the category of a body color, similar processing to the processing described hereinabove with reference to FIG. 17 is performed.

In particular, similarly as in the processing described above with reference to FIG. 17, the operations beginning with the extraction operation of a body by the picture data extraction section 46 (step E1) and ending with the comparison operation between the category of a color of picture data and the category of a body color by the color category derivation section 48 (step E5) are performed, and if the picture data of all picture elements have a same category in color as that of the body color, then conversion of the picture data is not performed (steps E4, E5, E7, E8 and back to E4).

On the other hand, when some of the picture data have a different category or categories in color from that of the body color (NO route at step E5), the picture data conversion section 49 changes not only the category of the colors of those picture data but the category of the colors of all picture data (step F6 and YES route of step E7). Once the category of the colors for all picture data is changed, the sequence ends.

Figure 20A:
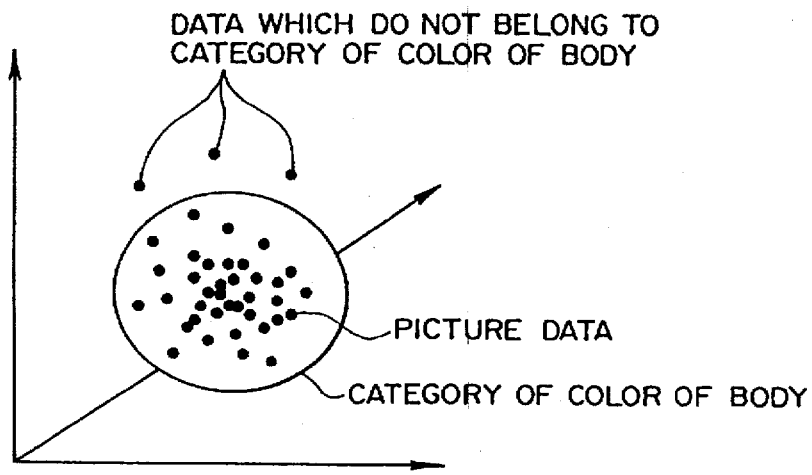
Figure 20B:
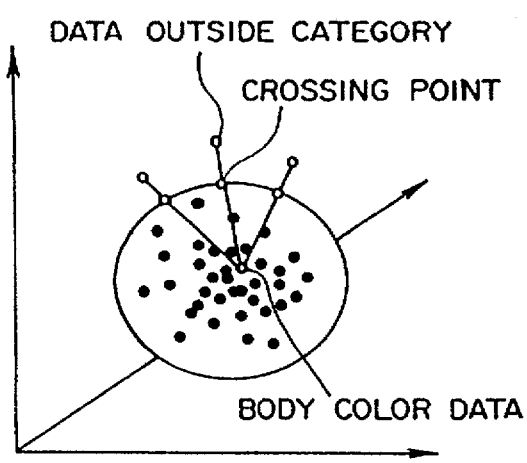
Figure 20C:
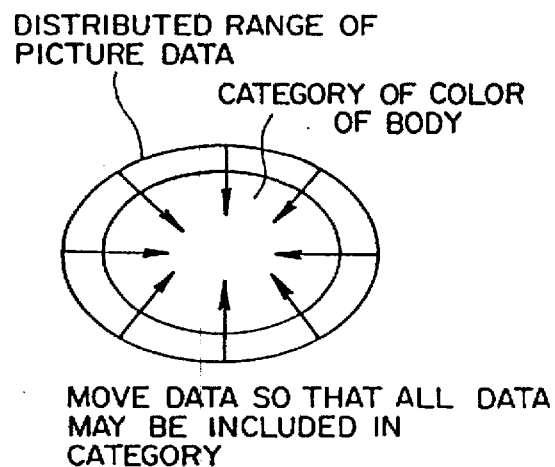

In particular, while the picture data of the color change object body are distributed, for example, in such a manner as seen in FIG. 20(a) in the color space, when some picture data whose colors do not belong to the category of the body color are included in the picture data as seen in FIG. 20(a), the picture data are moved so that the colors of all of them may be included in the category of the body color as seen in FIG. 20(c).

In particular, a straight line (vector) in the color space which interconnects the position of the body color and the position of each data whose color does not belong to the category of the body color is determined first, and then a crossing point between the straight line (vector) and a boundary portion of the color category of the body color is determined as shown in FIG. 20(b).

Further, a ratio between the distance between the body color and the color of the picture data (length of a vector from the position of the body color to the position of the picture data in the color space, that is, distance 2) and the distance between the body color and the crossing point on the category boundary (length of a vector from the position of the body color to the crossing point, that is, distance 1), that is, distance 1/distance 2, is calculated. Then, such ratio is calculated for all picture data outside the category of the body color, and a minimum value among values of the ratio calculated in this manner is stored.

Then, the positions of all of the picture data including the picture data included in the category of the body color are changed in accordance with the thus stored minimum value of the ratio, that is, the distances from the position of the body color to the positions of all of the picture data are reduced (the lengths of vectors are reduced) in accordance with the stored minimum value of the ratio. For example, when the ratio is 2:1, the positions of all of the picture data are moved so that the distances of them from the position of the body color may be reduced to ½.

Consequently, any picture data which exhibits a maximum value in terms of the distance to the crossing point can be moved to the crossing point. Accordingly, the positions of all of the picture data can be changed to positions in the category of the body color (the lengths of the vectors between the body color and the individual picture data are reduced) eliminating presence of data outside the category.

d3. First Picture Data Changing Process after Color Change

While the processing of picture data before a color change is described in sections d1 and d2 above, processing of picture data of a body (region) after a color change will be described below.

Figure 21:
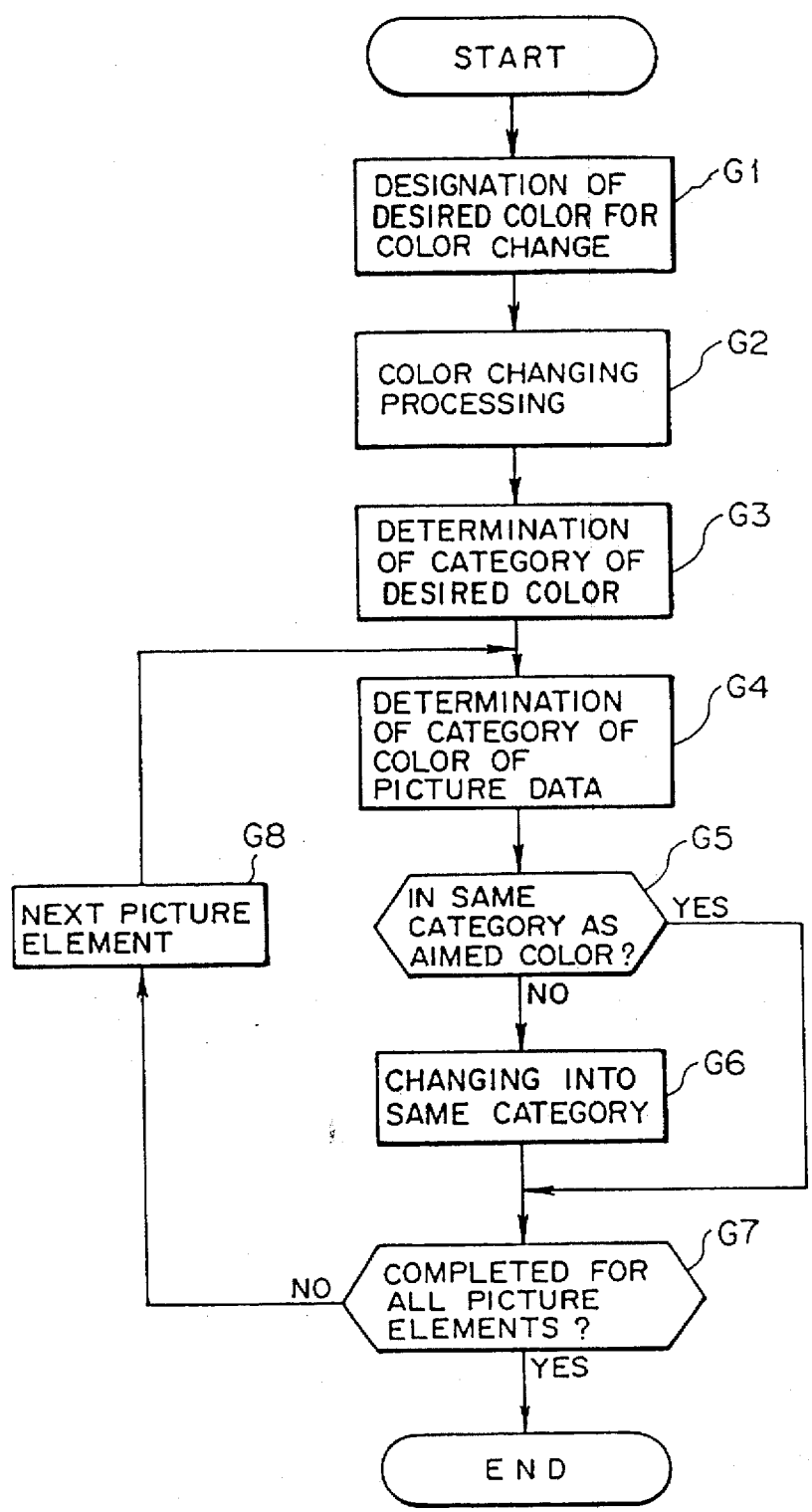
FIGS. 21 and 22(a) to 22(c) are flow chart and diagrammatic views, respectively, illustrating a first picture data conversion process after a color change in the color picture processing apparatus shown in FIG. 15.

FIG. 21 is a flow chart illustrating a first picture data changing process after a color change which is based on a result of discrimination of difference between a category of an desired color and a category of color picture data after a color change.

Referring to FIG. 21, an operator will first operate the desired color designation means 45B to designate an desired color for a color change (step G1). In response to the operation, the color changing processing section 50 performs a color changing operation to the thus designated desired color (step G2).

Then, similar processing to that performed for the model described hereinabove with reference to FIG. 17 is performed for the picture data of the body (region) for which the color changing operation the by color changing processing section 50 has been completed.

In particular, a category of a color to be desired for a color change (desired color) is detected similarly as at step E3 in FIG. 17 described above (step G3). In this instance, the category is detected by calculating coordinates of the desired color in the XYZ color space and using such a lookup table for conversion from xy chrominance values and a brightness into RGB data values or the like as illustrated in any one of FIGS. 5(a) to 7(b).

Further, similarly as at steps E4 to E8 in FIG. 17, a category of a color is detected for each one of picture elements from the picture data of the body after the color change (step G4), and the category of the picture data thus detected is compared with the category of the desired color (step G5). If the categories are the same as each other (YES route at step G5), then similar processing is subsequently performed for a next picture element (NO route at step G7 to step G8 and back to step G4). On the other hand, when the categories are different from each other (NO route at step G5), the color of the picture data is changed to the color of the same category as that of the desired color (step G6 and onto step G7). Once the sequence is performed for the last picture element, the sequence ends (YES at step G7).

Figure 22A:
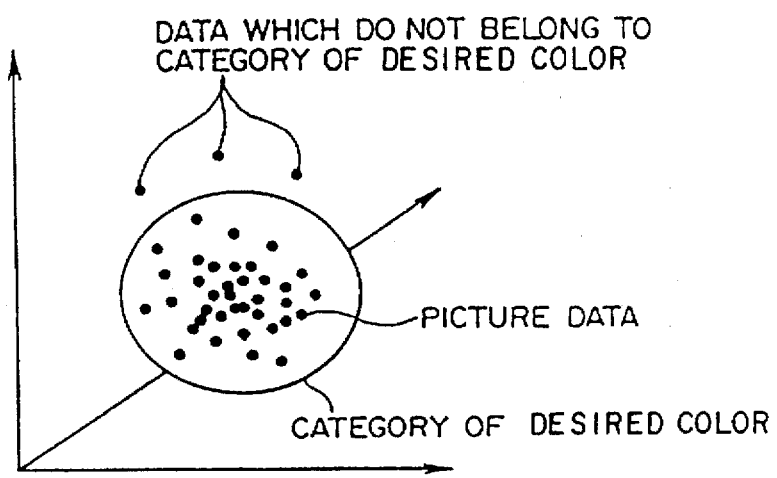

More particularly, while almost all of the colors of the picture data after the color change belong to the category of the desired color in the color space as seen in FIG. 22(a), data conversion by the picture data conversion section 49 is performed for any picture data whose color does not belong to the category of the desired color.

Figure 22B:
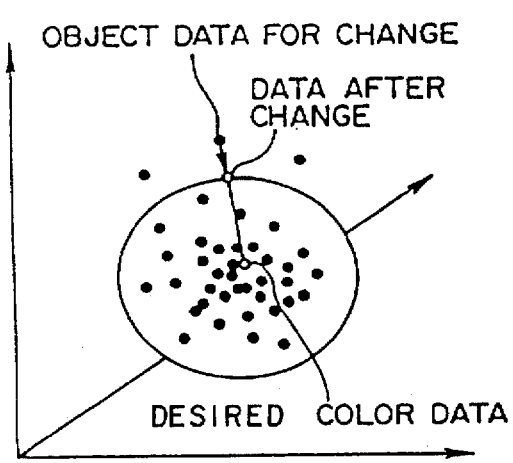
Figure 22C:
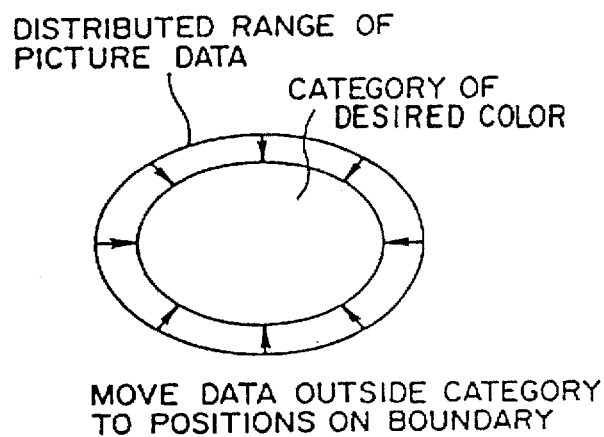

In particular, the picture data conversion section 49 changes any picture data whose color does not belong to the category of the desired color to a position on the boundary of the category of the desired color as seen from FIGS. 22(b) and 22(c). More particularly, the position of the desired color and the position of a picture element of an object of a color change in the color space are interconnected by a straight line, and the position of the picture data is changed to a crossing between the straight line and the boundary of the category.

Such operations at steps G4 to G6 as described above are performed for all of the picture data of the color change object body (step G7). Thereafter, a color changing calculation based on a reflection model is performed for results of the processing described above. Consequently, presence of data of irregular colors arising from noise in the body after the color change is eliminated.

d4. Second Picture Data Changing Process after Color Change

Figure 23:
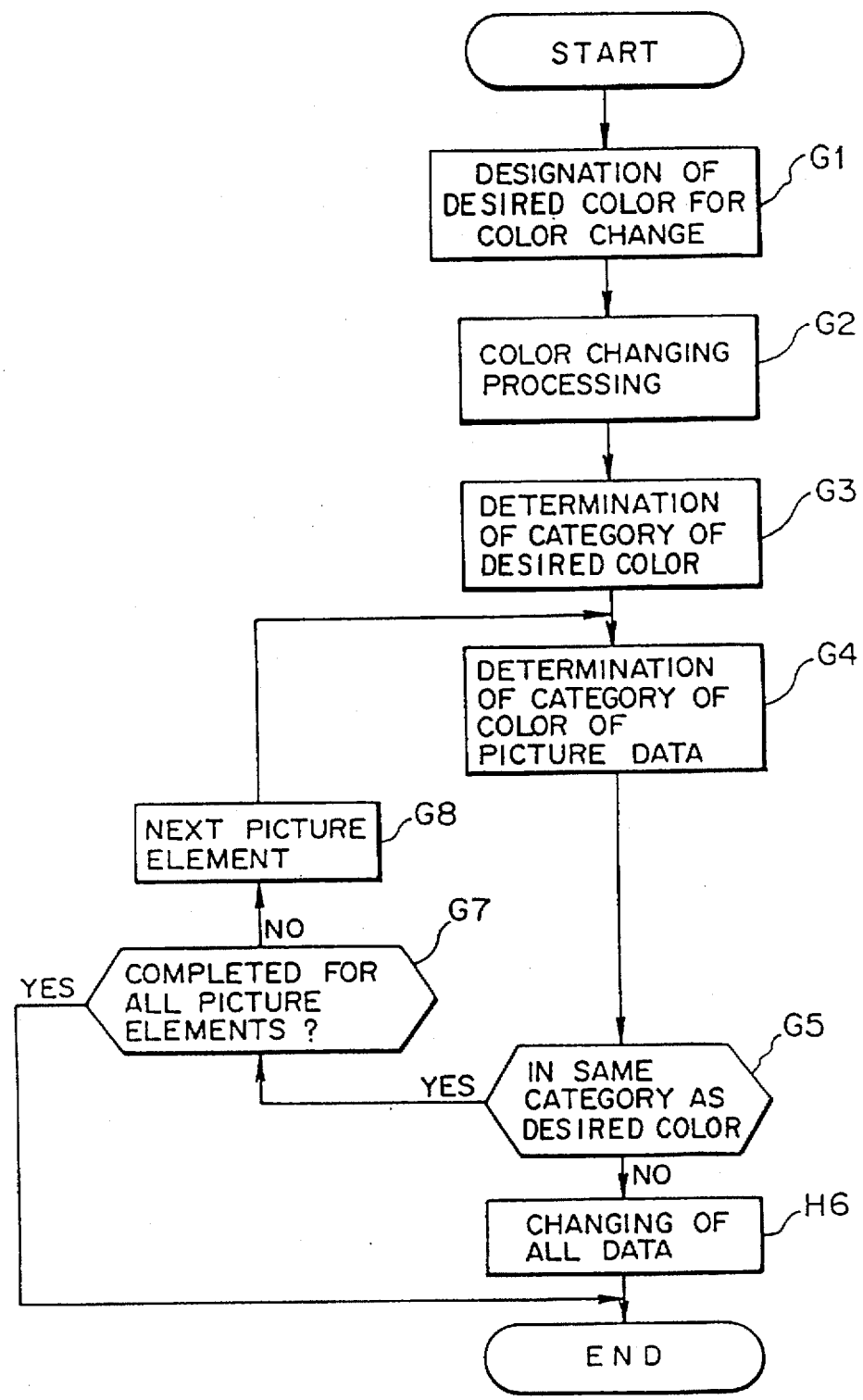
FIGS. 23 and 24(a) to 24(c) are flow chart and diagrammatic views, respectively, illustrating a second picture data conversion process after a color change in the color picture processing apparatus shown in FIG. 15.

FIG. 23 is a flow chart illustrating a second picture data changing process after a color change which is based on a result of discrimination in difference between a category of an desired color and a category of color picture data of a body (region) after a color change.

In the second color picture changing process illustrated in FIG. 23, when all of the categories of the colors of picture data after color conversion are the same as the category of an desired picture, similar processing to that described hereinabove with reference to FIG. 21 is performed.

In particular, similarly as in the processing described hereinabove with reference to FIG. 21, the operations beginning with the extraction operation of a body by the picture data extraction section 46 (step G1) and ending with the comparison processing between the category of the color of picture data and the category of the desired color from the color category derivation section 48 (step G5) are performed. Then, when all of the categories of the colors of picture elements are the same as the category of the desired color, a change of the picture data is not performed (steps G4, YES at G5, NO at G7, G8 and back to step G4).

On the other hand, when the category of the color of any of the picture data is different from the category of the desired color (NO route at step G5), similar processing to that for the model described hereinabove with reference to FIG. 19 is performed.

In particular, the picture data conversion section 49 changes not only the category of the color of the picture data but the categories of the colors of all of the picture data (step H6). After the sequence is performed for the last picture element, the sequence ends.

Figure 24A:
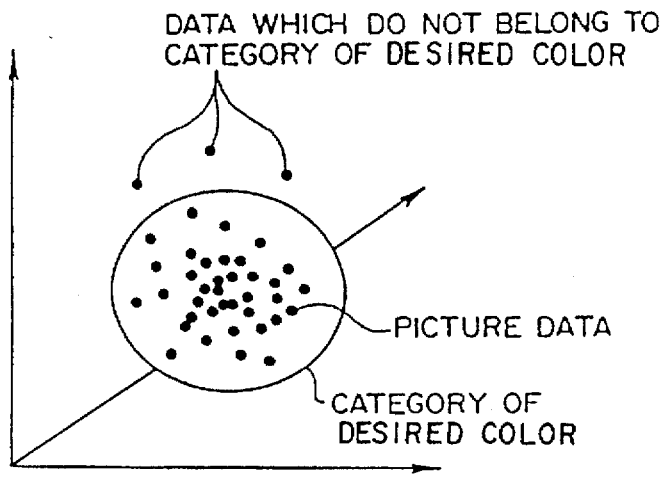
Figure 24B:
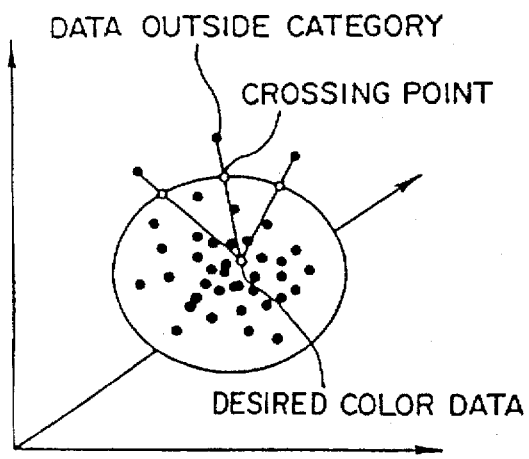
Figure 24C:
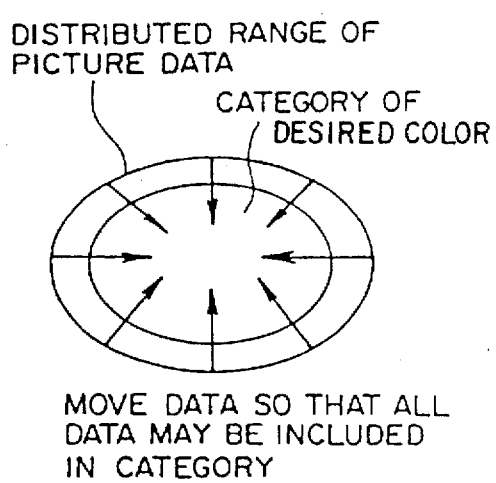

More particularly, while the picture data after a color change are distributed in such a manner as seen, for example, in FIG. 20(a) in the color space, where the colors of some of the picture elements do no belong to the category of the desired color as seen in FIG. 24(a), the positions of them are moved so that the colors of all of the picture data may be included in the category of the desired color as seen in FIG. 24(c).

In particular, a straight line (vector)) in the color space which interconnects the position of the desired color and the position of each data whose color does not belong to the category of the desired color is determined first, and then a crossing point between the straight line (vector) and a boundary portion of the category of the desired color is determined.

Further, as seen in FIG. 24(b), a ratio between the distance between the desired color and the picture data (length of a vector from the position of the desired color to the position of the picture data in the color space, that is, distance 2) and the distance between the desired color and the crossing point on the category boundary (length of a vector from the position of the desired color to the crossing point, that is, distance 1), that is, distance 1/distance 2, is calculated. Then, such ratio is calculated for all picture data outside the category of the desired color, and a minimum value among values of the ratio calculated in this manner is stored.

Then, the positions of all of the picture data including those picture data included in the category of the desired color are changed in accordance with the thus stored minimum value of the ratio, that is, the distances from the position of the desired color to the positions of all of the picture data are reduced (the lengths of the vectors are reduced) in accordance with the stored minimum value of the ratio. For example, when the ratio mentioned above is 2:1, the picture data are individually moved so that the distances of them from the position of the desired color may be reduced to ½.

Consequently, any picture data which exhibits a maximum value in terms of the distance to the crossing point can be moved to the crossing point. Accordingly, the positions of all of the picture data can be changed to positions in the category of the body color (the lengths of the vectors between the desired color and the individual picture data are reduced) eliminating presence of data outside the category.

In this manner, with the color picture processing apparatus according to the second embodiment of the present invention, since the picture data conversion section 49 can change color picture data before or after a color change based on a result of discrimination in category by the color category derivation section 48, there is an advantage in that the picture quality can be improved by reducing noise in data of a body picture of an object of the color change or by reducing noise expanded by the color change.

Further, since color picture data before a color change can be changed by the picture data conversion section 49 in the description of d1. First Picture Data Changing Process before Color Change above, data of irregular colors arising from noise in the body can be reduced with a minimum amount of a change of the data, and as a result, such a noise as will degrade the picture quality after the color change does not appear and a color change of a high quality can be realized.

Furthermore, since any data outside a category can be eliminated without any variation of the relative positional relationship of the entire picture data by the changing processing of color picture data before a color change by the picture data conversion section 49 in the description of d2. Second Picture Data Changing Process before Color Change, resulting data do not include such data as may possibly have a bad influence on the picture quality as a result of the color change, and consequently, the influence of the change of data upon the picture quality can be remarkably reduced.

Further, since color picture data after a color change by the picture data conversion section 49 in the description of d3. First Picture Data Changing Process after Color Change can be changed, data of irregular colors arising from noise in the body after the color change can be removed with a minimum amount of a change of the data, and as a result, the picture quality after the color change can be improved.

Furthermore, since any data outside a category can be eliminated without any variation of the relative positional relationship of the entire picture data by the changing processing of color picture data after a color change by the picture data conversion section 49 in the description of d4. Second Picture Data Changing Process after Color Change, resulting data do not include such data as may possibly have a bad influence on the picture quality as a result of the color change, and consequently, the influence of the change of data upon the picture quality can be remarkably reduced.

It is to be noted that, according to the present invention, the color picture processing apparatus may be constructed so as to have two or more of the processes described above (data changing processes before and after the color change) in combination.

In this instance, even when noise is produced, after a color change, by an error occurring in color changing calculation after data conversion is performed by the picture data conversion section 49 to remove noise before the color change, such noise can be eliminated by performing data conversion by the picture data conversion section 49. As a result, a picture of a changed color of a high picture quality free from an influence of an error in calculation can be obtained.

E. Third Embodiment

Subsequently, a third preferred embodiment of the present invention will be described with reference to the drawings.

Figure 25:
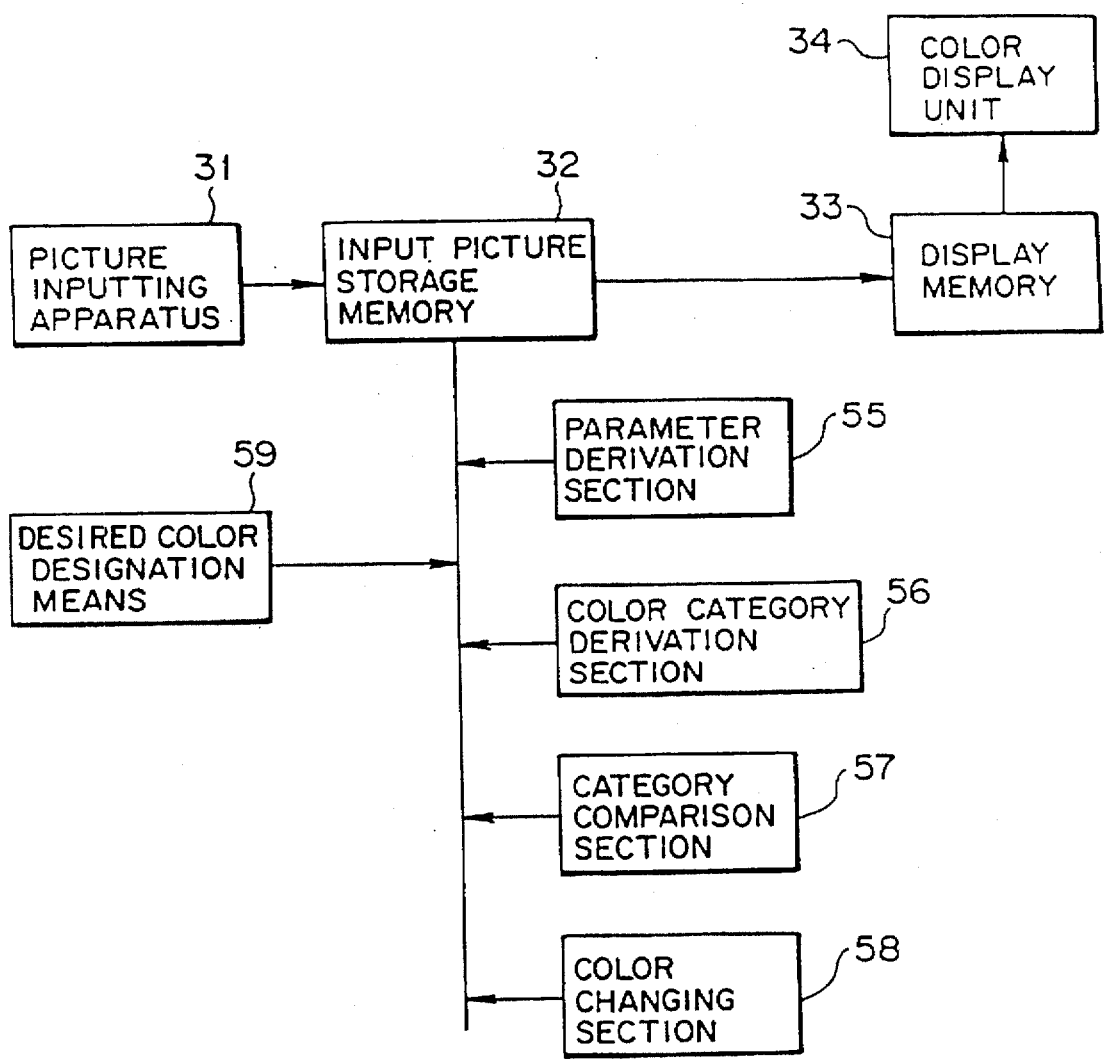
FIG. 25 is a lock diagram of a further color picture processing apparatus showing a third preferred embodiment of the present invention.

FIG. 25 shows in block diagram a color picture processing apparatus according to a third preferred embodiment of the present invention. Referring to FIG. 25, the color picture processing apparatus shown changes the color of an arbitrary body region in a color picture by changing the position of data indicating the body region in a color space and includes a picture inputting apparatus 31, an input picture storage memory 32, a display memory 33 and a color display unit 34 which have individually similar functions to those of color picture processing apparatus of the first and second embodiments described above.

The color picture processing apparatus further includes desired color designation means 59 for designating a desired color for a color change of body data by operation of an operator.

The color picture processing apparatus further includes a color category derivation section 56 for discriminating to which one of a plurality of categories of color information body color data indicating a body region before and after a color change, respectively, and desired color data belong, the categories being classified according to categorical human perception. In particular, the color category derivation section 56 discriminates categories to which colors body colors derived by the parameter derivation section 55 and an desired color for the color change designated by the desired color designation means 59 belong.

The color picture processing apparatus further includes a category comparison section (category difference discrimination means) 57 for discriminating whether or not data obtained by conversion by a color changing section 58, which will be described below, and indicating a body region before and after a color change belong to a same category.

In other words, the category comparison section 57 discriminates a category of a derived color (body color data indicating a body region before a color change) derived from the body region and also discriminates a category of an desired color (body color data indicating the body region after the color change) described as a color to be desired for the color change, and compares the category of the derived color and the category of the desired color with each other.

The color changing section (data conversion means, color changing means) 58 mentioned above converts data so that they may have color information derived by the color category derivation section 56, and changes, based on a result of the discrimination by the category comparison section 57, the positions of data in the color space to change the color of the body.

Figure 28A:
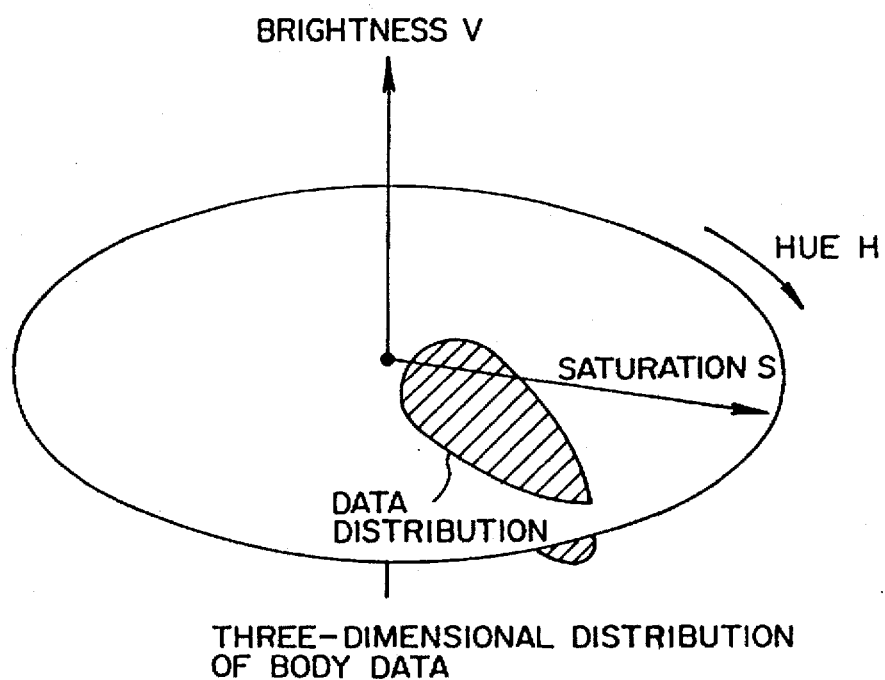
FIGS. 28(a) and 28(b) are diagrammatic views showing different color spaces represented in the brightness, the saturation and the hue in the color picture processing apparatus shown in FIG. 25.
Figure 28B:
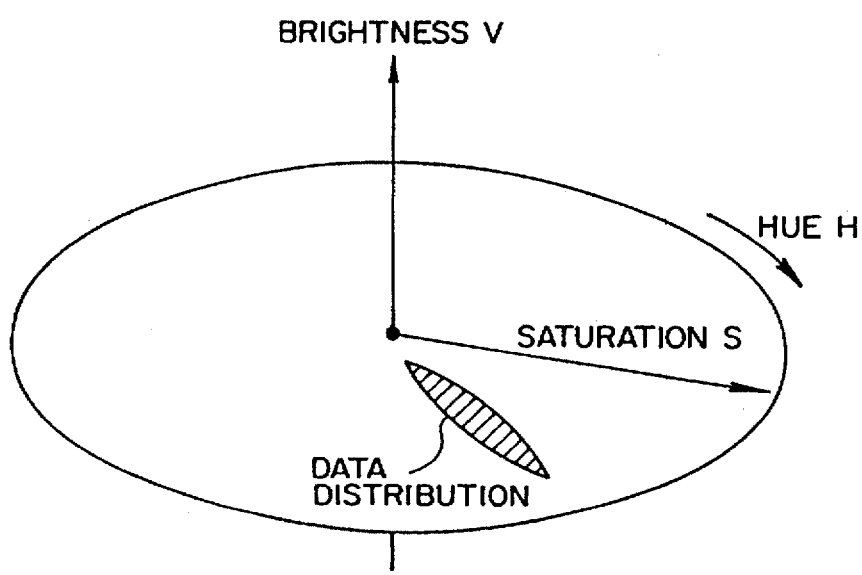

It is to be noted that also picture data changed in color by the color changing section 58 are displayed on the color display unit 34.

Where the color space is constructed as a space which can be represented in brightness, saturation and hue as seen in FIGS. 28(*a*) and 28(*b*), the color changing section 58 can change at least one of values of the brightness, saturation and hue.

Figure 30A:
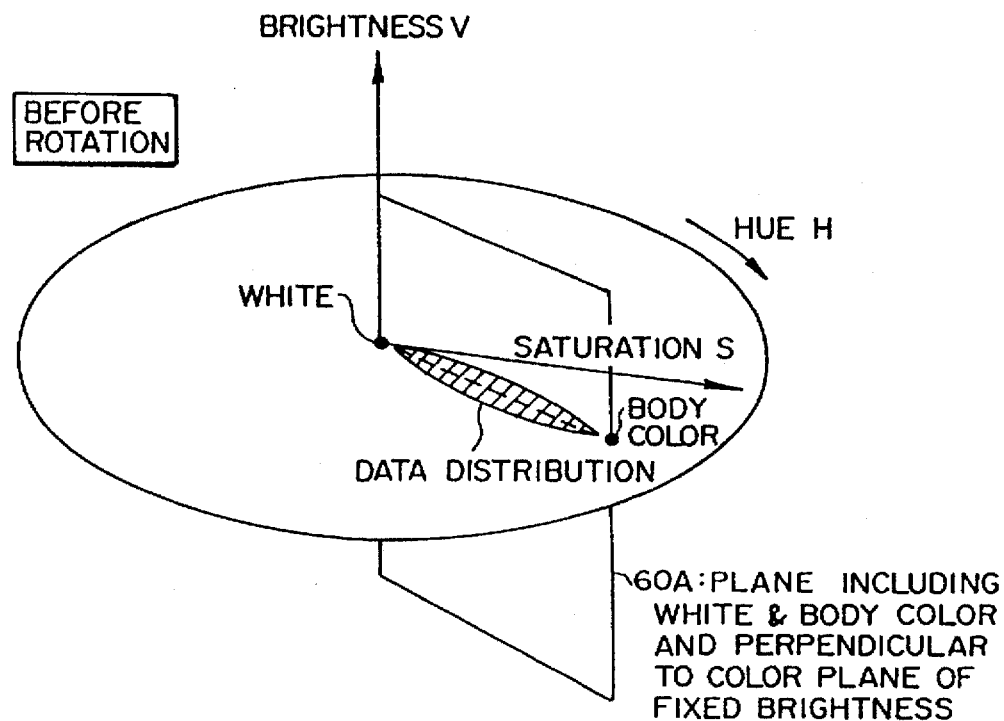
FIGS. 30(a) and 30(b) are diagrammatic views illustrating a rotationally moving process for body data in color picture processing apparatus shown in FIG. 25.
Figure 30B:
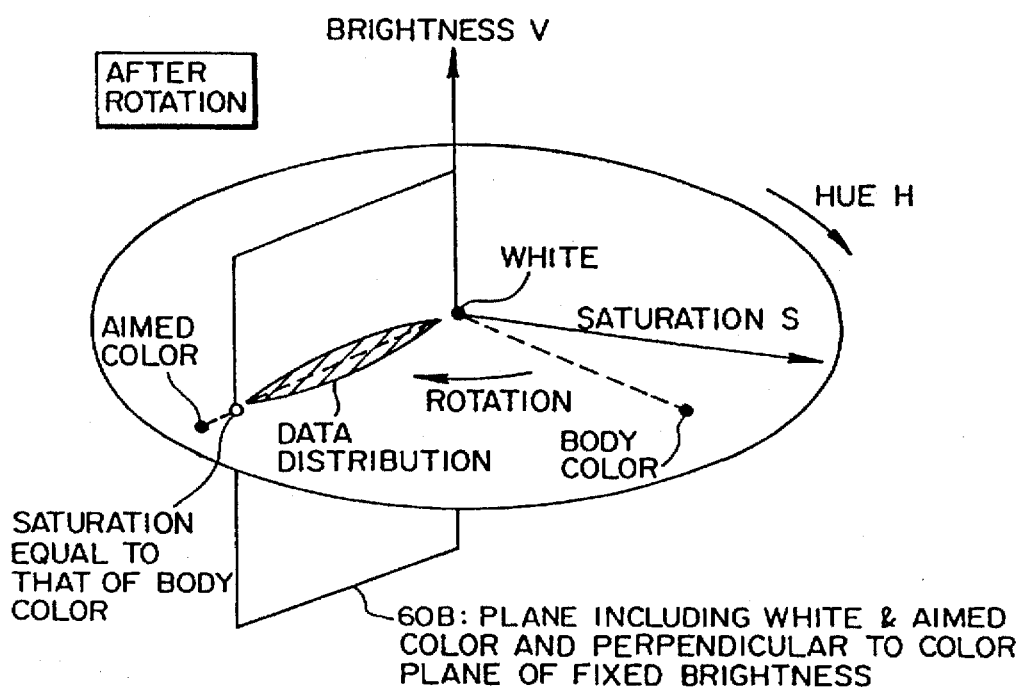
Figure 31A:
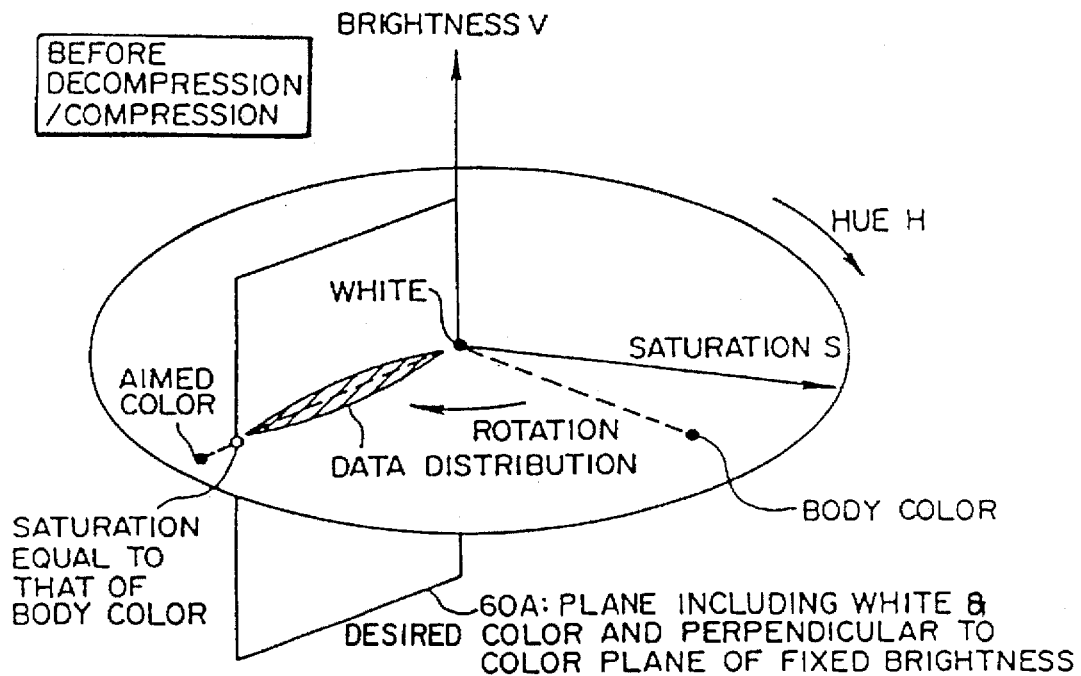
FIGS. 31(a) and 31(b) are diagrammatic views illustrating a decompression or compression process for body data in the color picture processing apparatus shown in FIG. 25.
Figure 31B:
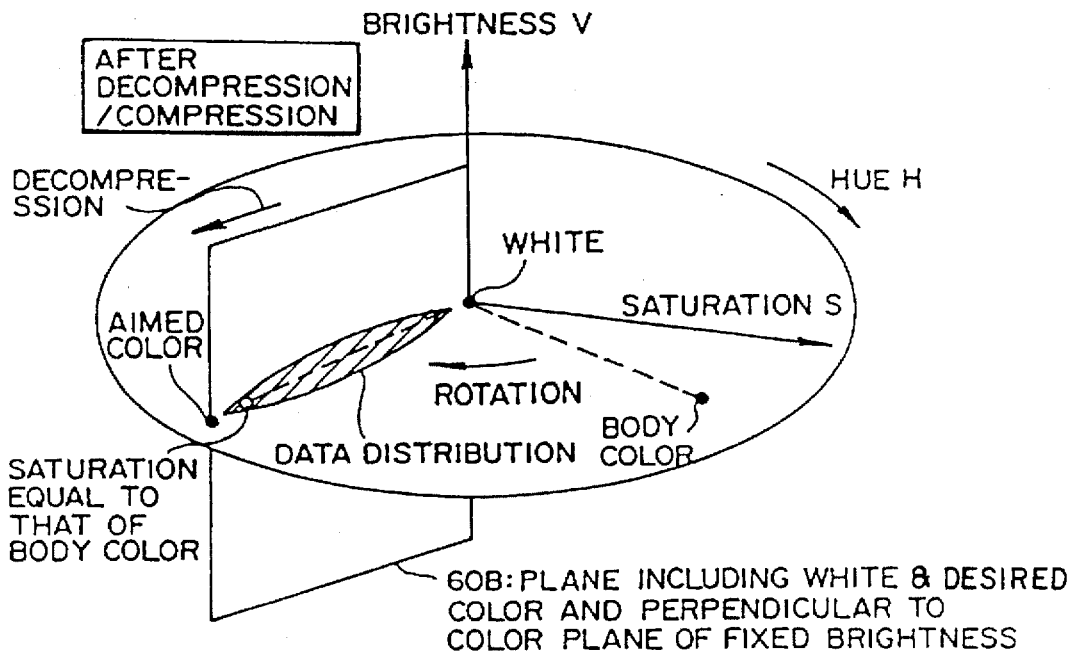

Further, the color changing section 58 can perform data decompression processing or data compression processing of data in the color space in the direction of the saturation as seen in FIGS. 31(*a*) and 31(*b*) to vary the value of the saturation. Furthermore, the color changing section 58 can perform data decompression processing or data compression processing of data in the color space in the direction of the brightness to vary the value of the brightness. In addition, the color changing section 58 can perform data rotating processing around a straight line representing achromatic colors to vary the value of the hue as seen in FIGS. 30(*a*) and 30(*b*).

Figure 26:
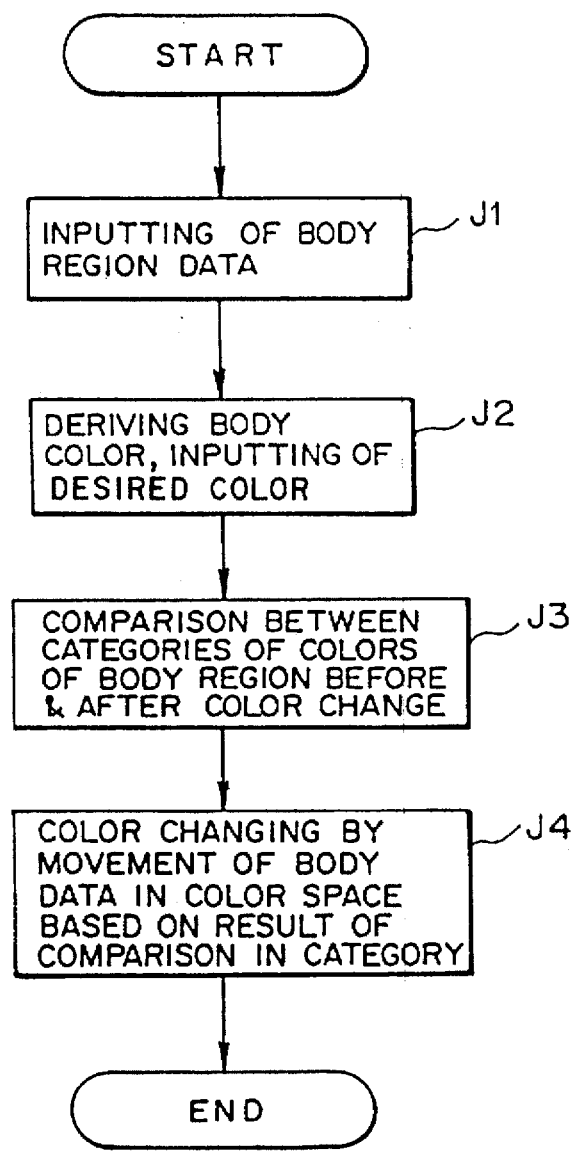
FIG. 26 is a flow chart illustrating a color changing procedure of the color picture processing apparatus sown in FIG. 25.

The color picture data processing apparatus according to the third embodiment of the present invention having the construction described above operates in such a manner as illustrated in a flow chart of FIG. 26 to perform color changing processing.

In particular, referring to FIG. 26, picture data representing a body region will be inputted from the picture inputting apparatus 31 (step J1). The picture data are stored once into the input picture storage memory 32. Then, the parameter derivation section 55 detects a body color based on the inputted picture data (step J2). Thereafter, a color to be desired for a color change (desired color) will be inputted by an instruction of the operator or the like (step J2).

Then, the color category derivation section 56 detects a category in color of the desired color thus instructed or of the derived body color. It is to be noted that, also in the derivation processing for a category by the color category derivation section 56, coordinates of the body color and the desired color in the XYZ color space are detected and compared with FIGS. 5(*a*) to 7(*b*) to derive categories of them similarly as in the first and second embodiments described above. In this instance, the categories are derived, for example, using such a lookup table for conversion of xy chrominance values and a brightness into RGB data values as shown in any of the FIGS. 5(*a*) to 7(*b*).

Then, the category comparison section 57 compares the categories of the body color and the desired color derived by the color category derivation section 56 with each other to discriminate whether the categories in color are same as or different from each other. In other words, the category comparison section 57 compares the color (body color) of the body region before a desired of the body region after the color change with each other (step J3).

Thereafter, the color changing section 58 performs color changing processing based on a result of the comparison between the categories in color by the category comparison section 57 (step J4). Depending upon whether the categories of the body color and the desired color are same or different, corresponding color changing processing is performed.

Such color changing processing by the color changing section 58 based on a result of comparison in category in color as described above will be described with reference to a flow chart shown in FIG. 27.

It is to be noted that, in the color changing processing by the color changing section 58, the color space includes the brightness (V), the saturation (S) and the hue (H), and the color space, body data can be moved while maintaining one or more parameters of the brightness (V), the saturation (S) and the hue (H).

Further, while inputted picture data are distributed three-dimensionally as seen in FIG. 28(*a*), for simplified description, a plane which represents the hue and the saturation only at a certain brightness is used as seen in FIG. 28(*b*).

In particular, the category comparison section 57 compares the categories of the body color and the desired color derived by the color category derivation section 56 to discriminate whether the categories of the colors are same as or are different from one another (step J3). When the categories are same, the body data are rotated around the white in the color space as seen in FIG. 29(*b*) (step K3). Consequently, the relative positional relationship of the body data (positional relationship of the symbols A, B, C and D) are maintained to that before such rotation, and accordingly, for example, a feeling of a reflection condition of an original picture can be left as it is.

Upon such rotation of the body data, a plan 60A including a line indicating white (that is, the axis of the brightness) and the body color is imagined as seen in FIG. 30(*a*). The body data are rotated around an axis provided by the line indicating white while maintaining the relative positional relationship to the plane. Consequently, the plane 60A is rotated to make a plane 60B which includes the line indicating white and the desired color as seen in FIG. 30(*b*) thereby performing color changing in which only the hue can be changed.

Figure 27:
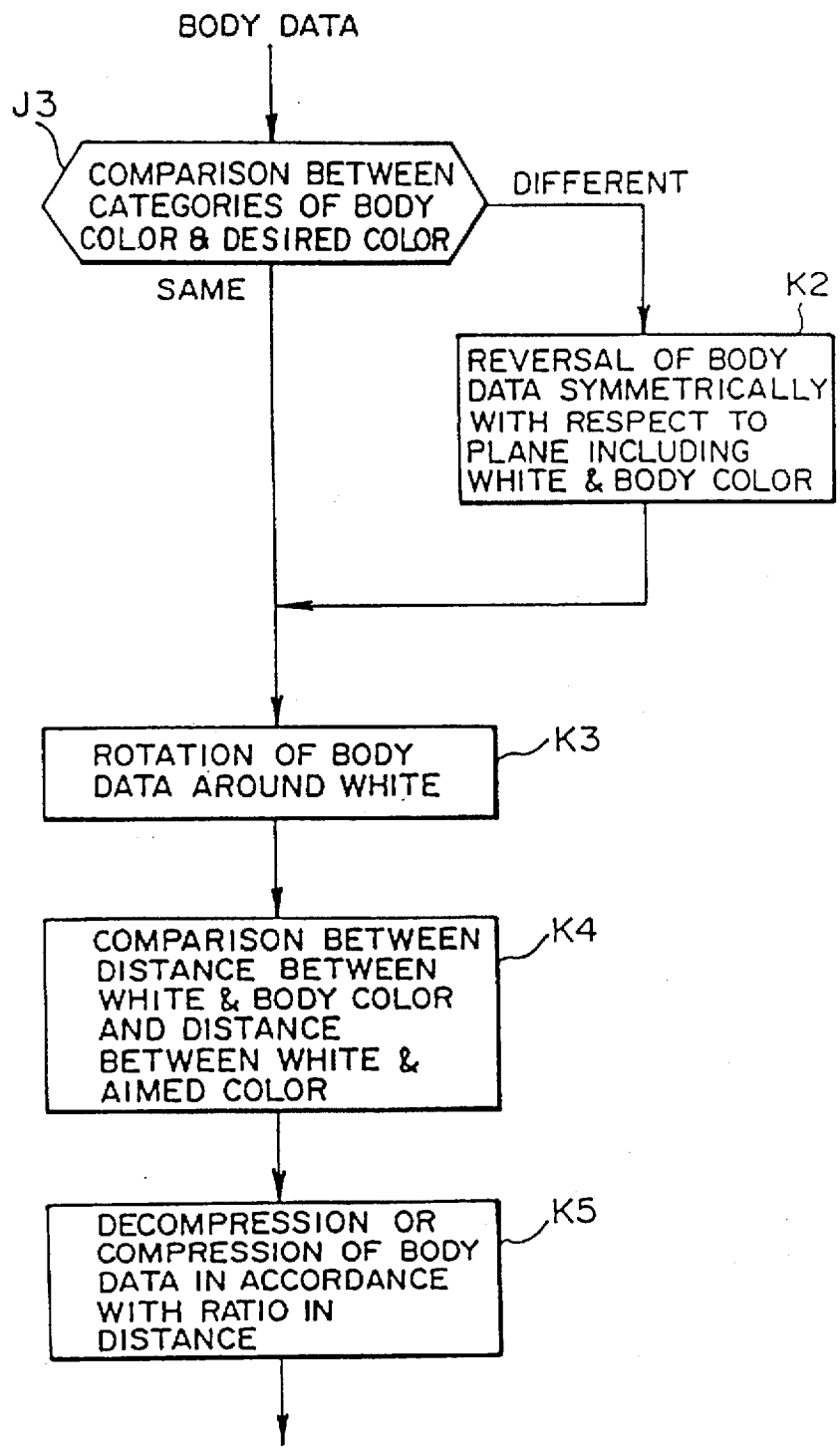
FIG. 27 is a flow chart illustrating another color variation procedure performed in accordance with a result of color category comparison by a color variation section of the color picture processing apparatus shown in FIG. 25.

After such rotation of the body data is performed at step K3 in FIG. 27, the distance between the position of the white and the position of the body color on the chromaticity diagram and the distance between the position of the white and the position of the desired color are calculated, and the two distances are compared with each other (step K4).

Then, decompression/compression processing of the plane in the direction of the saturation is performed in accordance with the ratio between the two distances while maintaining the relative positional relationship to the plane 60A as seen in FIGS. 31(*a*) and 31(*b*) (step K5). It is to be noted that FIG. 31(*b*) illustrates the decompression processing.

Here, the ratio of the decompression/compression is determined from a ratio between the distance of the white and the body color in the direction of the saturation and the distance between the white an the desired color in the direction of the saturation. In this instance, the distance between the position of the white and the position of the desired color is greater than the distance between the position of the white and the position of the body color as seen in FIG. 31(*a*), and accordingly, decompression processing is performed as seen in FIG. 31(*b*).

Further, also when the body color and the desired color are different in brightness, decompression or compression processing can be performed in the direction of the brightness using a similar method. Consequently, color changing which takes the saturation and the brightness of the desired color into consideration can be performed.

Consequently, where the categories in color between the body color and the desired color are the same, particularly when the body color and the desired color are different in saturation, the positional relationship of the data distribution is maintained, and an effect of unexpected reflection or a like effect can be maintained naturally.

Figure 29A:
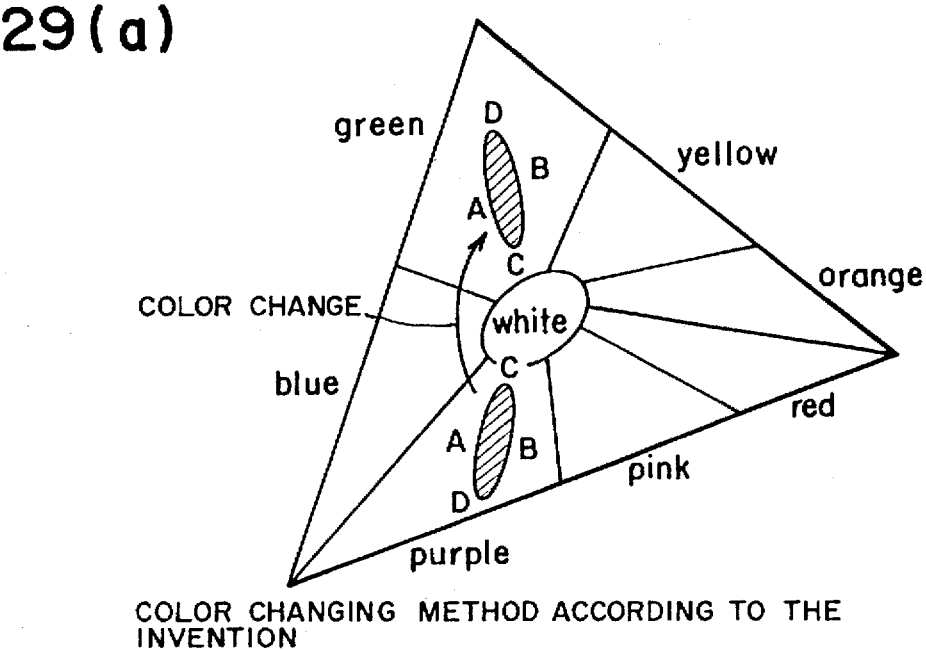
FIGS. 29(a) and 29(b) are diagrammatic views illustrating rotationally moving processes for data in accordance with the categories of a body color and a desired color in the color picture processing apparatus shown in FIG. 25.
Figure 29B:
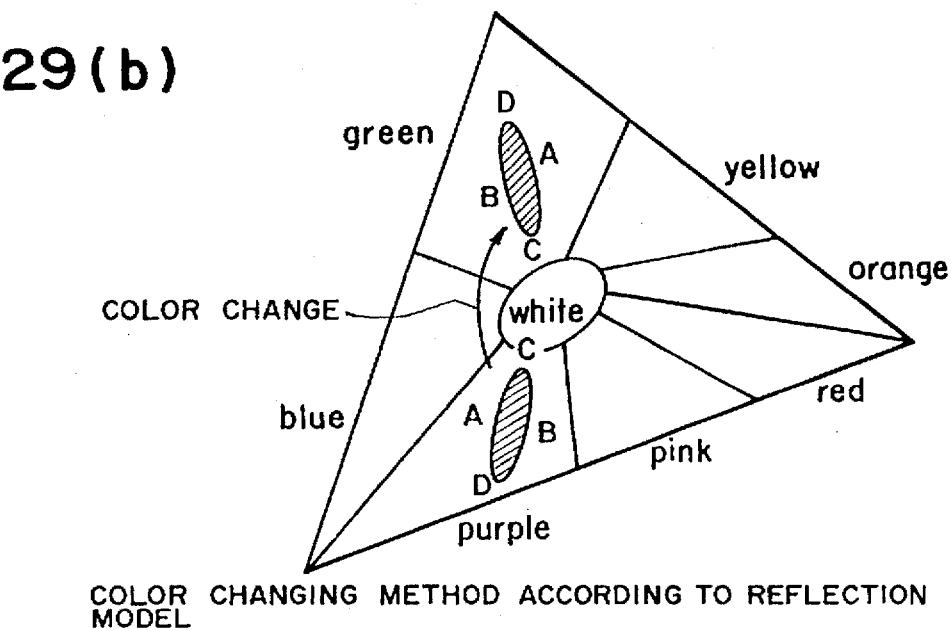

By the way, when it is discriminated, in discrimination of whether the categories in color are same or different at step J3 described above, that the category of the body color and the category of the desired color are different from each other, such color changing processing as seen in FIG. 29(a) is performed.

Figure 32A:
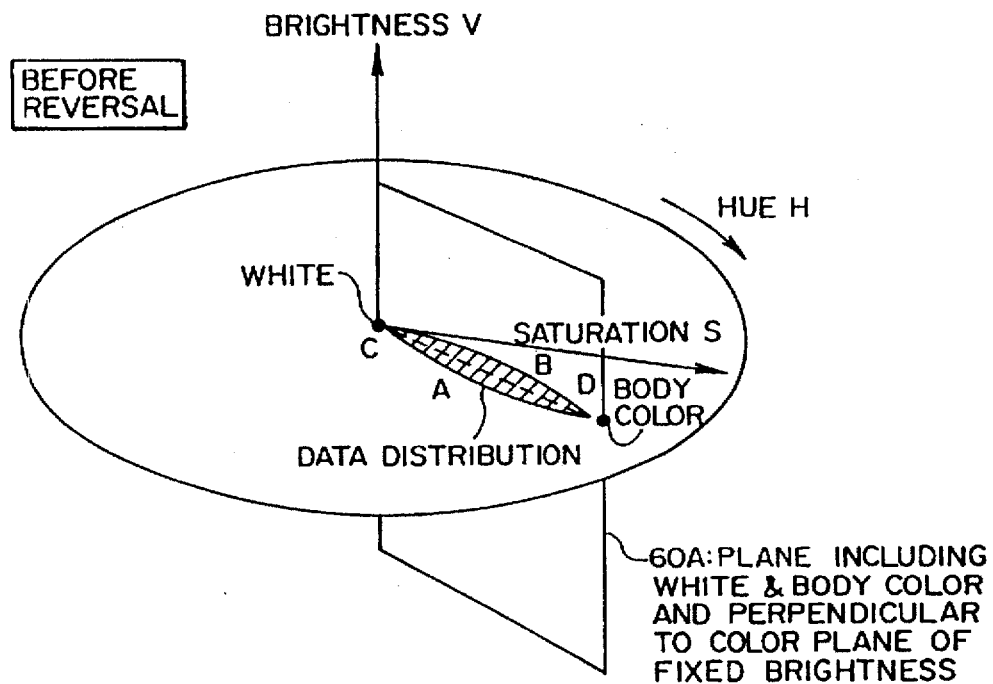
FIGS. 32(a) and 32(b) are diagrammatic views illustrating a reversing process for body data in the color picture processing apparatus shown in FIG. 25.
Figure 32B:
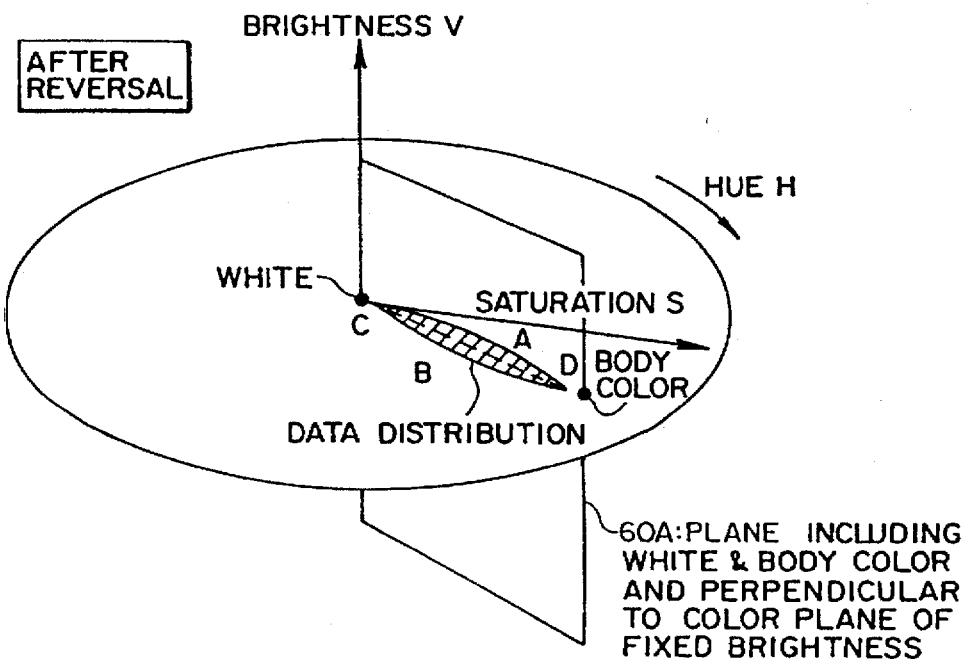

In particular, the body data are reversed symmetrically with respect to the plane 60A including the line indicating the white and the body color as seen from FIGS. 32(a) and 32(b) (step K2). In this instance, while the symbols A, B, C and D are distributed, before the reversal of the body data, in such a manner as seen in FIG. 32(a), they are distributed, as a result of the reversal, in such a manner as seen in FIG. 32(b). Consequently, for example, a feeling of reflection on the picture after the reversal can be maintained natural.

After the body data are reversed in such a manner as described above (step K2), similar processing to that which is performed when the categories are same described above is performed. In particular, also when the categories are different, rotation processing of the reversed body data around the white (step K3) and decompression/compression processing of the body data in accordance with the ratio in distance (step K4 or K5) are performed.

In this manner, with the color picture processing apparatus according to the third embodiment of the present invention, since the positions of data in the color space can be changed by the color changing section 58 based on a result of discrimination in category by the category comparison section 57, even when the color of the body which is influenced by unexpected reflection or the like is to be changed, the effect of the reflection can be maintained. Consequently, there is an advantage in that a natural result conforming to the sensations of human beings can be obtained.

It is to be noted that similar effects to those of the color picture processing apparatus of the present embodiment can be obtained even by rotating, as processing to be performed when the categories of the body color and the desired color are different, the data distribution first (step K3), performing decompression/compression (step K4 or K5) and then reversing the body data symmetrically with respect to the plane including the line indicating white (=brightness axis) and the desired color (step K2).

Further, the color picture processing apparatus according to the present embodiment may additionally have a function of selecting whether or not a data distribution should be reversed in response to an instruction by a user. Where the color picture processing apparatus has the additional function, while a color changing method can be automatically discriminated by comparison in category to obtain a result, when the result is not desirable for the user, since the color changing method can be discriminated, a result of a color change of a more natural feeling can be obtained.

The present invention is not limited to the specifically described embodiment, and variations and modifications may be made without departing from the scope of the present invention.

What is claimed is:

1. A color picture processing method, comprising the steps of:
    discriminating which one of a plurality of categories of color information inputted color picture data belong, the categories being based on a plurality of classified colors;
    converting the color picture data so as to have the thus discriminated color information to thereby reduce the amount of picture data to be reproduced in the color picture without perceptually degrading picture quality; and
    performing succeeding picture processing using the color picture data after the conversion,
    wherein the plurality of classified colors is information of a plurality of categories classified based on categorical perception of human beings.

2. A color picture processing method, comprising the steps of:
    representing a color of picture data as a color code representing one of a plurality of classified colors and a deviation between the color of the picture data and a representative color of a color category to which a color represented by data including the color code information belongs to thereby reduce the amount of picture data to be reproduced in the color picture without perceptually degrading picture quality; and
    performing succeeding picture processing using the thus represented color,
    wherein the plurality of classified colors are colors classified based on categorical perception of human beings.

3. A color picture processing method as claimed in claim 2, wherein the deviation is data representative of a direction of the color of the picture data from the representative color of the color category.

4. A color picture processing method as claimed in claim 2, wherein the deviation is data representative of a distance of the color of the picture data from the representative color of the color category.

5. A color picture processing apparatus, comprising:
    color picture data inputting means for inputting color picture data;
    category discrimination means for discriminating one of a plurality of categories of color information the color picture data inputted from said color picture data inputting means belong, the categories being classified according to categorical human perception; amount of picture data to be reproduced in the color picture without perceptually degrading picture quality; and
    picture processing means for performing picture processing using the color picture data converted into the color information based on the categorical perception by said picture data conversion means.

6. A color picture processing apparatus as claimed in claim 5, wherein said picture data conversion means includes means for converting the color picture data using a code of a color classified based on the categorical perception of human beings.

7. A color picture processing apparatus as claimed in claim 5, wherein said picture data conversion means includes means for converting the color picture data using combination information of a code of a color classified based on the categorical perception and a deviation between the color picture data and a representative color of a category to which the color picture data belong.

8. A color picture processing apparatus as claimed in claim 5, wherein said picture data conversion means includes means for converting the color picture data using combination information of a code of a color classified based on the categorical perception and a parameter representing at least one of the brightness and the clarity.

9. A color picture processing apparatus as claimed in claim 5, wherein said category discrimination means discriminates, when color picture data of an object picture element belongs to a boundary region of a category of a color, which one of the categories of color information the color picture data belong, based on a relationship to category colors of picture elements around the object picture element of the color picture data.

10. A color picture processing apparatus as claimed in claim 9, wherein said category discrimination means detects, when the color picture data of the object picture element belongs to the boundary region of the category of the color, categories in color of the picture elements around the object picture element of the color picture data, counts the numbers of picture elements of same categories and discriminates that one of the categories whose number of picture elements is the greatest among the counted numbers as the category of the color picture data.

11. A color picture processing method, comprising the steps of:
discriminating which one of a plurality of categories of color information inputted color picture data belong, the categories being classified according to categorical human perception;
converting the color picture data so as to have the thus discriminated color information to thereby reduce the amount of picture data to be reproduced in the color picture without perceptually degrading picture quality; and
performing region extraction processing of specifying and extracting, from the color picture information after conversion into the color picture information based on the categorical perception, a partial region of a picture constructed from the color picture data after the conversion.

12. A color picture processing method as claimed in claim 11, wherein, in the region extraction processing, after a color to be specified in the picture is designated, the thus designated color and colors of picture elements of the color picture data are compared with each other, and when a result of the comparison proves that the designated color and the colors of the picture elements of the color picture data are the same color, the picture elements are determined to be picture elements which construct the region to be specified.

13. A color picture processing apparatus, comprising:
color picture data inputting means for inputting color picture data;
category discrimination means for discriminating which one of a plurality of categories of color information the color picture data inputted from said color picture data inputting means belong, the categories being classified according to categorical human perception;
picture data conversion means for converting the color picture data so as to have the color information discriminated by said category discrimination means to thereby reduce the amount of picture data to be reproduced in the color picture without perceptually degrading picture quality; and
region extraction means for specifying and extracting, from the color picture data after conversion into the color information based on the categorical perception by said picture data conversion means, a partial region of a picture constructed from the color picture data after the conversion;
said region extraction means including color designation means for instructing a color to be specified in the picture, comparison means for comparing the color designated by said color designation means and colors of picture elements of the color picture data with each other, and means for determining, when a result of the comparison by said comparison means proves that the designated color and the colors of the picture elements of the color picture data are the same color, the picture elements to be picture elements which constitute the region to be specified.

14. A color picture processing method, comprising the steps of:
discriminating which one of a plurality of categories of color information inputted color picture data belong, the categories being classified according to categorical human perception;
converting the color picture data so as to have the thus discriminated color information to thereby reduce the amount of picture data to be reproduced in the color picture without perceptually degrading picture quality; and
performing color changing processing of changing, based on the color picture data after conversion into the color information based on the categorical perception, some or all of colors of a picture constructed from the color picture data after the conversion.

15. A color picture processing method as claimed in claim 14, wherein, in the color changing processing, a color parameter which has information of at least one of a code of a color classified based on the categorical perception and a deviation between the color picture data and a representative color of a category to which the color picture data belongs.

16. A color picture processing method as claimed in claim 15, wherein, in the color changing processing, after a color to be changed in the picture is designated, the thus designated color and colors of picture elements of the color picture data are compared with each other, and when a result of the comparison proves that the designated color and the colors of the picture elements of the color picture data are the same color, the color parameter is changed, but when the result of the comparison proves that the designated color and the colors of the picture elements of the color picture data are different, the color parameter is not changed.

17. A color picture processing apparatus, comprising:
color picture data inputting means for inputting color picture data;
category discrimination means for discriminating which one of a plurality of categories of color information the color picture data inputted from said color picture data inputting means belong, the categories being classified according to categorical human perception;
picture data conversion means for converting the color picture data so as to have the color information discriminated by said category discrimination means to thereby reduce the amount of picture data to be reproduced in the color picture without perceptually degrading picture quality; and
color changing means for changing, based on the color picture data after the conversion into the color information based on the categorical perception by said picture data conversion means, some or all of colors of a picture constructed from the color picture data after the conversion;
said color changing means including means for changing a color parameter which has information of at least one of a code of a color classified based on the categorical perception and a deviation between the color picture data and a representative color of a category to which the color picture data belong.

18. A color picture processing method, comprising the steps of:
discriminating which one of a plurality of categories of color information inputted color picture data belong, the categories being classified according to categorical human perception;
converting the color picture data so as to have the thus discriminated color information to thereby reduce the amount of picture data to be reproduced in the color picture without perceptually degrading picture quality; and performing data compression processing of the color picture data after the conversion into the color information based on the categorical perception.

19. A color picture processing apparatus, comprising:

color picture data inputting means for inputting color picture data;

category discrimination means for discriminating which one of a plurality of categories of color information the color picture data inputted from said color picture data inputting means belong, the categories being classified according to categorical human perception;

picture data conversion means for converting the color picture data so as to have color information discriminated by said category discrimination means to thereby reduce the amount of picture data to be reproduced in the color picture without perceptually degrading picture quality; and data compression means for performing data compression processing of the color picture data after the conversion into the color information based on the categorical perception by said picture data conversion means.

20. A color picture processing method, comprising the steps of:

discriminating which one of a plurality of categories of color information inputted color picture data belong, the categories being classified according to categorical human perception;

converting the color picture data so as to have the thus discriminated color information to thereby reduce the amount of picture data to be reproduced in the color picture without perceptually degrading picture quality; and converting the color picture data after the conversion into the color information based on the categorical perception into picture displayable data, which can be inputted to picture displaying means using means for indicating a corresponding relationship between the color information based on the categorical perception and such picture displayable data.

21. A color picture processing method as claimed in claim 20, wherein the picture displayable data are three primary color information.

22. A color picture processing apparatus, comprising:

color picture data inputting means for inputting color picture data;

category discrimination means for discriminating which one of a plurality of categories of color information the color picture data inputted from said color picture data inputting means belong, the categories being classified according to categorical human perception;

picture data conversion means for converting the color picture data so as to have the color information discriminated by said category discrimination means to thereby reduce the amount of picture data to be reproduced in the color picture without perceptually degrading picture quality; and picture displayable data conversion means for converting the color picture data after the conversion into the color information based on the categorical perception by said picture data conversion means into picture displayable data, which can be inputted to picture displaying means, using means for indicating a corresponding relationship between the color information based on the categorical perception and such picture displayable data.

23. A color picture processing apparatus, comprising:

color picture data inputting means for inputting color picture data;

category discrimination means for discriminating which one of a plurality of categories of color information the color picture data inputted from said color picture data inputting means belong, the categories being classified according to categorical human perception;

picture data conversion means for converting the color picture data so as to have the color information discriminated by said category discrimination means to thereby reduce the amount of picture data to be reproduced in the color picture without perceptually degrading picture quality;

region extraction means for specifying and extracting, from the color picture data after conversion into the color information based on the categorical perception by said conversion means, a partial region of a picture constructed from the color picture after the conversion;

color changing means for changing, based on the color picture data after the conversion into the color information based on the categorical perception by said picture data conversion means, some or all of colors of a picture constructed from the color picture data after the conversion;

data compression means for performing data compression processing of the color picture data after the conversion into the color information based on the categorical perception by said picture data conversion means; and picture displayable data conversion means for converting the color picture data after the conversion into the color information based on the categorical perception by said picture data conversion means into picture displayable data, which can be inputted to picture displaying means, using means for indicating a corresponding relationship between the color information based on the categorical perception and such picture displayable data.

24. A color picture processing method wherein a particular color in a picture constructed from color picture data is designated to extract an arbitrary body region and a color of the arbitrary body region in the picture is derived and changed to a desired color designated separately, comprising the steps of:

detecting which one of a plurality of categories of color information the designated color or the derived body color or else the desired color belongs, the categories being classified according to categorical human perception;

detecting which one of the plurality of categories of color information the color picture data of the body region before or after the color change belong, the categories being classified according to human perception;

discriminating whether categories of the instructed color, the body color or the desired color and the color picture data are same as or different from each other; and performing processing of requesting, based on a result of the discrimination, an operation for a change of the color picture data and display of the result, thereby preventing expansion of noise components present in the color picture data of the body region before the color change is performed.

25. A color picture processing apparatus, comprising:
a memory for storing inputted color picture data;
body region extraction means for extracting an arbitrary body region of a picture constructed from the inputted color picture data designating a color;
desired color designation means for designating a desired color for a color change of the body;
color changing means for changing the color of the body into the desired color for a color change;
first category discrimination means for discriminating which one of a plurality of categories of color information the designated color or the derived body color or else the desired color belongs, the categories being classified according to categorical human perception;
second category discrimination means for discriminating which one of the plurality of categories of color information the color picture data of the body region before or after the color change belongs, the categories being classified according to categorical human perception;
category difference discrimination means for discriminating whether the category of the designated color, the body color or the desired color and the category of the color picture data discriminated by said first category discrimination means and said second category discrimination means, respectively, are same as or different from each other; and
picture data changing means for changing the color picture data before or after the color change based on a result of the discrimination by said category difference discrimination means, thereby preventing expansion of noise components present in the color picture data of the body region before the color change is performed.

26. A color picture processing apparatus as claimed in claim 25, wherein, when the discrimination by said category difference discrimination means of whether the categories of the body color and the color picture data before the color change are same as or different from each other proves that the color picture data are partially different in category from the body color, said picture data changing means converts those color picture data which are different in category from the body color into color picture data of the same category as that of the body color.

27. A color picture processing apparatus as claimed in claim 26, wherein, when the color picture data which are different in category from the body color are converted into the color picture data of the same category as that of the body color, said picture data changing means changes those color picture data so as to be positioned on a boundary of the category of the body color.

28. A color picture processing apparatus as claimed in claim 25, wherein, when the discrimination by said category difference discrimination means of whether the categories of the body color and the color picture data before the color change are same as or different from each other proves that the color picture data are partially different in category from the body color, said picture data changing means changes all of the color picture data into color picture data of the same category as that of the body color.

29. A color picture processing apparatus as claimed in claim 28, wherein, when all of the color picture data are changed into color picture data of the same category as that of the body color, said picture data changing means first detects a straight line interconnecting the body color and each of the color picture data in a color space and then detects a crossing point between the straight line and a boundary of the category of the body color and also detects a distance between the crossing point and the color picture data, whereafter said picture data changing means changes the positions of the color picture data in the color space in accordance with the positions of the body color and the individual color picture data so that one of the color picture data whose distance is greatest among the distances may be included in the same category as that of the body color.

30. A color picture processing apparatus as claimed in claim 25, wherein, when the discrimination by said category difference discrimination means of whether the categories of the desired color and the color picture data after the color change are same as or different from each other proves that the color picture data are partially different in category from the desired color, said picture data changing means changes the color picture data which are different in category from the desired color into color picture data of the same category as that of the desired color.

31. A color picture processing apparatus as claimed in claim 30, wherein, when the color picture data which are different in category from the desired color are converted into the color picture data of the same category as that of the desired color, said picture data changing means changes the color picture data so as to be positioned on a boundary of the category of the desired color.

32. A color picture processing apparatus as claimed in claim 25, wherein, when the discrimination by said category difference discrimination means of whether the categories of the desired color and the color picture data after the color change are same as or different from each other proves that the color picture data are partially different in category from the desired color, said picture data changing means changes all of those color picture data which are difference in category from the desired color into color picture data of the same category as that of the desired color.

33. A color picture processing apparatus as claimed in claim 32, wherein, when all of the color picture data are changed into color picture data of the same category as that of the desired color, said picture data changing means first detects a straight line interconnecting the desired color and each of those color picture data in a color space and then detects a crossing point between the straight line and a boundary of the category of the desired color and also detects a distance between the crossing point and the color picture data, whereafter said picture data changing means changes the positions of the color picture data in the color space in accordance with the positions of the desired color and the individual color picture data so that one of the color picture data whose distance is greatest among the distances may be included in the same category as that of the desired color.

34. A color picture processing method wherein a color of an arbitrary body region in a color picture is changed by changing a position of data indicating the body region in a color space, comprising the steps of:
discriminating whether data indicating the body region before and after a color change belong, when the data are converted into a plurality of colors classified based on categorical perception of human beings, to the same category or to different categories; and
changing the positions of the data in the color space based on a result of the discrimination to change the color of the body.

35. A color picture processing apparatus wherein a color of an arbitrary body region in a color picture is changed by changing a position of data indicating the body region in a color space, comprising:
a memory for storing body region data;

body color detection means for detecting a body color of the body data;

desired color designation means for designating a desired color for a color change of the body data;

category discrimination means for discriminating which one of a plurality of categories of color information the body color data indicating the body region before and after a color change and the desired color data belong, the categories being classified according to categorical human perception; and data conversion means for converting the data so as to have the color information discriminated by said category discrimination means to thereby reduce the amount of picture data to be reproduced in the color picture without perceptually degrading picture quality.

36. A color picture processing apparatus as claimed in claim 35, further comprising:

category difference discrimination means for discriminating whether or not the data obtained by the conversion by said data conversion means and indicating the body region before and after the color change belong to the same category; and color changing means for changing the position of the data in the color space based on a result of the discrimination by said category difference discrimination means to change the color of the body.

37. A color picture processing apparatus as claimed in claim 36, wherein said category difference discrimination means includes derived color category detection means for detecting a category of a derived color derived from the body region, desired color category detection means for detecting a category of a desired color designated as a color to be desired for a color change, and category comparison means for comparing the categories of the derived color and the desired color detected by said derived color category detection means and said desired color category detection means with each other.

38. A color picture processing apparatus as claimed in claim 36, wherein the color space is constructed as a space which can be represented in brightness, saturation and hue, and said color changing means includes means for changing a value of at least one of the brightness, the saturation and the hue.

39. A color picture processing apparatus as claimed in claim 38, wherein said color changing means includes means for rotationally moving, when the categories of the body color and the desired color are same as each other, a distribution of the data in the color space around a center provided by a straight line representing achromatic colors while maintaining a positional relationship of the data with respect to a plane which includes the straight line representing the achromatic colors and a point of the derived color, and means for rotationally moving, when the categories of the body color and the aimed color are different from each other, the distribution of the data in the color space around the straight line while reversing the distribution of the data with respect to the plane.

40. A color picture processing apparatus as claimed in claim 38, wherein said color changing means includes means for performing data decompression processing or data compression processing of the data in the color space in the direction of the brightness to change the value in brightness.

41. A color picture processing apparatus as claimed in claim 38, wherein said color changing means includes means for performing data decompression processing or data compression processing of the data in the color space in the direction of the saturation to change the value in saturation.

42. A color picture processing apparatus as claimed in claim 38, wherein said color changing means includes means for performing data rotating processing of the data in the color space around a straight line representing achromatic colors to change the value in hue.

* * * * *